United States Patent
O'Donoghue et al.

(10) Patent No.: US 12,327,193 B2
(45) Date of Patent: Jun. 10, 2025

(54) METHODS, APPARATUSES AND COMPUTER PROGRAM PRODUCTS FOR PREDICTING MEASUREMENT DEVICE PERFORMANCE

(71) Applicant: Optum Services (Ireland) Limited, Dublin (IE)

(72) Inventors: Kieran O'Donoghue, Dublin (IE); Neill Michael Byrne, Dublin (IE); Michael J. McCarthy, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 816 days.

(21) Appl. No.: 17/504,657

(22) Filed: Oct. 19, 2021

(65) Prior Publication Data
US 2023/0119186 A1    Apr. 20, 2023

(51) Int. Cl.
| | |
|---|---|
| *G06N 3/04* | (2023.01) |
| *G06N 3/044* | (2023.01) |
| *G06N 3/045* | (2023.01) |
| *G06N 3/08* | (2023.01) |
| *G06N 3/088* | (2023.01) |

(52) U.S. Cl.
CPC ............ *G06N 3/088* (2013.01); *G06N 3/044* (2023.01); *G06N 3/045* (2023.01)

(58) Field of Classification Search
CPC ................................ G06N 3/044; G06N 3/045
See application file for complete search history.

(56) References Cited

U.S. PATENT DOCUMENTS

| | | |
|---|---|---|
| 6,788,965 B2 | 9/2004 | Ruchti et al. |
| 8,036,925 B2 | 10/2011 | Choubey |
| 8,321,251 B2 | 11/2012 | Opalach et al. |
| 8,751,266 B2 | 6/2014 | Stang |
| 9,147,041 B2 | 9/2015 | Amarasingham et al. |
| 9,324,119 B2 | 4/2016 | Singh et al. |

(Continued)

FOREIGN PATENT DOCUMENTS

| | | |
|---|---|---|
| CN | 112185569 A | 1/2021 |
| CN | 113241135 A | 8/2021 |

(Continued)

OTHER PUBLICATIONS

Behera, Sourajit, and Rajiv Misra. "Generative adversarial networks based remaining useful life estimation for IIoT." Computers & Electrical Engineering 92 (2021): 107195. (Year: 2021).*

(Continued)

*Primary Examiner* — Hal Schnee
(74) *Attorney, Agent, or Firm* — Alston & Bird LLP

(57) ABSTRACT

Methods, apparatuses, systems, computing devices, and/or the like are provided. An example method may include generating a plurality of encoded input data objects associated with a measurement device; generating, using at least a bidirectional Recurrent Neural Networks (RNN) machine learning model, a predictive performance data object associated with the measurement device and a plurality of predictive weight data objects associated with the predictive performance data object, and performing one or more prediction-based actions based at least in part on the predictive performance data object or the plurality of predictive weight data objects.

20 Claims, 18 Drawing Sheets

(56) References Cited

U.S. PATENT DOCUMENTS

| | | | |
|---|---|---|---|
| 9,836,599 | B2 | 12/2017 | Sheldon et al. |
| 10,231,622 | B2 | 3/2019 | Soyao et al. |
| 10,249,389 | B2 | 4/2019 | Athey et al. |
| 10,404,526 | B2 | 9/2019 | Prabhakara et al. |
| 10,496,788 | B2 | 12/2019 | Amarasingham et al. |
| 10,579,928 | B2 | 3/2020 | Wang et al. |
| 10,692,589 | B2 | 6/2020 | Mueller-Wolf |
| 10,729,502 | B1 | 8/2020 | Wolf et al. |
| 10,888,281 | B2 | 1/2021 | Shah et al. |
| 10,943,072 | B1 | 3/2021 | Jaganmohan |
| 11,065,079 | B2 | 7/2021 | Wolf et al. |
| 11,081,234 | B2 | 8/2021 | Pappada |
| 11,106,442 | B1 | 8/2021 | Hsiao et al. |
| 11,116,587 | B2 | 9/2021 | Wolf et al. |
| 11,562,294 | B2 * | 1/2023 | Seo ............... G06F 18/24 |
| 2003/0060692 | A1 | 3/2003 | L. Ruchti et al. |
| 2005/0091084 | A1 | 4/2005 | McGuigan et al. |
| 2006/0206359 | A1 | 9/2006 | Stang |
| 2008/0214904 | A1 | 9/2008 | Saeed et al. |
| 2009/0182594 | A1 | 7/2009 | Choubey |
| 2011/0071363 | A1 | 3/2011 | Montijo et al. |
| 2013/0035976 | A1 | 2/2013 | Buffett |
| 2013/0110576 | A1 | 5/2013 | Roy et al. |
| 2013/0172764 | A1 | 7/2013 | Buckley |
| 2013/0185097 | A1 | 7/2013 | Saria et al. |
| 2014/0074509 | A1 | 3/2014 | Amarasingham et al. |
| 2014/0279641 | A1 | 9/2014 | Singh et al. |
| 2015/0213206 | A1 | 7/2015 | Amarasingham et al. |
| 2015/0213224 | A1 | 7/2015 | Amarasingham et al. |
| 2015/0216413 | A1 | 8/2015 | Soyao et al. |
| 2015/0286792 | A1 | 10/2015 | Gardner et al. |
| 2015/0289821 | A1 | 10/2015 | Rack-Gomer et al. |
| 2016/0267268 | A1 | 9/2016 | Sheldon et al. |
| 2017/0061093 | A1 | 3/2017 | Amarasingham et al. |
| 2017/0091320 | A1 | 3/2017 | Psota et al. |
| 2017/0111245 | A1 | 4/2017 | Ishakian et al. |
| 2017/0124269 | A1 | 5/2017 | McNair et al. |
| 2017/0357771 | A1 | 12/2017 | Connolly et al. |
| 2018/0083825 | A1 | 3/2018 | Prabhakara et al. |
| 2018/0211727 | A1 | 7/2018 | Zarkoob et al. |
| 2018/0225314 | A1 | 8/2018 | Devarao et al. |
| 2018/0330824 | A1 | 11/2018 | Athey et al. |
| 2018/0374580 | A1 | 12/2018 | Gupta et al. |
| 2019/0034590 | A1 | 1/2019 | Oren et al. |
| 2019/0034591 | A1 | 1/2019 | Mossin et al. |
| 2019/0036970 | A1 | 1/2019 | Shih et al. |
| 2019/0108912 | A1 | 4/2019 | Spurlock, III et al. |
| 2019/0147343 | A1 | 5/2019 | Lev et al. |
| 2019/0172587 | A1 | 6/2019 | Park et al. |
| 2019/0377818 | A1 | 12/2019 | Andritsos |
| 2020/0043612 | A1 | 2/2020 | McNair et al. |
| 2020/0074573 | A1 | 3/2020 | Op Den Buijs et al. |
| 2020/0160995 | A1 | 5/2020 | Kenig et al. |
| 2020/0185085 | A1 | 6/2020 | Mavrieudus et al. |
| 2020/0272919 | A1 | 8/2020 | Haimson et al. |
| 2020/0293527 | A1 | 9/2020 | Srivastav et al. |
| 2020/0356846 | A1 | 11/2020 | Saripalli et al. |
| 2020/0396231 | A1 | 12/2020 | Krebs et al. |
| 2020/0411176 | A1 | 12/2020 | Hadorn et al. |
| 2021/0082575 | A1 | 3/2021 | Ji et al. |
| 2021/0090733 | A1 | 3/2021 | Dibari et al. |
| 2021/0142199 | A1 | 5/2021 | McCarthy et al. |
| 2021/0201184 | A1 | 7/2021 | Scheepens et al. |
| 2021/0241137 | A1 | 8/2021 | Jain et al. |
| 2021/0279644 | A1 | 9/2021 | Givental et al. |
| 2021/0286815 | A1 | 9/2021 | Aylett et al. |
| 2021/0302953 | A1 | 9/2021 | Zhou et al. |
| 2021/0390668 | A1 | 12/2021 | Ren et al. |
| 2022/0051796 | A1 | 2/2022 | Zhu et al. |
| 2022/0103589 | A1 | 3/2022 | Shen et al. |
| 2022/0291966 | A1 | 9/2022 | Masood et al. |
| 2022/0292339 | A1 | 9/2022 | Byrne et al. |
| 2022/0327404 | A1 | 10/2022 | Godden et al. |
| 2023/0024366 | A1 | 1/2023 | Krutka et al. |
| 2023/0075176 | A1 | 3/2023 | McCarthy et al. |
| 2023/0104028 | A1 * | 4/2023 | Wang ............... G05B 23/0283 |
| | | | 702/183 |
| 2023/0122121 | A1 | 4/2023 | O'Donoghue et al. |
| 2023/0140828 | A1 | 5/2023 | Durvasula et al. |
| 2023/0376532 | A1 | 11/2023 | McCarthy et al. |
| 2024/0119057 | A1 | 4/2024 | Unsal et al. |
| 2024/0207485 | A1 | 6/2024 | Tran et al. |
| 2024/0211779 | A1 | 6/2024 | Conchuir et al. |
| 2024/0273263 | A1 | 8/2024 | James et al. |
| 2024/0355460 | A1 | 10/2024 | Sobolewski et al. |
| 2024/0362068 | A1 | 10/2024 | O Conchuir et al. |
| 2024/0378385 | A1 | 11/2024 | Byrne et al. |
| 2024/0378516 | A1 | 11/2024 | Waldron et al. |
| 2024/0379160 | A1 | 11/2024 | Harari et al. |
| 2024/0403628 | A1 | 12/2024 | O Conchuir et al. |

FOREIGN PATENT DOCUMENTS

| | | |
|---|---|---|
| EP | 3767636 A1 | 1/2021 |
| WO | 2019/201997 A1 | 10/2019 |
| WO | 2021/115835 A1 | 6/2021 |

OTHER PUBLICATIONS

Elsheikh, Ahmed, Soumaya Yacout, and Mohamed-Salah Ouali. "Bidirectional handshaking LSTM for remaining useful life prediction." Neurocomputing 323 (2019): 148-156. (Year: 2019).*

Dangut, Maren David, Zakwan Skaf, and Ian K. Jennions. "Rare failure prediction using an integrated auto-encoder and bidirectional gated recurrent unit network." IFAC-PapersOnLine 53.3 (2020): 276-282. (Year: 2020).*

Maslach, David et al. "Noise as Signal in Learning From Rare Events," Organization Science, vol. 29, No. 2, pp. 225-246, Apr. 2, 2018, DOI: 10.1287/orsc.2017.1179, ISSN: 1047-7039 (print), ISSN: 1526-5455 (online).

Mukherjee, Ujal Kumar. "Managing The Risks and Potential of High-Tech Innovations-In-Use—Predictive Analytic Modeling With Big Data and a Longitudinal Field Study," A Dissertation Submitted to the Faculty of the Graduate School of the University of Minnesota, Jul. 2015, (165 pages).

Non-Final Office Action for U.S. Appl. No. 17/469,005, dated Jan. 2, 2024, (46 pages), United States Patent and Trademark Office.

Assale, Michela et al. "The Revival of the Notes Field: Leveraging the Unstructured Content in Electronic Health Records," Frontiers in Medicine, vol. 6, Article 66, Apr. 17, 2019, pp. 1-23, DOI: 10.3389/fmed.2019.00066.

Bayramli, Ilkin et al. "Predictive Structured-Unstructured Interactions in EHR Models: A Case Study of Suicide Prediction," Nature Partner Journals|Digital Medicine, vol. 5, No. 15, Jan. 27, 2022, pp. 1-11, DOI: 10.1038/s41746-022-00558-0.

Camargo, Manuel et al. "Discovering Generative Models From Event Logs: Data-Driven Simulation vs Deep Learning," arXiv preprint arXiv:2009.03567v1 [cs.AI], Sep. 8, 2020, (12 pages).

Jacobi, Corinna et al. "Coming to Terms With Risk Factors for Eating Disorders—Application of Risk Terminology and Suggestions for a General Taxonomy," Psychological Bulletin, vol. 130, No. 1, (2004), pp. 19-65, DOI: 10.1037/0033-2909.130.1.19.

Miotto, Riccardo et al. "Deep Patient: An Unsupervised Representation to Predict the Future of Patients From the Electronic Health Records," Scientific Reports, vol. 6, No. 26094, May 17, 2016, pp. 1-10, DOI: 10.10.8/srep26094.

Mogren, Olof. "C-RNN-GAN: Continuous Recurrent Neural Networks With Adversarial Training," arXiv preprint arXiv: 1611.09904 [cs.AI], Nov. 29, 2016, (6 pages).

Nolle, Timo et al. "DeepAlign: Alignment-Based Process Anomaly Correction Using Recurrent Neural Networks," In: Dustdar S., Yu E., Salinesi C., Rieu D., Pant V. (eds) Advanced Information Systems Engineering. CAiSE 2020. Lecture Notes in Computer Science, vol. 12127, pp. 319-333, Springer, Cham. DOI: 10.1007/978-3-030-49435-3_20.

Syring, Anja F. et al. "Evaluating Conformance Measures in Process Mining Using Conformance Propositions," In book: Transactions

(56) References Cited

OTHER PUBLICATIONS on Petri Nets and Other Models of Concurrency XIV, Nov. 21, 2019, pp. 192-221, Springer, Berlin, Heidelberg. DOI: 10.1007/978-3-662-60651-3_8.
Tello-Leal Edgar et al. "Predicting Activities in Business with LSTM Recurrent Neural Networks," In 2018 ITU Kaleidoscope: Machine Learning for a 5G Future (ITU K), Nov. 26, 2018, (7 pages). IEEE. DOI: 10.23919/ITU-WT.2018.8598069.
Theis, Julian et al. "Adversarial System Variant Approximation to Quantify Process Model Generalization," IEEE Access, vol. 8, Oct. 23, 2020, pp. 194410-194427. DOI: 10.1109/ACCESS.2020.3033450.
Xia, Bin et al. "LogGAN: A Log-Level Generative Adversarial Network for Anomaly Detection Using Permutation Event Modeling," Information Systems Frontiers, vol. 23, No. 2, Jun. 16, 2020, (14 pages). DOI: 10.1007/s10796-020-10026-3.
Zhang, Dongdong et al. "Combining Structured and Unstructured Data for Predictive Models: A Deep Learning Approach," BMC Medical Informatics and Decision Making, vol. 20, No. 280, Oct. 29, 2020, pp. 1-11, DOI: 10.1186/s12911-020-01297-6.
Non-Final Rejection Mailed on May 23, 2024 for U.S. Appl. No. 17/663,771, 42 page(s).
Marafino, Ben J. et al. "Predicting Preventable Hosptial Readmissions With Causal Machine Learning," Health Services Research, vol. 55, No. 6, Oct. 30, 2020, pp. 993-1002, DOI: 10.1111/1475-6773.13586, PMCID: PMC7704477, PMID: 33125706.
Wenke, Sam et al. "Contextual Recurrent Neural Networks," arXiv Preprint arXiv:1902.03455v1 [cs.LG] Feb. 9, 2019, (7 pages).
Darabi, Sajad et al. "TAPER: Time-Aware Patient EHR Representation," IEEE Journal of Biomedical and Health Informatics, vol. 24, Issue 11, pp. 3268-3275, Apr. 3, 2020 (ePub: Nov. 2020), DOI: 10.1109/JBHI.2020.2984931.
International Search Report and Written Opinion for International Application No. PCT/US2023/018975, dated Aug. 7, 2023, (15 pages), European Patent Office, Rijswijk, Netherlands.
Sarwar, Tabinda et al. "The Secondary Use of Electronic Health Records for Data Mining: Data Characteristics and Challenges," ACM Computing Surveys, vol. 55, No. 2, Article 33, pp. 33:1-33:40, Jan. 18, 2022, DOI: 10.1145/3490234.
Advisory Action (PTOL-303) Mailed on Nov. 8, 2024 for U.S. Appl. No. 17/469,005, 3 page(s).
Choi et al, RETAIN: An Interpretable Predictive Model for Healthcare using Reverse Time Attention Mechanism, 2016, Advances in Neural Information Processing Systems, pp. 3512-3520 (Year: 2016).
Final Rejection Mailed on Aug. 23, 2024 for U.S. Appl. No. 17/469,005, 41 page(s).
Gao et al, Stage Net: Stage-Aware Neural Networks for Health Risk Prediction, 2020, WWW '20: Proceedings of The Web Conference 2020, pp. 530-540 (Year: 2020).
Hardt et al, Explaining an increase in predicted risk for clinical alerts, 2020, CHIL '20: Proceedings of the ACM Conference on Health, Inference, and Learning, pp. 80-89 (Year: 2020).
Non-Final Rejection Mailed on Aug. 27, 2024 for U.S. Appl. No. 17/196,543, 34 page(s).
Non-Final Rejection Mailed on Jan. 2, 2024 for U.S. Appl. No. 17/469,005, 46 page(s).
Notice of Allowance and Fees Due (PTOL-85) Mailed on Sep. 25, 2024 for U.S. Appl. No. 17/663,771, 12 page(s).
Basiri et al, "ABCDM: An Attention-based Bidirectional CNN-RNN Deep Model for sentiment analysis", Future Generation Computer Systems, vol. 115, Feb. 2021, pp. 279-294 (Year: 2021).
Daras et al, "Your Local GAN: Designing Two Dimensional Local Attention Mechanisms for Generative Models", Proceedings of the IEEE/CVF Conference on Computer Vision and Pattern Recognition (CVPR), 2020, pp. 14531-14539 (Year: 2020).
Final Rejection Mailed on Jan. 15, 2025 for U.S. Appl. No. 17/196,543, 28 page(s).
Liu et al, "DSTP-RNN: A dual-stage two-phase attention-based recurrent neural network for long-term and multivariate time series prediction", Expert Systems with Applications, vol. 143, Apr. 1, 2020, 113082 (Year: 2020).
Notice of Allowance and Fees Due (PTOL-85) Mailed on Feb. 4, 2025 for U.S. Appl. No. 17/451,270, 20 page(s).
Notice of Allowance and Fees Due (PTOL-85) Mailed on Jan. 14, 2025 for U.S. Appl. No. 17/663,771, 9 page(s).

* cited by examiner

METHODS, APPARATUSES AND COMPUTER PROGRAM PRODUCTS FOR PREDICTING MEASUREMENT DEVICE PERFORMANCE

TECHNOLOGICAL FIELD

Embodiments of the present disclosure relate generally to improving reliability and functionalities of systems and devices, such as, but not limited to, measurement devices. For example, various embodiments of the present disclosure may programmatically generate predictive performance data objects associated with measurement devices and predictive weight data objects associated with predictive performance data objects based at least in part on utilizing a bidirectional Recurrent Neural Networks (RNN) machine learning model.

BACKGROUND

Measurement devices are critical to diagnosing chronic disease and managing patient health. These devices range from complex large scale analyzers in hospital labs to simple wearable devices that measure key patient vitals. The more complex the measurement devices are, the more it is prone to producing inaccurate results and encountering unplanned failure at least due to the complexity of integrating electronics, mechanics, fluidics, pneumatics, reagents, software and analytical algorithms to generate diagnostic outputs.

BRIEF SUMMARY

In general, embodiments of the present disclosure provide methods, apparatuses, systems, computing devices, computing entities, and/or the like.

In accordance with various embodiments of the present disclosure, an apparatus is provided. The apparatus may comprise at least one processor and at least one non-transitory memory comprising a computer program code. The at least one non-transitory memory and the computer program code may be configured to, with the at least one processor, cause the apparatus to generate a plurality of encoded input data objects associated with a measurement device; generate, using at least a bidirectional Recurrent Neural Networks (RNN) machine learning model, a predictive performance data object associated with the measurement device and a plurality of predictive weight data objects associated with the predictive performance data object, and perform one or more prediction-based actions based at least in part on the predictive performance data object or the plurality of predictive weight data objects.

In some embodiments, the at least one non-transitory memory and the computer program code are configured to, with the at least one processor, cause the apparatus to: generate a plurality of encoded measurement device data objects associated with the measurement device. In some embodiments, the plurality of encoded measurement device data objects comprises one or more encoded analogue signal data objects, one or more encoded internal reading data objects, one or more encoded external reading data objects, and/or one or more encoded event log data objects.

In some embodiments, the at least one non-transitory memory and the computer program code are configured to, with the at least one processor, cause the apparatus to: generate, using at least a Generative Adversarial Network (GAN) machine learning model, at least one encoded conformance score data object based at least in part on one or more encoded device operation data objects from an ordered sequence of encoded device operation data objects that are associated with the measurement device.

In some embodiments, the plurality of encoded input data objects comprises the plurality of encoded measurement device data objects and the at least one encoded conformance score data object. In some embodiments, the at least one non-transitory memory and the computer program code are configured to, with the at least one processor, cause the apparatus to generate the plurality of encoded input data objects based at least in part on the plurality of encoded measurement device data objects and the at least one encoded conformance score data object.

In some embodiments, the bidirectional RNN machine learning model is configured to: generate the predictive performance data object based at least in part on the plurality of encoded input data objects, and generate, for each of the plurality of encoded input data objects, a corresponding predictive weight data object of the plurality of predictive weight data objects.

In some embodiments, the bidirectional RNN machine learning model is a bidirectional Long Short Term Memory (LSTM) machine learning model.

In some embodiments, the bidirectional LSTM machine learning model comprises one or more attention layers. In some embodiments, the at least one non-transitory memory and the computer program code are configured to, with the at least one processor, cause the apparatus to: generate, using the one or more attention layers, the plurality of predictive weight data objects associated with the predictive performance data object.

In some embodiments, the at least one encoded conformance score data object indicates an operation conformance level associated with the measurement device.

In some embodiments, the GAN machine learning model comprises a generator component and a discriminator component. In some embodiments, the at least one non-transitory memory and the computer program code are configured to, with the at least one processor, cause the apparatus to: generate, using the generator component, one or more synthetic device operation data objects; generate, using the discriminator component, one or more synthetic conformance score data objects based at least in part on the one or more synthetic device operation data objects; and train the discriminator component based at least in part on the one or more synthetic conformance score data objects and the one or more synthetic device operation data objects.

In some embodiments, the discriminator component comprises at least one attention layer. In some embodiments, the at least one non-transitory memory and the computer program code are configured to, with the at least one processor, cause the apparatus to: generate, for each of the one or more encoded device operation data objects and using the at least one attention layer, a corresponding conformance weight data object.

In some embodiments, the at least one non-transitory memory and the computer program code are configured to, with the at least one processor, cause the apparatus to: retrieve a plurality of measurement device data objects associated with the measurement device. In some embodiments, the plurality of measurement device data objects comprises one or more analogue signal data objects, one or more internal reading data objects, one or more external reading data objects, and one or more event log data objects.

In some embodiments, when generating the plurality of encoded measurement device data objects, the at least one non-transitory memory and the computer program code are configured to, with the at least one processor, cause the apparatus to: retrieve an event encoding registry data object associated with the measurement device; and encode the plurality of measurement device data objects based at least in part on the event encoding registry data object.

In some embodiments, each of the plurality of measurement device data objects is associated with a corresponding timecode indicator. In some embodiments, generating the plurality of encoded measurement device data objects is based at least in part on the plurality of measurement device data objects and the corresponding timecode indicator.

In some embodiments, the predictive performance data object indicates a predicted accuracy level associated with the measurement device. In some embodiments, each of the plurality of predictive weight data objects indicates a predicted accuracy contributing factor of one of the plurality of encoded input data objects in relationship to the predicted accuracy level.

In some embodiments, the at least one non-transitory memory and the computer program code are configured to, with the at least one processor, cause the apparatus to: retrieve a plurality of training encoded input data objects comprising a plurality of training encoded measurement device data objects and at least one training encoded conformance score data object. In some embodiments, the plurality of training encoded input data objects are associated with a training predictive performance data object indicating a known accuracy level. In some embodiments, the at least one non-transitory memory and the computer program code are configured to, with the at least one processor, cause the apparatus to: train the bidirectional RNN machine learning model based at least in part on the plurality of training encoded input data objects and the training predictive performance data object.

In some embodiments, the predictive performance data object indicates a predicted failure likelihood associated with the measurement device. In some embodiments, each of the plurality of predictive weight data objects indicates a predicted failure contributing factor of one of the plurality of encoded input data objects in relationship to the predicted failure likelihood.

In some embodiments, the at least one non-transitory memory and the computer program code are configured to, with the at least one processor, cause the apparatus to: retrieve a plurality of training encoded input data objects comprising a plurality of training encoded measurement device data objects and at least one training encoded conformance score data object, wherein the plurality of training encoded input data objects are associated with a training predictive performance data object indicating a known failure likelihood; and train the bidirectional RNN machine learning model based at least in part on the plurality of training encoded input data objects and the training predictive performance data object.

In some embodiments, the at least one non-transitory memory and the computer program code are configured to, with the at least one processor, cause the apparatus to: cause rendering, on a display of a client computing entity, an overall graph data object based at least in part on the predictive performance data object.

In some embodiments, the at least one non-transitory memory and the computer program code are configured to, with the at least one processor, cause the apparatus to: in response to receiving a user input associated with the overall graph data object, cause rendering, on the display of the client computing entity, a weight graph data object based at least in part on the plurality of predictive weight data objects.

In accordance with various embodiments of the present disclosure, a computer-implemented method is provided. The computer-implemented method may comprise generating a plurality of encoded input data objects associated with a measurement device, generating, using at least a bidirectional RNN machine learning model, a predictive performance data object associated with the measurement device and a plurality of predictive weight data objects associated with the predictive performance data object, and perform one or more prediction-based actions based at least in part on the predictive performance data object and/or the plurality of predictive weight data objects.

In accordance with various embodiments of the present disclosure, a computer program product is provided. The computer program product may comprise at least one non-transitory computer-readable storage medium having computer-readable program code portions stored therein. The computer-readable program code portions may comprise an executable portion configured to generate a plurality of encoded input data objects associated with a measurement device; generate, using at least a bidirectional RNN machine learning model, a predictive performance data object associated with the measurement device and a plurality of predictive weight data objects associated with the predictive performance data object; and perform one or more prediction-based actions based at least in part on the predictive performance data object and/or the plurality of predictive weight data objects.

The above summary is provided merely for purposes of summarizing some example embodiments to provide a basic understanding of some aspects of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

Figure 16:
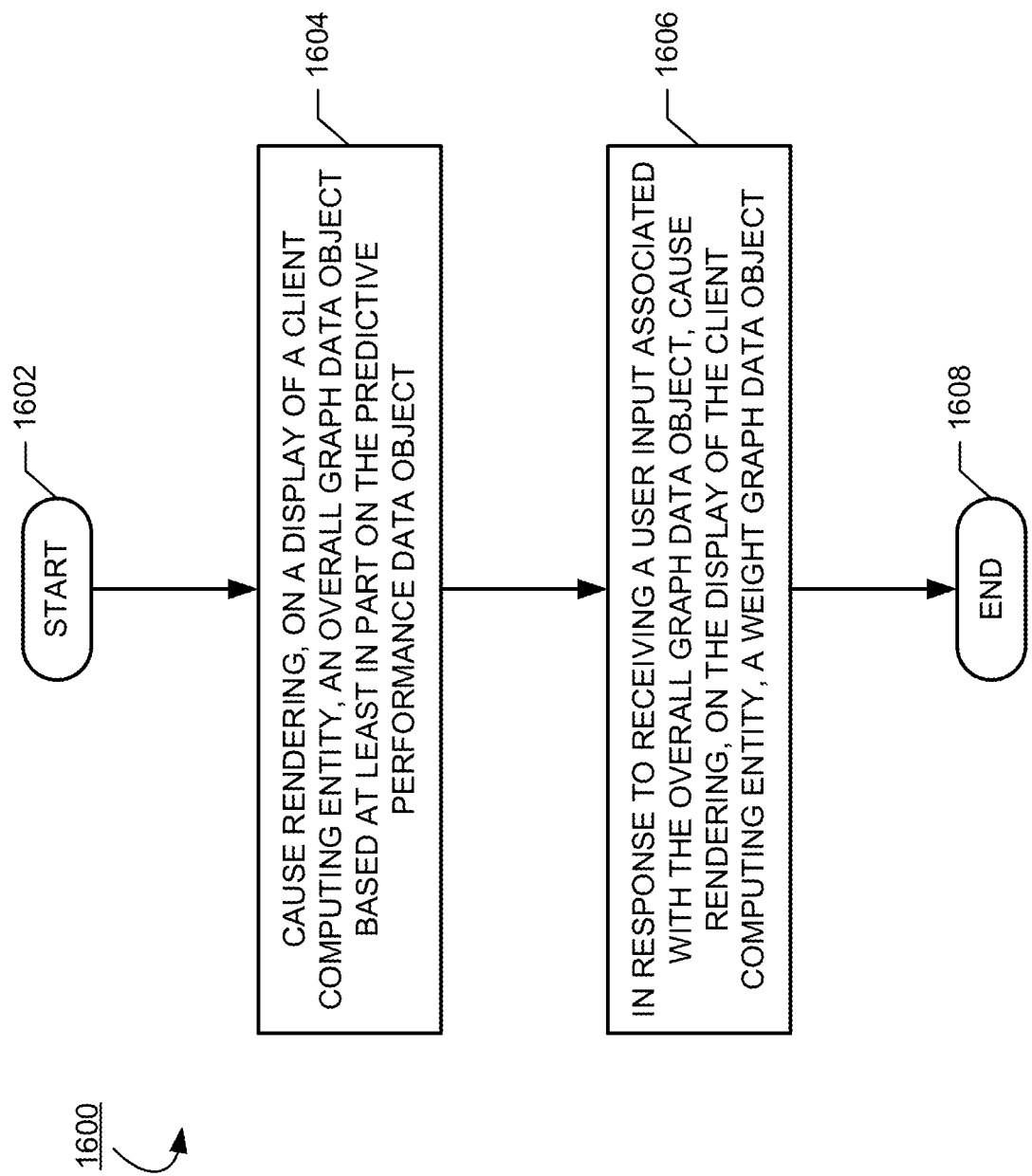
Figure 17:
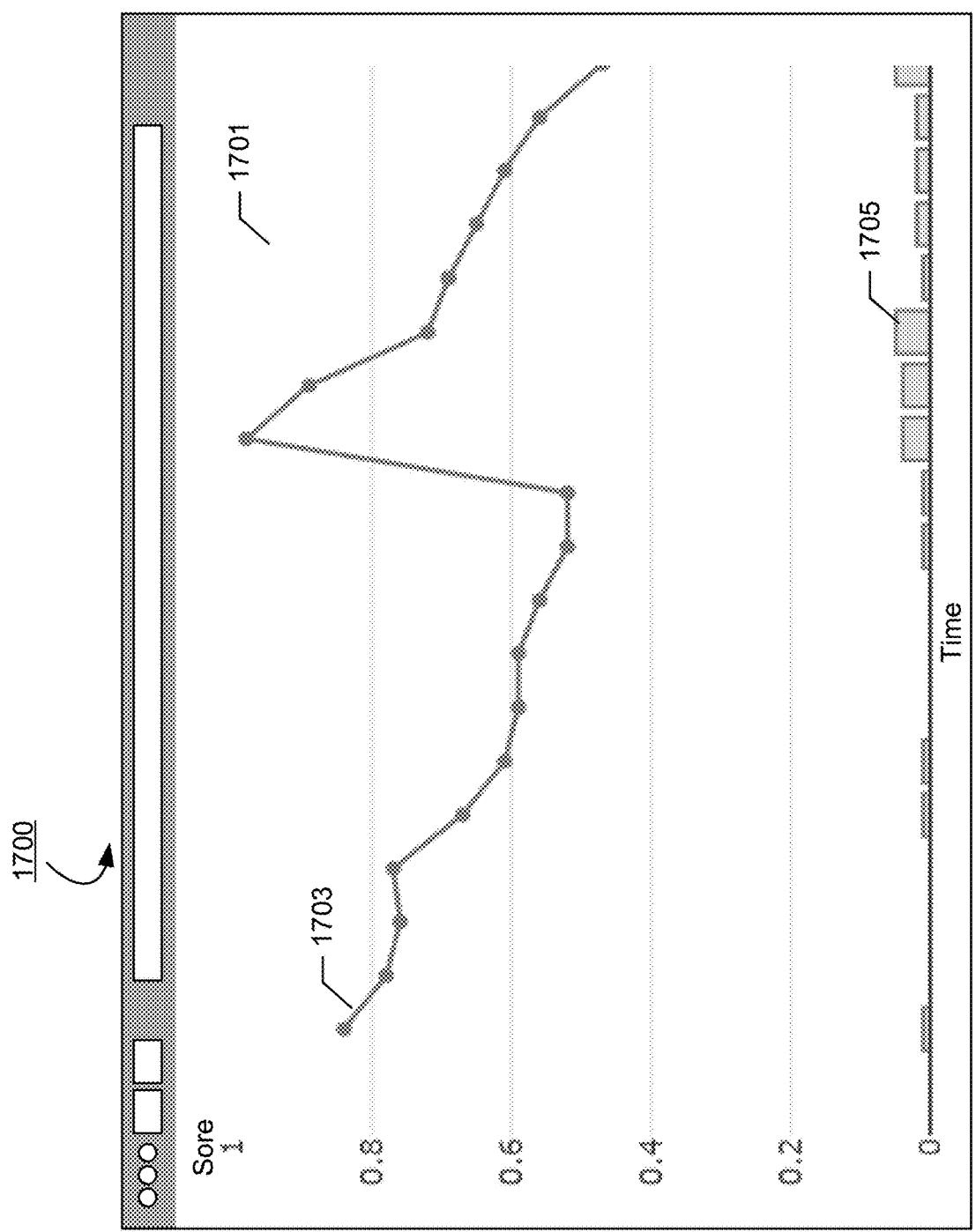
Figure 18:
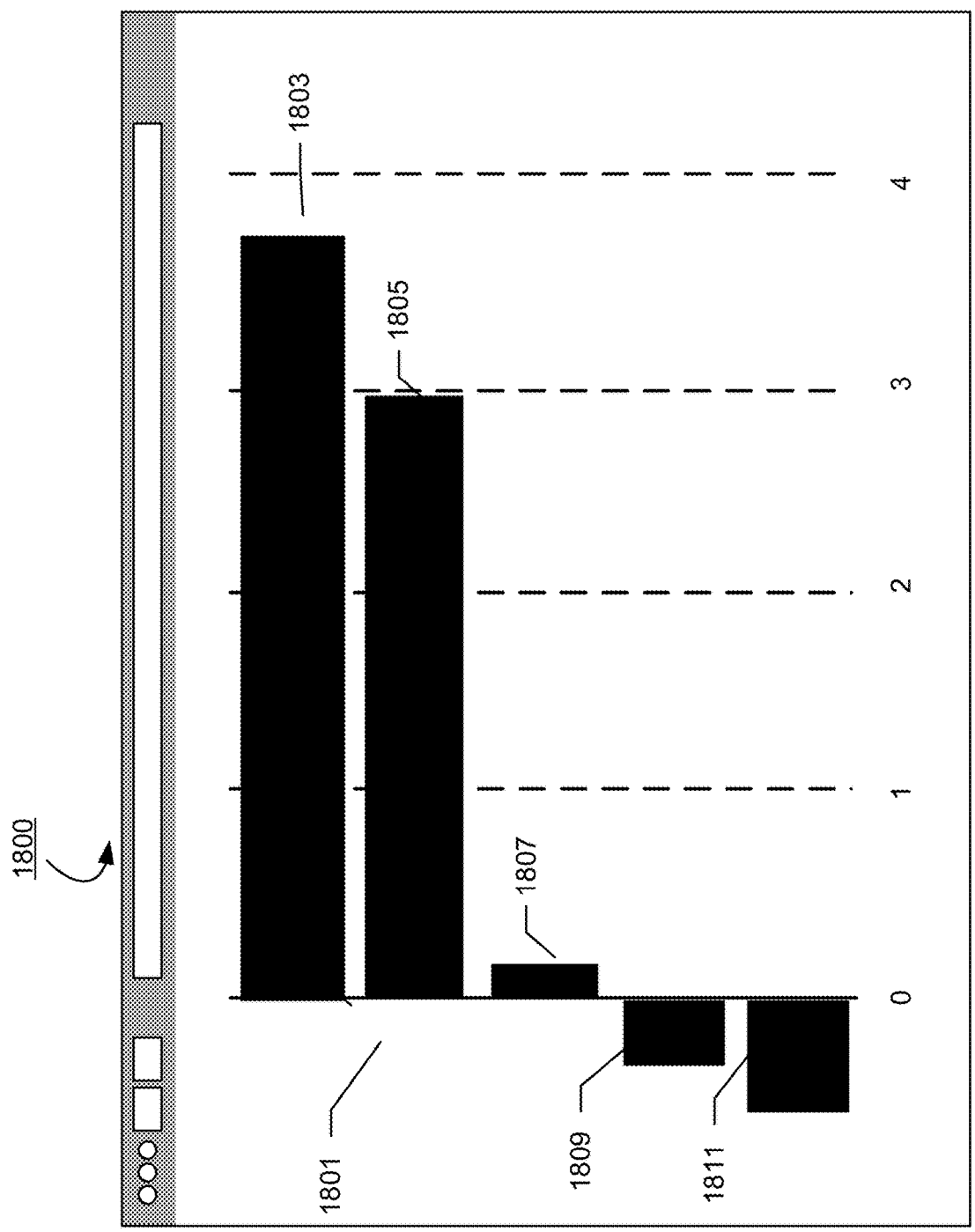

FIGS. 4, 5, 6, 7, 8, 9, 10, 11, 12, 13, 14, 15, and 16 provide example flowcharts and diagrams illustrating example steps, processes, procedures, and/or operations associated with an example measurement device performance prediction platform/system in accordance with various embodiments of the present disclosure; and FIG. 17 and FIG. 18 provide example views of example user interfaces in accordance with various embodiments of the present disclosure.

DETAILED DESCRIPTION OF SOME EXAMPLE EMBODIMENTS

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers may refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily may refer to the same embodiment).

I. COMPUTER PROGRAM PRODUCTS, METHODS, AND COMPUTING ENTITIES

Embodiments of the present disclosure may be implemented as computer program products that comprise articles of manufacture. Such computer program products may include one or more software components including, for example, applications, software objects, methods, data structures, and/or the like. A software component may be coded in any of a variety of programming languages. An illustrative programming language may be a lower-level programming language such as an assembly language associated with a particular hardware architecture and/or operating system platform/system. A software component comprising assembly language instructions may require conversion into executable machine code by an assembler prior to execution by the hardware architecture and/or platform/system. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Additionally, or alternatively, embodiments of the present disclosure may be implemented as a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media may include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatuses, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

Figure 1:
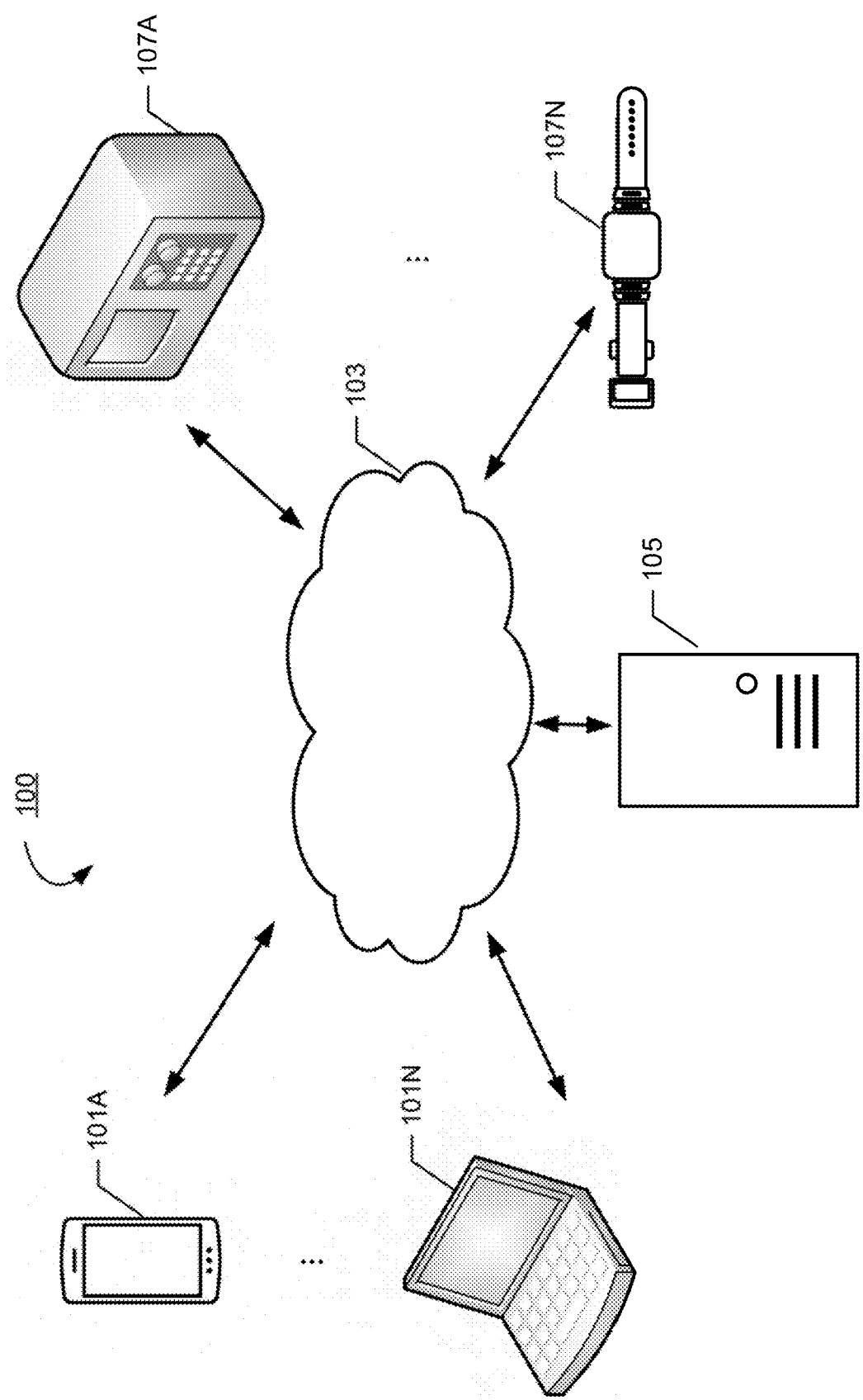
FIG. 1 is a diagram of an example measurement device performance prediction platform/system that can be used in accordance with various embodiments of the present disclosure.

FIG. 1 provides an illustration of a measurement device performance prediction platform/system 100 that can be used in conjunction with various embodiments of the present disclosure. As shown in FIG. 1, the measurement device performance prediction platform/system 100 may comprise apparatuses, devices, and components such as, but not limited to, one or more measurement devices 107A . . . 107N, one or more client computing entities 101A . . . 101N, one or more performance prediction computing entities 105 and one or more networks 103.

Each of the components of the measurement device performance prediction platform/system 100 may be in electronic communication with, for example, one another over the same or different wireless or wired networks 103 including, for example, a wired or wireless Personal Area Network (PAN), Local Area Network (LAN), Metropolitan Area Network (MAN), Wide Area Network (WAN), and/or the like. Additionally, while FIG. 1 illustrates certain system entities as separate, standalone entities, the various embodiments are not limited to this particular architecture.

For example, one or more measurement devices 107A . . . 107N, one or more client computing entities 101A . . . 101N, one or more performance prediction computing entities 105 may be in electronic communication with one another to exchange data and information. As defined herein, one or more measurement devices 107A . . . 107N may detect, determine, measure, and/or calculate properties and/or characteristics of one or more medical samples. The one or more measurement devices 107A . . . 107N may include one or more internal components and/or devices that are configured to generate and/or capture data/information/signals, and such data/information/signals may be communicated to the one or more client computing entities 101A . . . 101N and/or to the one or more performance prediction computing entities 105, details of which are described herein.

a. Exemplary Performance Prediction Computing Entity

Figure 2:
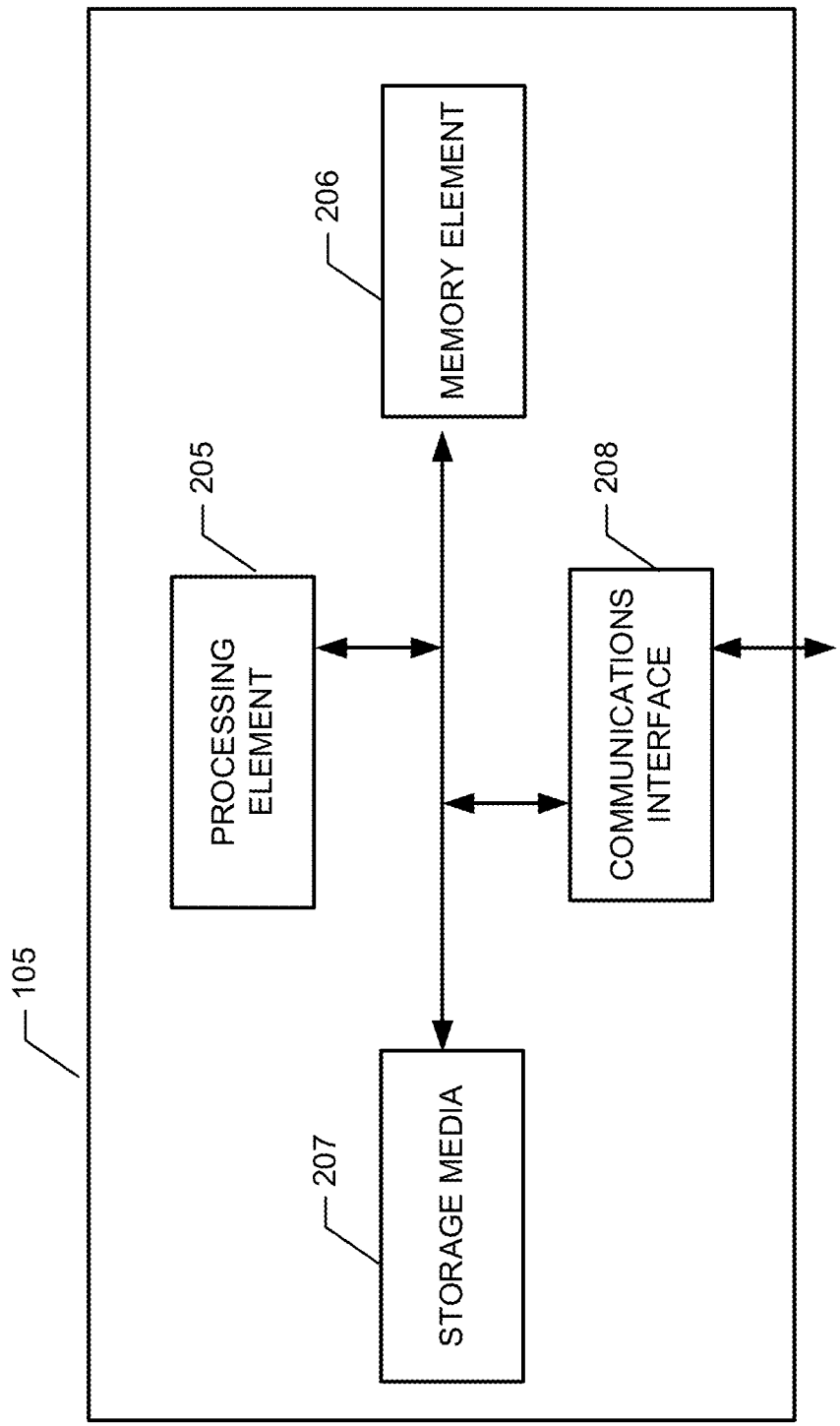
FIG. 2 is a schematic representation of an example performance prediction computing entity in accordance with various embodiments of the present disclosure.

FIG. 2 provides a schematic of a performance prediction computing entity 105 according to one embodiment of the present disclosure. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein.

As indicated, in one embodiment, the performance prediction computing entity 105 may also include one or more network and/or communications interface 208 for communicating with various computing entities, such as by communicating data, content, information, and/or similar terms used herein that can be transmitted, received, operated on, processed, displayed, stored, and/or the like. For instance, the performance prediction computing entity 105 may communicate with other performance prediction computing entities 105, one or more client computing entities 101A-101N, one or more measurement devices 107A . . . 107N, and/or the like.

As shown in FIG. 2, in one embodiment, the performance prediction computing entity 105 may include or be in communication with one or more processing elements (for example, processing element 205) (also referred to as processors, processing circuitry, and/or similar terms used herein interchangeably) that communicate with other elements within the performance prediction computing entity 105 via a bus, for example, or network connection. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the performance prediction computing entity 105 may further include or be in communication with volatile media (also referred to as volatile storage, memory, memory storage, memory circuitry and/or similar terms used herein interchangeably). In one embodiment, the volatile storage or memory may also include one or more memory element 206 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory element 206 may be used to store at least portions of the databases, database instances, database management system entities, data, applications, programs, program modules, scripts, source code, object code, byte code, compiled code, interpreted code, machine code, executable instructions, and/or the like being executed by, for example, the processing element 205 as shown in FIG. 2 and/or the processing element 308 as described in connection with FIG. 3. Thus, the databases, database instances, database management system entities, data, applications, programs, program modules, scripts, source code, object code, byte code, compiled code, interpreted code, machine code, executable instructions, and/or the like may be used to control certain aspects of the operation of the performance prediction computing entity 105 with the assistance of the processing element 205 and operating system.

In one embodiment, the performance prediction computing entity 105 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or storage media 207 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or storage media 207 may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to may refer to a structured or unstructured collection of information/data that is stored in a computer-readable storage medium.

Storage media 207 may also be embodied as a data storage device or devices, as a separate database server or servers, or as a combination of data storage devices and separate database servers. Further, in some embodiments, storage media 207 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third-party provider and where some or all of the information/data required for the operation of the recovery system may be stored. Further, the information/data required for the operation of the recovery system may also be partially stored in the cloud data storage system and partially stored in a locally maintained data storage system. More specifically, storage media 207 may encompass one or more data stores configured to store information/data usable in certain embodiments.

As indicated, in one embodiment, the performance prediction computing entity 105 may also include one or more network and/or communications interface 208 for communicating with various computing entities, such as by communicating data, content, information, and/or similar terms used herein interchangeably that can be transmitted, received, operated on, processed, displayed, stored, and/or the like. For instance, the performance prediction computing entity 105 may communicate with computing entities or communication interfaces of other performance prediction computing entities 105, client computing entities 101A-101N, and/or the like.

As indicated, in one embodiment, the performance prediction computing entity 105 may also include one or more network and/or communications interface 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the performance prediction computing entity 105 may be configured to communicate via wireless external communication networks using any of a variety of protocols, such as general packet radio service (GPRS), Universal Mobile Telecommunications System (UMTS), Code Division Multiple Access 1900 (CDMA1900), CDMA1900 1×(1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), Institute of Electrical and Electronics Engineers (IEEE) 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The performance prediction computing entity 105 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the performance prediction computing entity's components may be located remotely from components of other performance prediction computing entities 105, such as in a distributed system. Furthermore, one or more of the components may be aggregated and additional components performing functions described herein may be included in the performance prediction computing entity 105. Thus, the performance prediction computing entity 105 can be adapted to accommodate a variety of needs and circumstances.

b. Exemplary Client Computing Entity

Figure 3:
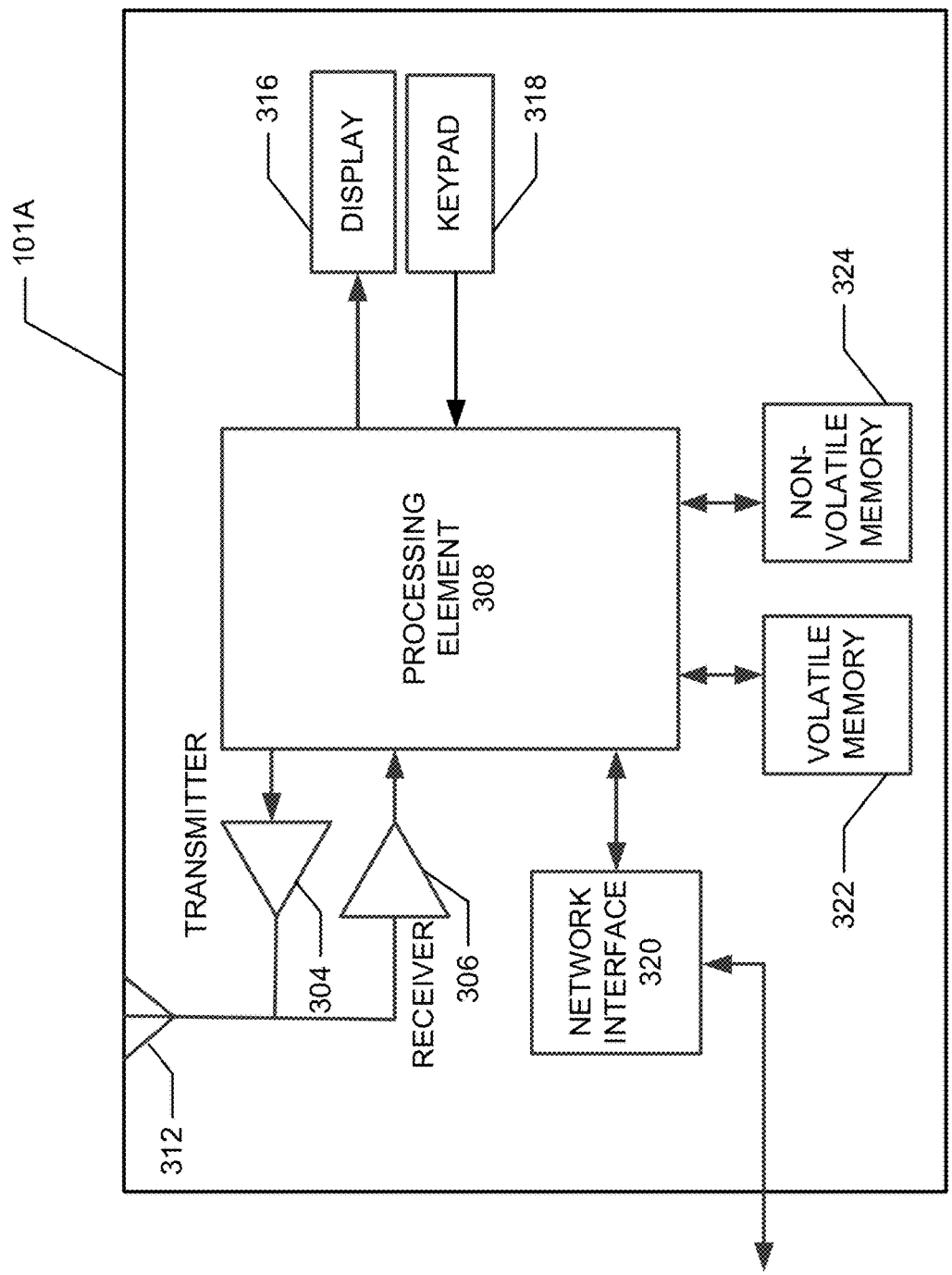
FIG. 3 is a schematic representation of an example client computing entity in accordance with various embodiments of the present disclosure.

FIG. 3 provides an illustrative schematic representative of one of the client computing entities 101A to 101N that can be used in conjunction with embodiments of the present disclosure. As will be recognized, the client computing entity may be operated by an agent and include components and features similar to those described in conjunction with the performance prediction computing entity 105. Further, as shown in FIG. 3, the client computing entity may include additional components and features. For example, the client computing entity 101A can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as a performance prediction computing entity 105, another client computing entity 101A, and/or the like. In this regard, the client computing entity 101A may be capable of operating with one or more air interface standards, communication protocols, modulation types, and access types. More particularly, the client computing entity 101A may comprise a network interface 320, and may operate in accordance with any of a number of wireless communication standards and protocols. In a particular embodiment, the client computing entity 101A may operate in accordance with multiple wireless communication standards and protocols, such as GPRS, UMTS, CDMA1900, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the client computing entity 101A can communicate with various other entities using Unstructured Supplementary Service data (USSD), Short Message Service (SMS), Multimedia Messaging Service (MMS), Dual-Tone Multi-Frequency (DTMF) Signaling, Subscriber Identity Module Dialer (SIM dialer), and/or the like. The client computing entity 101A can also download changes, add-ons, and updates, for instance, to its firmware, software (e.g., including executable instructions, applications, program modules), and operating system.

According to one embodiment, the client computing entity 101A may include location determining aspects, devices, modules, functionalities, and/or similar words used herein interchangeably. For example, the client computing entity 101A may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information/data/data may be determined by triangulating the position in connection with a variety of other systems, including cellular towers, Wi-Fi access points, and/or the like. Similarly, the client computing entity 101A may include indoor positioning aspects, such as a location module adapted to acquire, for example, latitude, longitude, altitude, geocode, course, direction, heading, speed, time, date, and/or various other information/data. Some of the indoor aspects may use various position or location technologies including Radio-Frequency Identification (RFID) tags, indoor beacons or transmitters, Wi-Fi access points, cellular towers, nearby computing devices (e.g., smartphones, laptops) and/or the like. For instance, such technologies may include iBeacons, Gimbal proximity beacons, Bluetooth Low Energy (BLE) transmitters, Near Field Communication (NFC) transmitters, and/or the like. These indoor positioning aspects can be used in a variety of settings to determine the location of someone or something to within inches or centimeters.

The client computing entity 101A may also comprise a user interface comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the client computing entity 101A to cause display or audible presentation of information/data and for user interaction therewith via one or more user input interfaces. The user output interface may be updated dynamically from communication with the performance prediction computing entity 105. The user input interface can comprise any of a number of devices allowing the client computing entity 101A to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the client computing entity 101A and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the client computing entity 101A can collect information/data, user interaction/input, and/or the like.

The client computing entity 101A can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the client computing entities 101A-101N.

c. Exemplary Networks

In one embodiment, the networks 103 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 103 may have any suitable communication range associated therewith and may include, for example, global networks (e.g., the Internet), MANs, WANs, LANs, or PANs. In addition, the networks 103 may include medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms/systems provided by network providers or other entities.

Further, the networks 103 may utilize a variety of networking protocols including, but not limited to, TCP/IP based networking protocols. In some embodiments, the protocol is a custom protocol of JavaScript Object Notation (JSON) objects sent via a WebSocket channel. In some embodiments, the protocol is JSON over RPC, JSON over REST/HTTP, and/or the like.

III. EXEMPLARY OPERATION

Reference will now be made to FIGS. 4, 5, 6, 7, 8, 9, 10, 11, 12, 13, 14, 15, and 16, which provide flowcharts and diagrams illustrating example steps, processes, procedures, and/or operations associated with an example measurement device performance prediction platform/system and/or an example performance prediction computing entity in accordance with various embodiments of the present disclosure. FIGS. 17 and 18 provide example views of interactive user interfaces in accordance with various embodiments of the present disclosure.

While example embodiments of the present disclosure may be described in the context of measurement devices, a person of ordinary skill in the relevant technology will recognize that embodiments of the present disclosure are not limited to this context only. For example, various embodiments of the present disclosure can be implemented in apparatuses and devices that comprises at least one sensor, at least one processor, and/or the like.

a. Overview and Technical Advantages

Various embodiments of the present invention address technical challenges associated with increasing operational efficiency and reducing operational load of measurement systems. For example, various embodiments of the present disclosure provide an analytical capability to predict when measurement devices in measurement systems are likely to fail or not perform optimally, and provide enhanced insights on how to mitigate these failure risks. In this way, various embodiments of the present invention reduce the need for performing repeated measurements when an initial measurement is done using a failed measurement device, thus reducing the overall operational load on measurement systems and increasing operational efficiency of those systems. Accordingly, various embodiments of the present invention make important technical contributions to the fields of measurement system maintenance and measurement system management.

Measurement devices are critical in diagnosing chronic disease and managing patient health. Measurement devices may range from complex large scale analyzers in hospital labs to simple wearable devices that measure key patient vitals. Many medical decisions are made based at least in part on results generated by measurement devices.

As described above, example measurement devices can be highly complex devices that integrate technologies such as, but not limited to, electronics, electro/mechanical, microfluids calibrators/reagents, software/analytics, and/or the like. However, the more complex the measurement device is, the more prone it is to intermittent failure due to the complexity of integrating electronics, mechanics, fluidics, pneumatics, reagents, software and advanced analytical algorithms to produce diagnostic outputs. Given this complexity, it is technically challenging to predict when measurement devices are likely to have unexpected failure that can result in the such devices being down for periods of time when they are required for critical use in hospitals, provider offices or even on patients for continuous monitoring. As such, probabilistically predicting more accurately when these measurement devices are likely to have failure and preventing such failure from happening would provide not only technical advantages and benefits, but also significant benefits to healthcare operations.

Additionally, as measurement devices become more and more sophisticated, it becomes more and more important to make these measurement devices as reliable as possible. Being able to both predict, with better accuracy, when a device is likely to have a failure as well as why that failure is likely to occur allow healthcare operations to intervene early and avoid unnecessarily downtime, particularly in times where there is significant stress on healthcare systems. For example, during the Covid-19 pandemic, it is vital that unnecessary down time does not occur for critical measurement devices.

Additionally, or alternatively, a measurement device may provide non-optimal results due to, for example but not limited to, sensor drifts, and the accuracy of critical diagnostics can be impacted. For example, measurement devices that are highly complex can be extremely sensitive to internal device component drift/failure, can be extremely difficult to predict device non-optimal performance and failure, and can incur significant cost to the healthcare system when such devices fail or do not work optimally.

However, many systems and devices fail to overcome technical challenges and difficulties and fail to predict when and why a measurement device is likely to have a failure or why readings from the measurement device are non-optimal.

For example, some systems can only predict failure on measurement devices that are implemented in a non-complex way. For example, such systems may generate predictions in the form of measurement of simple analogue signals that are flagged as warnings once they begin to approach maximum and/or minimum thresholds. Using such an approach does not integrate how multiple aspects of the measurement device may impact or contribute to this specific failure.

As another example, some systems do not combine all the available data (structured and unstructured) within the device to predict in a multivariate capacity against the likelihood of failure. For example, such systems do not incorporate external information in relation to the device into any multivariate failure modeling solution, while many external inputs (e.g. ambient temperature, humidity and signals from external power supplies that power these devices) could be very useful in enabling better failure prediction.

As another example, some systems do not integrate process mining techniques into solutions to predict and prevent failure.

Various embodiments of the present disclosure overcome these technical challenges and difficulties, and provide various technical improvements and advantages.

For example, example embodiments of the present disclosure encode all available datasets (both structured and unstructured) into time series for predictive modeling. Example embodiments of the present disclosure generate a conformance score data object using device event sequence log information to estimate, in real time, how the operation of the device is relative to ideal performance. Example embodiments of the present disclosure extract interpretability from this model in real-time operations to suggest how this failure can be intervened before a hard fault occurs and healthcare operations are impacted.

Various embodiments of the present disclosure provide an analytical capability to predict when these devices are likely to fail or not perform optimally in relation to measurement results, and provide enhanced insights on how to mitigate these failure risks. For example, various embodiments of the present disclosure implement machine learning models, device specific signals, and event log data to enhance failure prediction of measurement devices. Various embodiments of the present disclosure provide an analytical capability to predict when these devices are likely to fail or not perform optimally, and guide interventions required to prevent such from happening. Various embodiments of the present disclosure provide multivariate RNN encoding to continuously track for failure/problem likelihood, include interpretability via attention layers to add feedback for proactive intervention on the device, and enable device-independent cloud-based capability to overcome various technical challenges and difficulties described herein.

For example, various embodiments of the present disclosure reduce unplanned failure of measurement devices, improve utilization, and reduce opportunities for misdiagnosis and non-optimal results by the measurement devices. Various embodiments of the present disclosure provide enhanced clinical performance and enhanced device productivity (e.g. less downtime), and insights to act upon to mitigate risks. Various embodiments of the present disclosure provide enhanced clinical outputs and significant opportunity to optimize lab diagnostic downtime.

As such, various embodiments of the present disclosure overcome technical challenges, deficiencies and problems associated with measurement devices, and provide various technical benefits, details of which are described herein.

b. Definitions

In the present disclosure, the term "measurement device" may refer to a device or a system that may detect, determine, measure, and/or calculate properties and/or characteristics of one or more medical samples that are taken or captured from a patient.

Examples of medical samples may be in solid form, liquid form, gaseous form, image form, and/or the like. For example, a medical sample may include, but not limited to, blood, urine, cerebrospinal fluid (CSF), saliva, bone marrow and/or the like. Additionally, or alternatively, an example medical sample may include, but not limited to, tissues obtained through a biopsy or surgical excision, skin samples taken from a biopsy or surgical excision, and/or the like. Additionally, or alternatively, an example medical sample may be exhaled breath from a user. Additionally, or alternatively, an example medical sample may include, but not limited to, an image of an organ of the patient. Additionally, or alternatively, an example medical sample may be in other forms.

Examples of properties and/or characteristics of one or more medical samples may include, for example but not limited to, identities and/or presence of biological substance, biochemical substance, and/or chemical substance of the medical samples, concentration levels of biological substance, biochemical substance, and/or chemical substance in the medical samples, sizes/structures of biological substance, biochemical substance, and/or chemical substance in the medical samples, and/or the like.

In some embodiments, an example measurement device may be implemented in medical laboratories, hospitals, forensic labs, and/or the like. In some embodiments, an example measurement device may provide intermediate and/or final healthcare diagnostic results that describe health conditions, health statuses, disease diagnostics, and/or the like of a patient, and/or may assist in providing intermediate and/or final healthcare diagnostic results.

For example, an example measurement device may be in the form of a chemistry analyzers, a biochemistry analyzer, a microbiology analyzer, a pharmacology analyzer, and/or the like that are used to calculate concentration levels of certain substances within medical samples such as, but not limited to, blood, urine and/or other body fluids. Substances analyzed through an example measurement device may include, but not limited to, certain metabolites, electrolytes, proteins, drugs, and/or the like.

As another example, an example measurement device may be, such as, but not limited to, a blood chemistry analyzer or a hematology analyzer (such as, but not limited to, Complete Blood Count (CBC) analyzers) that may detect, determine, measure, and/or calculate properties and/or characteristics of a medical sample in the form of blood (for example, but not limited to, Red Blood Cell (RBC) count of the blood, White Blood Cell (WBC) count of the blood, Platelet Count of the blood, concentration levels of analytes (e.g., cholesterol, electrolytes, glucose, calcium) in the blood, and/or the like).

While the description above provides examples of measurement devices, it is noted that the scope of the present disclosure is not limited to the description above.

For example, an example measurement device may be an electrocardiograph (ECG or EKG) machine, a breathalyzer device, a healthcare wearable (such as, but not limited to, smart watches that provide functionalities such as generating electrocardiogram), and/or the like. Additionally, or alternatively, an example measurement device may be implemented in settings other than medical laboratories (such as, but not limited to, at a patient's home and/or by a user directly).

Additionally, or alternatively, an example measurement device may be in other forms and/or implemented in other settings.

In the present disclosure, the term "data object" may refer to a data structure that comprises, represents, indicates, describes, and/or is associated with one or more attributes, functionalities and/or characteristics associated with data, information, and/or signals (such as non-transitory signals) in an example measurement device performance prediction platform/system. In some embodiments, a data object may be in the form of one or more regions in one or more data storage devices (such as, but not limited to, a non-transitory computer-readable storage medium) that comprise one or more values (such as, but not limited to, one or more identifiers, one or more metadata, and/or the like). In some embodiments, an example data object may comprise or be associated with one or more identifiers, one or more metadata, and/or one or more other data objects.

In accordance with various embodiments of the present disclosure, example data objects may be categorized based at least in part on their corresponding types and/structures.

For example, an example measurement device may be an automated analyzer that is powered by a power source. In some embodiments, an example measurement device may include one or more internal components and/or devices that are configured to generate and/or capture data/information/signals. In some embodiments, components and/or devices within a measurement device include, but not limited to, light source components/devices (such as laser), heat source components/devices (such as a heater), optical components/devices (such as lenses), actuator components/devices (such as motors), sensor components/devices (such as, but not limited to, vision and imaging sensors, gas and chemical sensors, photoelectric sensors, temperature sensors, radiation sensors, pressure sensors, position sensors, particle sensors, motion sensors, level sensors, proximity sensors, humidity sensors, force sensors, flow sensors, flame sensors, electrical sensors, voltage sensors, and/or the like). In some embodiments, components and/or devices within a measurement device include, but not limited to, computing device(s) such as, but not limited to, computers, processors, and/or the like.

Additionally, or alternatively, one or more components and/or devices (such as, but not limited to, sensor components/devices) may be positioned external to and in the same environment as an example measurement device and may be configured to generate and/or capture data/information/signals represents, indicates, describes, properties and/or characteristics of an external environment of the example measurement device.

In the present disclosure, the term "measurement device data object" may refer to a data structure that comprises, represents, indicates, describes, and/or is associated with data, information, and/or signals (such as non-transitory signals) that are generated and/or captured by one or more components and/or devices that are internal to an example measurement device, and/or one or more components and/or devices that are external to the example measurement device (for example, in the same environment as the example measurement device).

For example, an example data object may comprise, represent, indicate, describe, and/or is associated with data/information/signals that are generated and/or captured by sensor components/devices (such as, but not limited to, vision and imaging sensors, gas and chemical sensors, photoelectric sensors, temperature sensors, radiation sensors, pressure sensors, position sensors, particle sensors, motion sensors, level sensors, proximity sensors, humidity sensors, force sensors, flow sensors, flame sensors, electrical sensors, voltage sensors, and/or the like), computing devices, and/or the like.

In some embodiments, an example measurement device data object may comprise one or more alphabetical characters, one or more numerical characters, one or more alphanumeric characters, one or more American Standard Code for Information Interchange (ASCII) texts, one or more pointers, one or more memory addresses, and/or the like.

In the present disclosure, an example measurement device data object may be associated with, correspond to, and/or comprise one or more data objects, such as, but not limited to, analogue signal data objects, internal reading data objects, external reading data objects, event log data objects, and/or the like.

In the present disclosure, the term "analogue signal data object" may refer to a type of measurement device data object that comprises, represents, indicates, describes, and/or is associated with data, information, and/or signals (such as non-transitory signals) that are generated and/or captured by one or more components and/or devices that are internal and/or external to an example measurement device and are in analogue form.

For example, many measurement devices capture multiple Direct Current (DC) analogue signals and display them for performance monitoring purposes. As an example, an example measurement device may be continuously monitoring the current that drives a motor of the measurement device or a DC voltage that drives a light source for optical measurement of a medical sample to maintain a certain intensity. In some embodiments, any sudden shift or strong trends in these signals can impact operations of the measurement device. As such, analogue signal data objects can aid performance prediction of the measurement device (such as, but not limited to, predicting accuracy level of the measurement device, predicting failure likelihood of the measurement device, and/or the like).

In some embodiments, an example analogue signal data object may comprise one or more alphabetical characters, one or more numerical characters, one or more alphanumeric characters, one or more ASCII texts, one or more pointers, one or more memory addresses, and/or the like.

In the present disclosure, the term "internal reading data object" may refer to a type of measurement device data object that comprises, represents, indicates, describes, and/or is associated with data, information, and/or signals (such as non-transitory signals) that are generated and/or captured by one or more components and/or devices that are internal to an example measurement device and are in digital form.

For example, many measurement devices use multiple sensor measurements to ensure that operating conditions needed for the measurement device are maintained. As an example, an example measurement device may include pressure/vacuum sensors to ensure pneumatic operating conditions are met, thermistor readings from temperature chambers to ensure temperature conditions in reactor chambers are adequate, and/or the like. In some embodiments, trends in these types of signals over time can be a good indicator on whether potential failures of the measurement device are likely to occur. As such, internal reading data objects can aid performance prediction of the measurement device (such as, but not limited to, predicting accuracy level of the measurement device, predicting failure likelihood of the measurement device, and/or the like).

In some embodiments, an example internal reading data object may comprise one or more alphabetical characters, one or more numerical characters, one or more alphanumeric characters, one or more ASCII texts, one or more pointers, one or more memory addresses, and/or the like.

In the present disclosure, the term "external reading data object" may refer to a type of measurement device data object that comprises, represents, indicates, describes, and/or is associated with data, information, and/or signals (such as non-transitory signals) that are generated and/or captured by one or more components and/or devices that are external to an example measurement device and are in digital form.

For example, external reading data objects that are generated and/or captured by components and/or devices external to the measurement device can provide a host of information with respect to external operating environment/location of the measurement device, which can be used to aid performance prediction of the measurement device (such as, but not limited to, predicting accuracy level of the measurement device, predicting failure likelihood of the measurement device, and/or the like). Data, information, and/or signals (such as non-transitory signals) that are part of, represented by, indicated by, described by, and/or are associated with example external reading data objects include, but not limited to, temperature, humidity, atmospheric pressure, external device power supply signals, and/or the like.

In some embodiments, external reading data objects can be a useful addition to a multivariate predictive solution for predicting the performance of the measurement device (such as, but not limited to, predicting accuracy level of the measurement device, predicting failure likelihood of the measurement device, and/or the like).

As an example, an air dryer assembly may be used to remove moisture and particulates from compressed air that is used for operating pneumatics components of a measurement device for managing fluids/patient samples for measurement by the example measurement device. If there is too much moisture in the compressed air, then the corrosion of the pneumatic components might cause infantile failure and system leaks that could impact the integrity of the medical sample being analyzed. Additionally, the air dryer assembly may come under extreme stress when there is very high temperature and high humidity in the laboratory environment, so analyzing external reading data objects that comprise, represent, indicate, describe, and/or are associated with data, information, and/or signals (such as non-transitory signals) on moisture in the environment can be very important in predicting the performance of the measurement device (such as, but not limited to, predicting accuracy level of the measurement device, predicting failure likelihood of the measurement device, and/or the like). In some embodiments, the external reading data objects can be collected or generated in a structured format for incorporation into embodiments of the present disclosure.

In some embodiments, an example external reading data object may comprise one or more alphabetical characters, one or more numerical characters, one or more alphanumeric characters, one or more ASCII texts, one or more pointers, one or more memory addresses, and/or the like.

In the present disclosure, the term "event log data object" may refer to a type of measurement device data object that comprises, represents, indicates, describes, and/or is associated with data, information, and/or signals (such as non-transitory signals) that are generated and/or captured by one or more components and/or devices (such as processors) that are external and/or external to an example measurement device and describe one or more operation/performance events associated with the example measurement device.

For example, one or more components and/or devices that are internal to an example measurement device (such as a processor) may capture event information (in the form of event logs) and generate event log data objects as the example measurement device operates. In some embodiments, an event log data object captures a multitude of information such as, but not limited to, diagnostics results generated by the example measurement device, operation sequences executed by the example measurement device, warnings received/generated by the example measurement device, failures entered by the example measurement device, and/or the like. As such, event log data objects can aid performance prediction of measurement devices (such as, but not limited to, predicting accuracy level of the measurement device, predicting failure likelihood of the measurement device, and/or the like).

In some embodiments, an example event log data object can be in a structured data format. In some embodiments, an example event log data object can be in a semi-structured data format. In some embodiments, an example event log data object can be in a free text format that can entered by operators. In some embodiments, an example event log data object may comprise one or more alphabetical characters, one or more numerical characters, one or more alphanumeric characters, one or more ASCII texts, one or more pointers, one or more memory addresses, and/or the like.

In some embodiments, measurement device data objects (such as, but not limited to, analogue signal data objects, internal reading data objects, external reading data objects, and/or event log data objects) are associated with timecode indicators. In the present disclosure, the term "timecode indicator" may refer to an electronic indicator that comprises, represents, describes, indicates, and/or is associated with a time or a time interval in the format of a time stamp, a time code, and/or the like.

For example, the timecode indicator may be determined based at least in part on an example measurement device performance prediction platform/system's notion of the time and date as to when data, information, and/or signals (such as non-transitory signals) are generated and/or captured by one or more components and/or devices (such as sensors, processors). For example, such data, information, and/or signals (such as non-transitory signals) may be part of, represented by, indicated by, described by, and/or are associated with measurement device data objects (such as, but not limited to, analogue signal data objects, internal reading data objects, external reading data objects, and/or event log data objects). As such, a measurement device data object (such as, but not limited to, an analogue signal data object, an internal reading data object, an external reading data object, and/or an event log data object) is associated with a timecode indicator.

In some embodiments, the timecode indicator may comprise one or more alphabetical characters, one or more numerical characters, one or more alphanumeric characters, one or more ASCII texts, one or more pointers, one or more memory addresses, and/or the like.

In some embodiments, an example measurement device data object associated with a measurement device may be converted, transformed, and/or encoded to an example encoded measurement device data object based at least in part on a timecode indicator associated with the example measurement device data object and/or an "event encoding registry data object" associated with the example measurement device. In the present disclosure, the term "encoded measurement device data object" may refer to a measurement device data object that has been encoded based at least in part on a timecode indicator associated with the example measurement device data object and/or an event encoding registry data object.

In the present disclosure, the term "event encoding registry data object" may refer to a data object that comprises, represents, indicates, describes, and/or is associated with one or more encoding schema or dictionaries that define, describe, or indicate how to convert, transform, and/or encode data objects from different sources and/or associated with different formats (such as, but not limited to, analogue signal data objects, internal reading data objects, external reading data objects, event log data objects) into a unified form or format. For example, an example event encoding registry data object may indicate one or more colorations/ corresponding relationships between measurement device data objects and encoded measurement device data objects.

For example, an example event encoding registry data object may define, describe, or indicate how to convert, transform, and/or encode a measurement device data object that comprises one or more alphabetical strings and/or numerical strings into an event code. In such an example, the event encoding registry data object may provide an uniformed event code dictionary so that different types of measurement device data objects (such as, but not limited to, analogue signal data objects, internal reading data objects, external reading data objects, event log data objects) can be encoded uniformly into event codes, details of which are described herein.

For example, in the present disclosure, the term "encoded analogue signal data object" may refer to an analogue signal data object that has been encoded based at least in part on a timecode indicator associated with the analogue signal data object and/or the event encoding registry data object. The term "encoded internal reading data object" may refer to an internal reading data object that has been encoded based at least in part on a timecode indicator associated with internal reading data object and/or the event encoding registry data object. The term "encoded external reading data object" may refer to an external reading data object that has been encoded based at least in part on a timecode indicator associated with the external reading data object and/or the event encoding registry data object. The term "encoded event log data object" may refer to an event log data object that has been encoded based at least in part on a timecode indicator associated with the event log data object and/or the event encoding registry data object.

In the present disclosure, the term "encoded input data object" may refer to data objects that are encoded based at least in part on a timecode indicator associated with the data objects and/or the event encoding registry data object. In some embodiments, one or more encoded input data objects are provided to one or more machine learning models as inputs. For example, example encoded input data objects may be provided as inputs to a machine learning model, and the machine learning model may generate predictive performance data objects and predictive weight data objects, details of which are described herein.

In some embodiments, encoded input data objects include, but not limited to, encoded measurement device data objects (such as, but not limited to, one or more encoded analogue signal data objects, one or more encoded internal reading data objects, one or more encoded external reading data objects, or one or more encoded event log data objects). Additionally, or alternatively, encoded input data objects include one or more encoded conformance score data objects.

In the present disclosure, the term "encoded conformance score data object" may refer to a conformance score data object that is encoded based at least in part on a timecode indicator associated with the conformance score data object and/or an event encoding registry data object. In the present disclosure, the term "conformance score data object" may refer to a data object that comprises, represents, indicates, describes, and/or is associated with an operation conformance level associated with an example measurement device. In the present disclosure, the term "operation conformance level" may refer to or indicate a level or a degree of the actual operations of a measurement device in conforming to or being in compliance with optimal operations of the measurement device.

In the present disclosure, the term "encoded device operation data object" may refer to a device operation data object that is encoded based at least in part on a timecode indicator associated with the device operation data object and/or an event encoding registry data object. In the present disclosure, the term "device operation data object" may refer to a data object that comprises, represents, indicates, describes, and/or is associated with an operation event that is associated with or conducted by an example measurement device.

In some embodiments, an example measurement device may conduct an ordered sequence of operation events in order to detect, determine, measure, and/or calculate properties and/or characteristics of one or more medical samples that are taken or captured from a patient as described above. An example device operation data object may be generated for each operation event in the ordered sequence of operation events. An example conformance score data object may be generated and indicate or describe a level or a degree to which an operation event or the ordered sequence of operation events indicates that the measurement device has taken a good, optimal operation path or a bad, sub-optimal operation path when detecting, determining, measuring, and/or calculating properties and/or characteristics of medical samples.

For example, example embodiments of the present disclosure may generate a conformance score data object associated with a CBC analyzer. Similar to other measurement devices, an example CBC analyzer may provide an end-to-end analytical cycle that comprises operation events. As an example, actual operation events and their actual sequence of an example CBC analyzer may include, but are not limited to, the following:

1) mechanical preparation and presentation of a blood sample;
2) pneumatic aspiration steps;
3) sample mix with reagents steps;
4) sample heating and parallel pneumatic presentation of the sample for optical characterization i.e. RBC, WBC and HGB
5) cell characterization through direct flow cytometry; and
6) pneumatic sample waste removal and cleaning.

In this example, one or more encoded device operation data objects are generated for each of these actual operation events, and an ordered sequence of encoded device operation data objects may be determined based at least in part on the actual sequence of the operation events listed above.

In some embodiments, encoded device operation data objects are provided to a generative adversarial network (GAN) machine learning model as inputs, and the GAN machine learning model generates a conformance score data object or an encoded conformance score data object as an output.

In the present disclosure, the terms "generative adversarial network (GAN) machine learning model" or a "GAN machine learning model" may refer to a type of machine learning model that comprises two sub-machine-learning-models (such as two artificial neural networks) competing with each other to become more accurate in generating their corresponding predictions.

For example, an example GAN machine learning model includes at least one "generator component" and at least one "discriminator component."

In some embodiments, the generator component may be in the form of a sub-machine-learning-model (such as an artificial neural network) that generates synthetic device operation data objects. In the present disclosure, the term "synthetic device operation data object" may refer to a type of device operation data object that is generated by a generator component of a GAN machine learning model. In some embodiments, synthetic device operation data objects describe "fake" operation events associated with a measurement device for the purpose of training the discriminator component of the GAN machine learning model.

In some embodiments, the discriminator component may be in the form of a sub-machine-learning-model (such as an artificial neural network) that generates synthetic conformance score data objects. In the present disclosure, the term "synthetic conformance score data object" may refer to a type of conformance score data object that is generated by a discriminator component of a GAN machine learning model based at least in part on synthetic device operation data objects. In some embodiments, synthetic conformance score data objects indicate a predicted conformation level associated with the "fake" operation events as indicated by the synthetic device operation data objects.

As illustrated above, one of the goals of the discriminator component in a GAN machine learning model is to train an artificial neural network model (such as a binary classification neural network model) that can predict whether the ordered sequence of encoded device operation data objects describe a good, optimal path of operations conducted by the measurement device or a bad, sub-optimal path of operations conducted by the measurement device. One of the goals of the generator component is to learn/train to create synthetic device operation data objects that can pass as "good paths" despite being synthetic. This combination/tandem training results in a discriminator component that becomes increasingly sophisticated at determining conformance levels (for example, what is a good, optimal path that conforms to intended behaviors of the measurement device), additional details of which are described herein.

As described above, example encoded input data objects may be provided as inputs to a machine learning model. Examples of such a machine learning model may include, but are not limited to, a bidirectional recurrent neural networks (RNN) machine learning model.

In the present disclosure, the terms "recurrent neural networks machine learning model" or "RNN machine learning model" may refer to a type of artificial neural networks where the nodes are connected temporally, allowing the time series characteristics of input data objects of the RNN machine learning model to be captured and analyzed when the RNN machine learning model generates a prediction. For example, connections between nodes in an example RNN machine learning model may form a directed graph along a temporal sequence, allowing it to exhibit temporal dynamic behavior.

In the present disclosure, the terms "bidirectional recurrent neural networks machine learning model" or "bidirectional RNN machine learning model" may refer to a type of RNN machine learning model that comprises two connected hidden layers of nodes that have opposite directions to the same output layer. For example, input data objects may be fed to a bidirectional RNN machine learning model in a normal time order through a first hidden layer and in a reverse time order through a second hidden layer. Because both layers are connected to the same output layer, a bidirectional RNN machine learning model can capture and analyze both backward and forward time series characteristics of input data objects at every time interval.

In the present disclosure, the terms "bidirectional long short term memory machine learning model" or "bidirectional LSTM machine learning model" may refer to a type of bidirectional RNN machine learning model that comprises long short-term memory (LSTM) units. In particular, an example LSTM unit may include a cell, an input gate, an output gate and a forget gate. The cell may remember values over arbitrary time intervals and the three gates (input gate, an output gate and a forget gate) regulate the flow of information into and out of the cell.

As described above, an example machine learning model (such as a bidirectional RNN machine learning model) may generate predictive performance data objects and predictive weight data objects. In the present disclosure, the term "predictive performance data object" may refer to a type of data object that comprises, represents, indicates, describes, and/or is associated with a predicted likelihood of a state/characteristic associated with the performance of a measurement device. Examples of the state/characteristic associated with the performance of the measurement device include, but not limited to, accuracy level of the measurement device, variances of results generated by the measurement device, success/failure of the measurement device in performing its tasks, and/or the like.

For example, an example predictive performance data object may comprise, represent, indicate, describe, and/or is associated with a predicted accuracy level associated with properties and/or characteristics of one or more medical samples as detected, determined, measured, and/or calculated by the example measurement device. Additionally, or alternatively, an example predictive performance data object may comprise, represent, indicate, describe, and/or is associated with a predicted failure likelihood of the measurement device in detecting, determining, measuring, and/or calculating properties and/or characteristics of one or more medical samples.

In the present disclosure, the terms "attention layer" or "attention model" refer to a machine learning model/mechanism that is a part of a machine learning model (such as, but not limited to, GAN machine learning models, RNN machine learning models, bidirectional RNN machine learning models, bidirectional LSTM machine learning models) to calculate an attention weight of each input data object provided to the machine learning model. In some embodiments, an attention weight may quantitatively indicate how much an input data object contributes to or affects the predicted likelihood that a predicted outcome/state/characteristic has happened or will happen as generated by a machine learning model. For example, an attention weight may show that an input data object increases or decreases the likelihood that such an outcome has happened or will happen.

In various embodiments the present disclosure, example attention layers/models may be in various forms and/or implemented through various ways. For example, an example attention layer/model may calculate attention vectors showing how strong each input data object is correlated with other input data objects and/or with the output data object generated by the machine learning model, calculate a sum of attention vectors, and determine the weight of each attention vector in the sum as the attention weight.

While the description above provides an example of attention layer/model, it is noted that the scope of the present disclosure is not limited to the description above. In some examples, an example attention layer/model may be in other forms and/or implemented in other ways.

In the present disclosure, the term "conformance weight data object" may refer to a data object that is generated by one or more attention layers of a machine learning model (such as, but not limited to, a GAN machine learning model) and quantitatively indicates how much an encoded device operation data object contributes to or affects the conformance level indicated by a conformance score data object that is generated by the machine learning model.

In the present disclosure, the term "predictive weight data object" may refer to a data object that is generated by one or more attention layers of a machine learning model (such as, but not limited to, a bidirectional LSTM machine learning model) and quantitatively indicates how much an input data object (such as, but not limited to, an encoded input data object, an encoded conformance score data object, and/or the like) contributes to or affects the predicted likelihood of a state/characteristic (e.g. accuracy level, failure likelihood) associated with the performance of a measurement device that is indicated by a predictive performance data object as generated by the machine learning model.

In some embodiments, to generate predictive performance data objects and/or predictive weight data objects, an example machine learning model (such as a bidirectional RNN machine learning model) may be trained using training encoded input data objects. In the present disclosure, the term "training encoded input data object" may refer to a type of encoded input data object that may be generated or retrieved for training a machine learning model in generating predictive performance data objects and/or predictive weight data objects. In the present disclosure, the term "training encoded measurement device data object" may refer to a type of encoded measurement device data object that may be generated or retrieved for training a machine learning model in generating predictive performance data objects and/or predictive weight data objects. In the present disclosure, the term "training encoded conformance score data object" may refer to a type of encoded measurement device data object that may be generated or retrieved for training a machine learning model in generating predictive performance data objects and/or predictive weight data objects.

For example, each training encoded input data object (e.g. training encoded measurement device data object, training encoded conformance score data object, etc.) may be associated with a corresponding training predictive performance data object, which may comprise, represent, indicates, describe, and/or is associated with a known performance state of a measurement device.

As an example, an example training predictive performance data object may be associated with a known accuracy level of properties and/or characteristics of one or more medical samples as detected, determined, measured, and/or calculated by an example measurement device. As such, an example machine learning model (such as a bidirectional LSTM machine learning model) trained based at least in part on training encoded input data objects associated with such training predictive performance data object may generate, based at least in part on encoded input data objects, predictive performance data objects that predicts accuracy levels associated with properties and/or characteristics of one or more medical samples as detected, determined, measured, and/or calculated by the example measurement device, and/or may generate predictive weight data objects that indicates a predict accuracy contributing factor for each encoded input data object and describes how each encoded input data object contributes to or affects the accuracy levels associated with the properties and/or characteristics of one or more medical samples as detected, determined, measured, and/or calculated by the example measurement device.

Additionally, or alternatively, an example training predictive performance data object may be associated with a known failure likelihood of the measurement device in detecting, determining, measuring, and/or calculating properties and/or characteristics of one or more medical samples. As such, an example machine learning model (such as a bidirectional LSTM machine learning model) trained based at least in part on training encoded input data objects associated with such training predictive performance data object may generate, based at least in part on encoded input data objects, predictive performance data objects that predict failure likelihood of the measurement device in detecting, determining, measuring, and/or calculating properties and/or characteristics of one or more medical samples, and/or may generate predictive weight data objects that indicates a predicted failure contributing factor for each encoded input data object and describes how each encoded input data object contributes to or affects the failure likelihood of the measurement device in detecting, determining, measuring, and/or calculating properties and/or characteristics of one or more medical samples.

Additionally, or alternatively, an example training predictive performance data object may be associated with other known performance state of a measurement device, and an example machine learning model (such as a bidirectional LSTM machine learning model) trained based at least in part on training encoded input data objects associated with such training predictive performance data object may generate, based at least in part on encoded input data objects, predictive performance data objects that predict the likelihood of such known performance state of the measurement device, and/or generate predictive weight data objects that each indicates a predicted contributing factor for each encoded input data object and describes how each encoded input data object contributes to or affects such likelihood.

In the present disclosure, the term "prediction-based action" may refer to one or more computer operations based at least in part on one or more predictive performance data objects and/or one or more predictive weight data objects.

In the present disclosure, the term "graph data object" may refer to data objects that are generated based at least in part on one or more data objects described herein and can be rendered for displaying on a user interface (for example, a user interface on a display of a client computing entity). For example, an example "overall graph data object" may be generated based at least in part on a predictive performance data object. Additionally, or alternatively, an example "weight graph data object" may be generated based at least in part on a predictive weight data object. Additional details and examples of overall graph data objects and weight graph data objects are described herein.

c. Exemplary Techniques for Generating Predictive Performance Data Objects and Predictive Weight Data Objects As described above, there are technical challenges, deficiencies and problems associated with measurement devices, and various example embodiments of the present disclosure overcome such challenges. For example, referring now to FIG. 4, an example method 400 of generating predictive performance data objects and predictive weight data objects in accordance with embodiments of the present disclosure is illustrated.

For example, the example method 400 generates a plurality of encoded input data objects associated with a measurement device. In some embodiments, the example method 400 generates a predictive performance data object associated with the measurement device and a plurality of predictive weight data objects based at least in part on the plurality of encoded input data objects using at least a bidirectional RNN machine learning model. As such, the example method 400 may, for example but not limited to, programmatically predict the performance of measurement devices so as to reduce unplanned failure and non-optimal results by the measurement devices.

Figure 4:
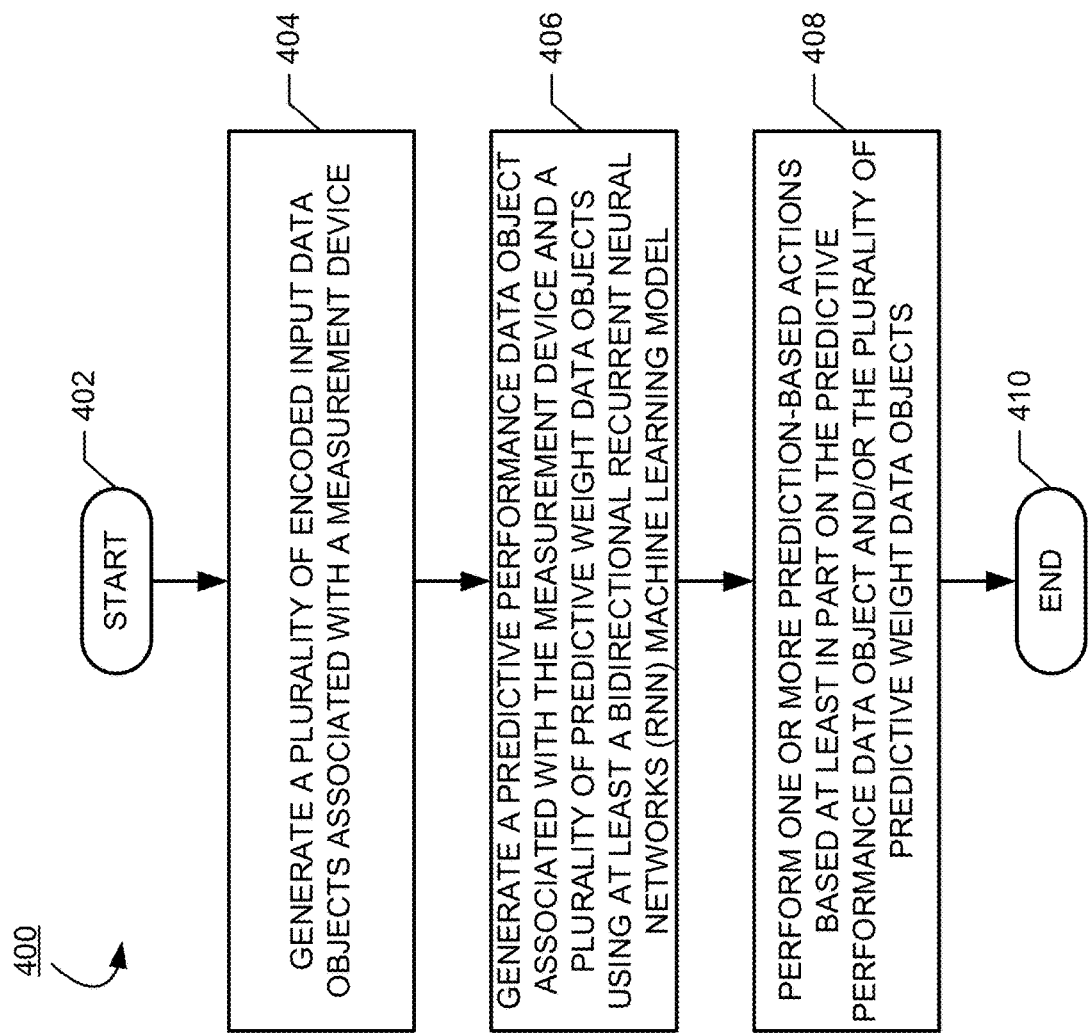

As shown in FIG. 4, the example method 400 starts at step/operation 402. Subsequent to and/or in response to step/operation 402, the example method 400 proceeds to step/operation 404. At step/operation 404, a computing entity (such as the performance prediction computing entity 105 described above in connection with FIG. 1 and FIG. 2) may include means (such as the processing element 205 of the performance prediction computing entity 105 described above in connection with FIG. 2) to generate a plurality of encoded input data objects associated with a measurement device (e.g., a medical analyzer device).

In some embodiments, the plurality of encoded input data objects comprises the plurality of encoded measurement device data objects and the at least one encoded conformance score data object.

As described above, an encoded measurement device data object refers to a measurement device data object that has been encoded based at least in part on a timecode indicator associated with the example measurement device data object and/or the event encoding registry data object. As such, to generate encoded measurement device data objects, the computing entity may first collect, retrieve, and/or generate a measurement device data object, and then encode the measurement device data object based at least in part on the timecode indicator associated with the example measurement device data object and/or the event encoding registry data object.

In some embodiments, during encoding, the computing entity may first utilize the event encoding registry data object to convert, transform, and/or encode measurement device data objects that comprise one or more alphabetical strings and/or numerical strings into event codes. Subsequently, the computing entity may determine timecode indicators associated with measurement device data objects, and further encode the event codes generated based at least in part on the measurement device data objects with timecode indicators. As such, the encoded measurement device data objects capture not only data and/or signals (such as non-transitory signals) that are generated and/or captured by one or more components and/or devices that are external or internal to an example measurement device, but also temporal information as to when such data and/or signals (such as non-transitory signals) that are generated and/or captured by the one or more components and/or devices.

Figure 10:
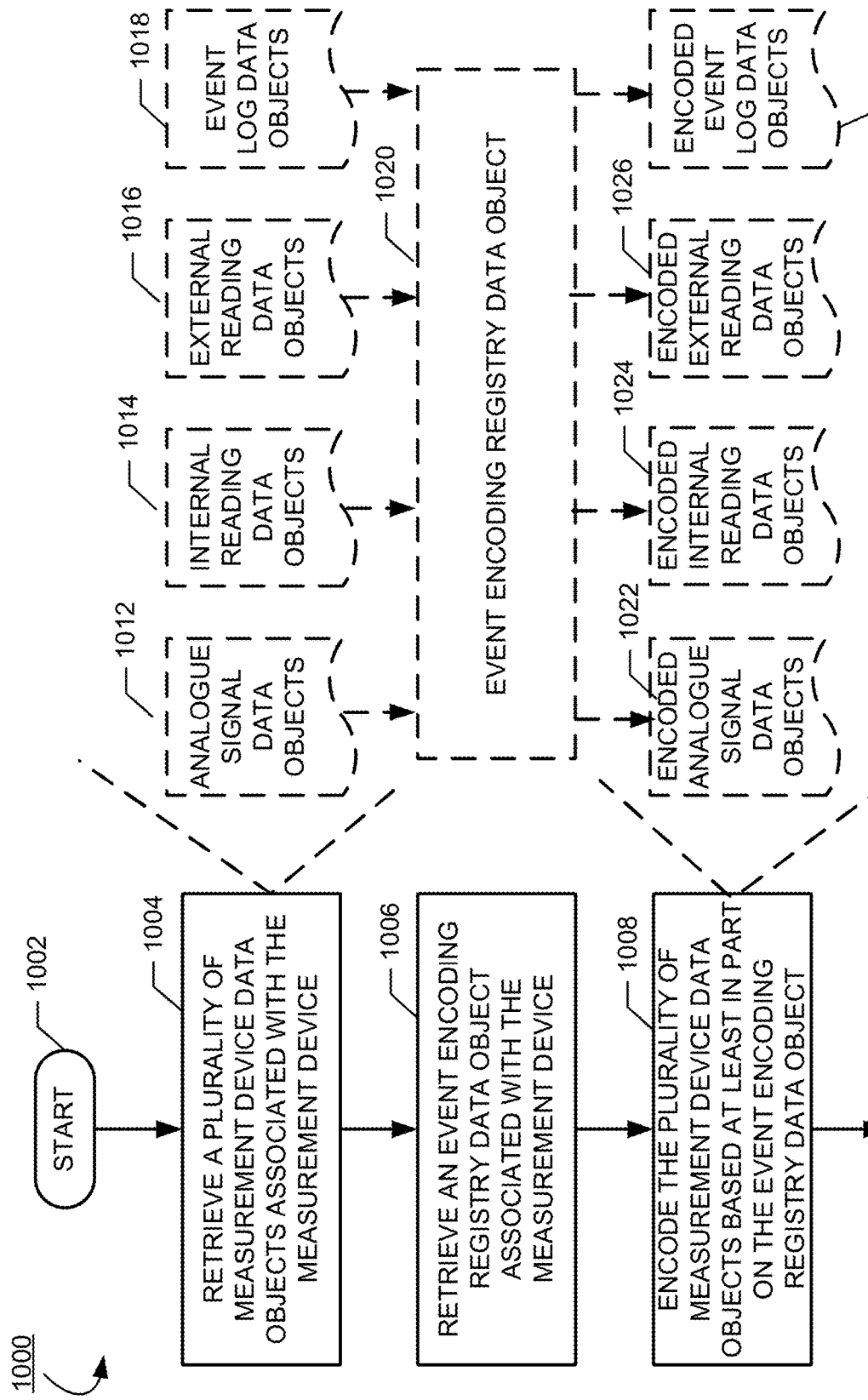
Figure 11:
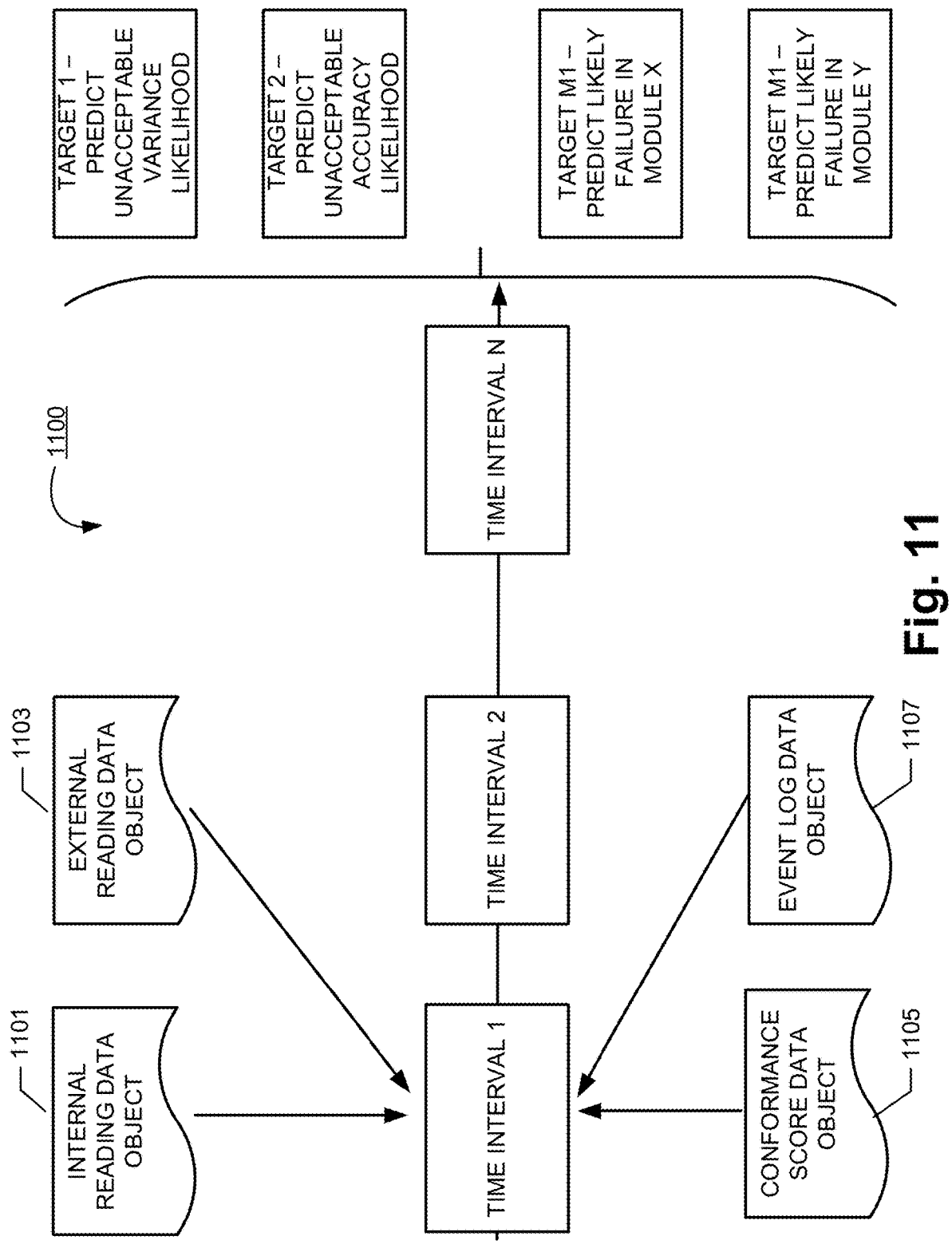

Additional details associated with collecting, retrieving, and/or generating measurement device data objects, as well as encoding measurement device data objects, are illustrated and described in detail herein, including, but not limited to, in connection with at least FIG. 10 and FIG. 11.

Similarly, as described above, an encoded conformance score data object refers to a conformance score data object that is encoded based at least in part on a timecode indicator associated with the conformance score data object and/or an event encoding registry data object. As such, to generate encoded conformance score data objects, the computing entity may first generate a conformance score data object, and then encode the conformance score data object based at least in part on the timecode indicator associated with the conformance score data object.

For example, the conformance score data object generated by the computing entity may comprise, represent, indicate, describe, and/or is associated with an operation conformance level associated with an example measurement device. For example, the conformance score data object may indicate whether operation events associated with a measurement device indicate that the measurement device has taken an optimal, good path or a sub-optimal, bad path, and/or indicate the level or degree as to being in compliance with optimal operations of the measurement device. The computing entity may further encode the conformance score data object based at least in part on a timecode indicator associated with the conformance score data object. As such, the encoded conformance score data object captures not only the conformance level of the measurement device, but also temporal information as to which point in time such conformance level is determined for.

Figure 8:
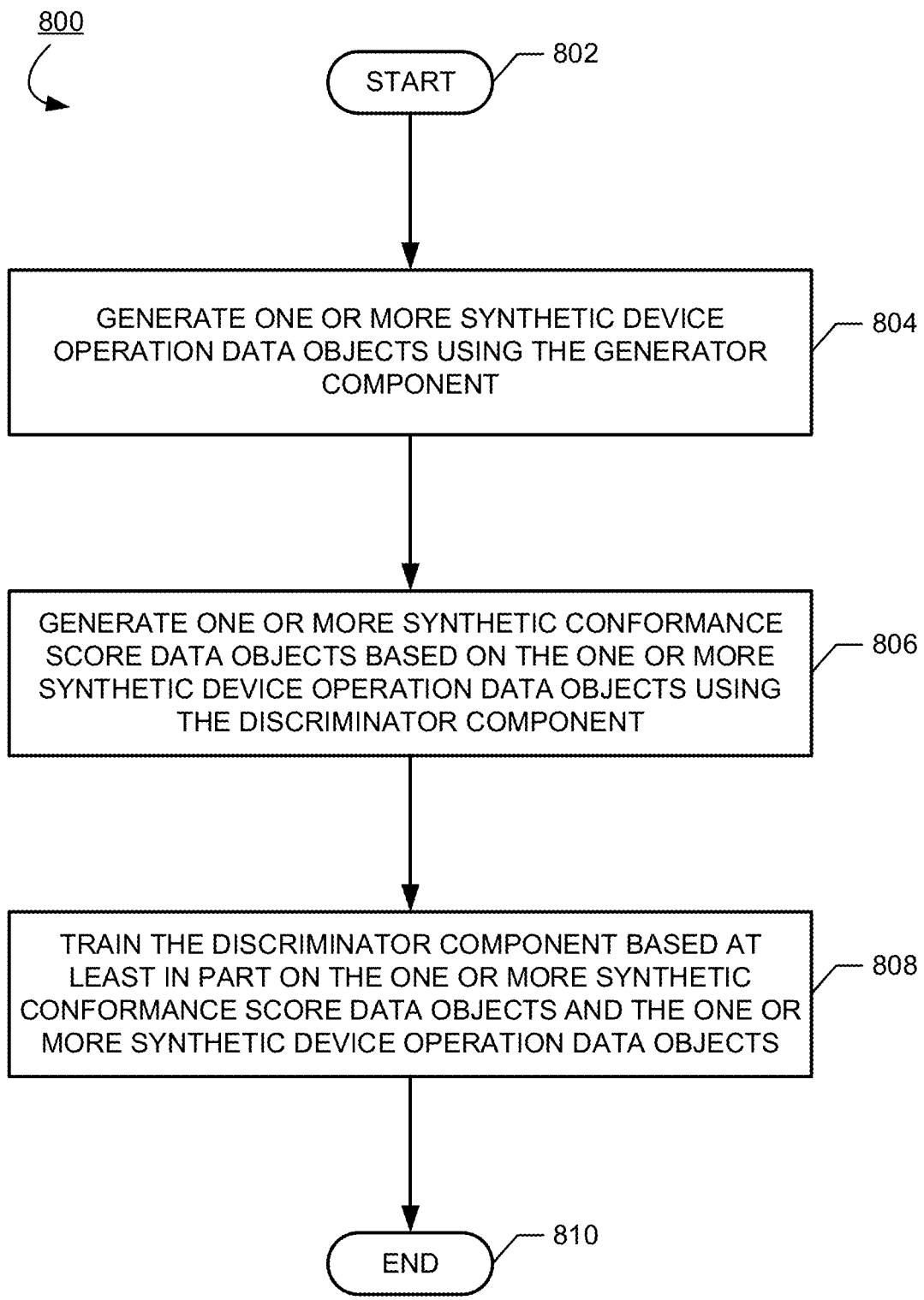

Additional details associated with generating conformance score data objects are illustrated and described in detail herein, including, but not limited to, in connection with at least FIG. 8. Additional details associated with encoding conformance score data objects are illustrated and described in detail herein, including, but not limited to, in connection with at least FIG. 10 and FIG. 11.

Referring back to FIG. 4, subsequent to and/or in response to step/operation 404, the example method 400 proceeds to step/operation 406. At step/operation 406, a computing entity (such as the performance prediction computing entity 105 described above in connection with FIG. 1 and FIG. 2) may include means (such as the processing element 205 of the performance prediction computing entity 105 described above in connection with FIG. 2) to generate, using at least a bidirectional RNN machine learning model, a predictive performance data object associated with the measurement device and a plurality of predictive weight data objects associated with the predictive performance data object.

As described above, the predictive performance data object may comprise, represent, indicate, describe, and/or is associated with a predicted likelihood of a state/characteristic associated with the performance of a measurement device. For example, the predictive performance data object may indicate an accuracy level of readings from the measurement device (e.g. a likelihood that the reading is accurate). Additionally, or alternatively, the predictive performance data object may indicate a failure likelihood of the measurement device (e.g. a likelihood that there is or will be an unplanned failure of the measurement device).

In some embodiments, the bidirectional RNN machine learning model may be a bidirectional LSTM machine learning model with attention layers. As described above, the encoded input data objects generated at step/operation 404 (including, but not limited to, encoded measurement device data objects and encoded conformance score data objects) capture temporal information, which provide time series characteristic associated with data and/or signals (such as non-transitory signals) that are generated and/or captured by one or more components and/or devices that are external or internal to an example measurement device and/or time series characteristic associated with the conformance level of the measurement device.

As described above, a bidirectional LSTM machine learning model is a type of RNN architecture that is bidirectional and includes LSTM units. As such, an example bidirectional LSTM machine learning model may comprise nodes are connected temporally (e.g. RNN), two connected hidden layers of nodes have opposite directions to the same output layer to capture and analyze both backward and forward time series characteristics of input data objects at every time interval (e.g. bidirectional), and LSTM units that remember values over arbitrary time intervals. As such, an example bidirectional LSTM machine learning model in accordance with various embodiments of the present disclosure may capture time series characteristic and interpretability from the encoded input data objects to suggest intervention opportunities by, for example but not limited to, generating predictive performance data objects that predict, for example but not limited to, reading accuracy levels, unplanned failures, and/or the like.

In some embodiments, an example bidirectional LSTM machine learning model in accordance with various embodiments of the present disclosure may include attention layers/mechanisms that determine/calculate attention weights associated with each of the encoded measurement device data objects. The attention weights indicate the contribution of each encoded measurement device data object (for example, an event code such as "low temperature reactor chamber warning on 10:13 2020-12-12") to the predictive performance data object (for example, a final output value or outcome such as device failure).

In some embodiments, the computing entity may train a machine learning model (such as a bidirectional LSTM machine learning model) to generate predictive performance data objects. For example, the computing entity may provide training encoded input data objects associated with a training predictive performance data object indicating a known accuracy level to the machine learning model so that the machine learning model can generate predictive performance data object indicating a predicted accuracy level, details of which are described in connection with at least FIG. 12 and FIG. 13. Additionally, or alternatively, the computing entity may provide training encoded input data objects associated with a training predictive performance data object indicating a known failure likelihood to the machine learning model so that the machine learning model can generate predictive performance data object indicating a predicted failure likelihood, details of which are described in connection with at least FIG. 14 and FIG. 15.

In some embodiments, the computing entity may train a machine learning model (such as a bidirectional LSTM machine learning model) using encoded measurement device data objects associated with N time intervals prior to inaccurate reading or device failure, details of which are described in connection with at least FIG. 11.

Similar to those described above, the attention layers of the machine learning model may be trained to generate attention weights.

As such, various embodiments of the present disclosure integrate data objects from various sources associated with a measurement device and encoded with temporal information, apply time series predictive modeling using a bidirectional LSTM machine learning model with attention layers that has been trained to identify specific failure mode associated with the measurement device while also enabling model attention weight extraction to enable early detection and proactive device intervention before failure, thereby overcoming technical challenges, deficiencies and problems associated with measurement devices and providing technical benefits and advantages.

Referring back to FIG. 4, subsequent to and/or in response to step/operation 406, the example method 400 proceeds to step/operation 408. At step/operation 408, a computing entity (such as the performance prediction computing entity 105 described above in connection with FIG. 1 and FIG. 2) may include means (such as the processing element 205 of the performance prediction computing entity 105 described above in connection with FIG. 2) to perform one or more prediction-based actions based at least in part on the predictive performance data object and/or the plurality of predictive weight data objects.

In some embodiments, prediction-based actions may include, but not limited to, rendering one or more graph data objects based at least in part on the predictive performance data object and/or the plurality of predictive weight data objects.

As an example, various embodiments of the present disclosure provide visualization of conformance level of the measurement device and/or the probabilistic likelihoods of the fully integrated predictive failure signal of the measurement device through time, as well as the attention weights that show contributions towards likely failure, thereby guiding user intervention. Additional details are illustrated and described in connection with at least FIG. 16 to FIG. 18.

Referring back to FIG. 4, subsequent to and/or in response to step/operation 408, the example method 400 proceeds to step/operation 410 and ends.

While various embodiments described herein are in the context of a measurement device, it is noted that the scope of the present disclosure is not limited to this context only. For example, various embodiments of the present disclosure can be implemented in any device that records information associated with the device (e.g. event log) and provide real-time values that can be encoded and provided as inputs to various machine learning models described herein.

Additionally, or alternatively, various embodiments of the present disclosure can be structured to be internal to the device software or as an external capability for remote monitoring.

Additionally, or alternatively, various embodiments of the present disclosure may implement other ways to structure the prediction task (e.g. prediction of a specific failure or group of failures). Additionally, or alternatively, the predicted output can also be potentially utilized to prioritize maintenance of lab diagnostics and resources.

As described above, there are technical challenges, deficiencies and problems associated with measurement devices, and various example embodiments of the present disclosure overcome such challenges. For example, referring now to FIG. 5, an example method 500 of generating a plurality of encoded input data objects associated with a measurement device in connection with at least step/operation 404 of FIG. 4 and in accordance with embodiments of the present disclosure is illustrated.

For example, the example method 500 generates a plurality of encoded measurement device data objects associated with the measurement device. In some embodiments, the example method 500 generates at least one encoded conformance score data object using at least a Generative Adversarial Network (GAN) machine learning model. As such, the example method 500 may, for example but not limited to, programmatically predict the performance of measurement devices so as to reduce unplanned failure and non-optimal results by measurement devices.

Figure 5:
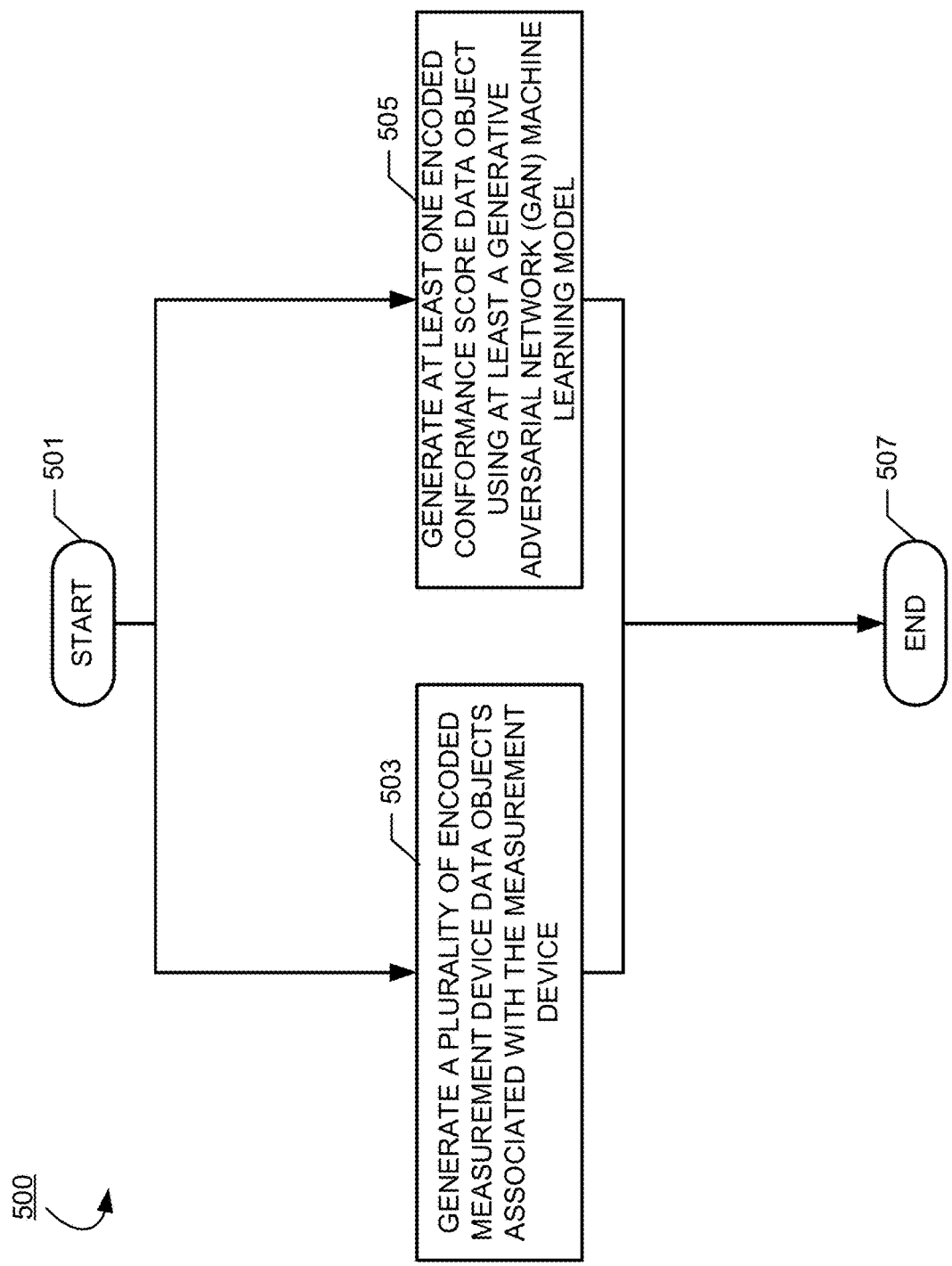

As shown in FIG. 5, the example method 500 starts at step/operation 501. Subsequent to and/or in response to step/operation 501, the example method 500 proceeds to step/operation 503. At step/operation 503, a computing entity (such as the performance prediction computing entity 105 described above in connection with FIG. 1 and FIG. 2) may include means (such as the processing element 205 of the performance prediction computing entity 105 described above in connection with FIG. 2) to generate a plurality of encoded measurement device data objects associated with the measurement device.

In some embodiments, the plurality of encoded measurement device data objects comprises one or more encoded analogue signal data objects, one or more encoded internal reading data objects, one or more encoded external reading data objects, and/or one or more encoded event log data objects.

For example, the plurality of encoded measurement device data objects may include encoded analogue signal data objects. Each of the encoded analogue signal data objects comprises, represents, indicates, describes, and/or is associated with data, information, and/or signals (such as non-transitory signals) that are generated and/or captured by one or more components and/or devices that are internal and/or external to an example measurement device and are in analogue form, as well as temporal information as to when such data, information, and/or signals (such as non-transitory signals) that are generated and/or captured.

Additionally, or alternatively, the plurality of encoded measurement device data objects may include encoded internal reading data objects. Each of the encoded internal reading data objects comprises, represents, indicates, describes, and/or is associated with data, information, and/or signals (such as non-transitory signals) that are generated and/or captured by one or more components and/or devices that are internal to an example measurement device and are in digital form, as well as temporal information as to when such data, information, and/or signals (such as non-transitory signals) that are generated and/or captured.

Additionally, or alternatively, the plurality of encoded measurement device data objects may include encoded external reading data objects. Each of the encoded external reading data objects comprises, represents, indicates, describes, and/or is associated with data, information, and/or signals (such as non-transitory signals) that are generated and/or captured by one or more components and/or devices that are external to an example measurement device and are in digital form, as well as temporal information as to when such data, information, and/or signals (such as non-transitory signals) that are generated and/or captured.

Additionally, or alternatively, the plurality of encoded measurement device data objects may include encoded event log data objects. Each of the encoded event log data objects comprises, represents, indicates, describes, and/or is associated with data, information, and/or signals (such as non-transitory signals) that are generated and/or captured by one or more components and/or devices (such as processors) that are internal and/or external to an example measurement device and describe one or more operational/performance events associated with the example measurement device, as well as temporal information as to when such data, information, and/or signals (such as non-transitory signals) that are generated and/or captured.

Referring back to FIG. 5, subsequent to and/or in response to step/operation 501, the example method 500 proceeds to step/operation 505. At step/operation 505, a computing entity (such as the performance prediction computing entity 105 described above in connection with FIG. 1 and FIG. 2) may include means (such as the processing element 205 of the performance prediction computing entity 105 described above in connection with FIG. 2) to generate at least one encoded conformance score data object using at least a GAN machine learning model. Exemplary techniques for generating an encoded conformance score data object are described in subsection (e) of the present section or in U.S. patent application Ser. No. 17/196,543, filed Mar. 9, 2021, which is incorporated herein by reference in its entirety.

In some embodiments, the computing entity generates at least one encoded conformance score data object based at least in part on one or more encoded device operation data objects from an ordered sequence of encoded device operation data objects that are associated with the measurement device.

For example, the GAN machine learning model may comprise at least one generator component and at least one discriminator component, and the computing entity may train the at least one generator component and/or the at least one discriminator component of the GAN machine learning model to generate a conformance score data object, details of which are described in connection with at least FIG. 8 and FIG. 9.

In some embodiments, subsequent to training the GAN machine learning model, the computing entity may provide one or more encoded device operation data objects from an ordered sequence of encoded device operation data objects that are associated with the measurement device to the at least one GAN machine learning model. As described above, an example measurement device may conduct an ordered sequence of operation events in order to detect, determine, measure, and/or calculate properties and/or characteristics of one or more medical samples that are taken or captured from a patient as described above. An example device operation data object may be generated for each operation event in the ordered sequence of operation events and be encoded with a corresponding timecode indicator to generate the encoded device operation data object.

In some embodiments, based at least in part on the encoded device operation data objects, the GAN machine learning model may generate at least one conformance score data object indicating an operation conformance level of operation events associated with the measurement device. Subsequently, the machine learning model may encode the at least conformance score data object based at least in part on a timecode indicator associated with the at least conformance score data object and/or an event encoding registry data object to generate an encoded conformance score data object.

In some embodiments, the plurality of encoded measurement device data objects generated at step/operation 503 of FIG. 5 and/or the at least one encoded conformance score data object generated at step/operation 505 of FIG. 5 are part of the encoded input data objects associated with a measurement device generated at step/operation 404 of FIG. 4.

Referring back to FIG. 5, subsequent to and/or in response to step/operation 503 and/or step/operation 505, the example method 500 proceeds to step/operation 507 and ends.

As described above, there are technical challenges, deficiencies and problems associated with measurement devices, and various example embodiments of the present disclosure overcome such challenges. For example, referring now to FIG. 6, an example method 600 of generating predictive performance data objects associated with a measurement device and generating predictive weight data objects in connection with at least step/operation 406 of FIG. 4 and in accordance with embodiments of the present disclosure is illustrated.

For example, the example method 600 generates the predictive performance data object based at least in part on the plurality of encoded input data objects. In some embodiments, the example method 600 generates, for each of the plurality of encoded input data objects, a corresponding predictive weight data object. As such, the example method 600 may, for example but not limited to, programmatically predict the performance of measurement devices so as to reduce unplanned failure and non-optimal results by the measurement devices.

Figure 6:
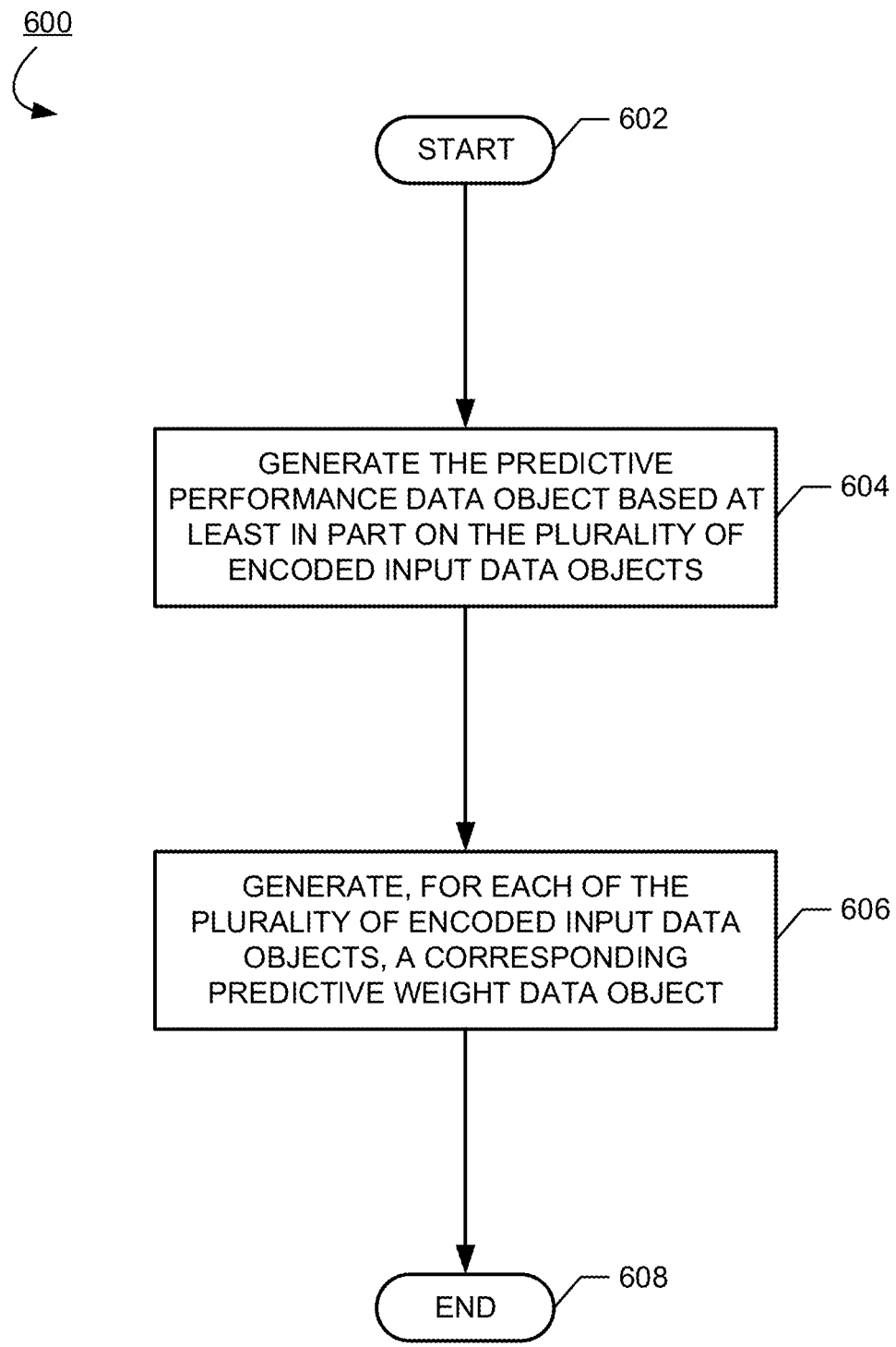

As shown in FIG. 6, the example method 600 starts at step/operation 602. Subsequent to and/or in response to step/operation 602, the example method 600 proceeds to step/operation 604. At step/operation 604, a computing entity (such as the performance prediction computing entity 105 described above in connection with FIG. 1 and FIG. 2) may include means (such as the processing element 205 of the performance prediction computing entity 105 described above in connection with FIG. 2) to generate the predictive performance data object based at least in part on the plurality of encoded input data objects.

As described in connection with at least FIG. 4 and FIG. 5, the plurality of encoded input data objects includes, but not limited to, a plurality of encoded measurement device data objects and/or the at least one encoded conformance score data object. Further, as described above, the plurality of encoded input data objects may be in the form of event codes that are associated with their corresponding timecode indicators. As an example, TABLE 1 below provides some example encoded input data objects in the form of event codes that are associated with their corresponding timecode indicators:

TABLE 1

| Example Encoded Input Data Objects | |
|---|---|
| Event Code | Timecode Indicator |
| TMP_R_L | 10:13 2020-12-12 |
| TMP_R_H | 10:13 2020-12-12 |
| PR_R_L | 10:13 2020-12-12 |
| DESC_M_Xaxis | 10:13 2020-12-12 |
| LMP_1 | 10:13 2020-12-12 |
| LMP_2 | 10:13 2020-12-12 |
| LMP_3 | 10:13 2020-12-12 |
| . . . | . . . |

Additionally, or alternatively, the encoded conformance score data object may be in the form of an alphabetical, numerical, and/or alphanumerical score indicating a conformance level and its associated timecode indicator.

In some embodiments, the plurality of encoded measurement device data objects and/or the at least one encoded conformance score data object are provided as inputs to a machine learning model (such as, but not limited to, a RNN machine learning model, a bidirectional RNN machine learning model, and/or a bidirectional LSTM machine learning model) to generate the predictive performance data object. For example, the machine learning model (such as, but not limited to a RNN machine learning model, a bidirectional RNN machine learning model, and/or a bidirectional LSTM machine learning model) may be trained based at least in part on training encoded measurement device data objects and/or training encoded conformance score data objects to generate predictive performance data objects, examples of which are described in connection with at least FIG. 12 to FIG. 15.

Referring back to FIG. 6, subsequent to and/or in response to step/operation 604, the example method 600 proceeds to step/operation 606. At step/operation 606, a computing entity (such as the performance prediction computing entity 105 described above in connection with FIG. 1 and FIG. 2) may include means (such as the processing element 205 of the performance prediction computing entity 105 described above in connection with FIG. 2) to generate, for each of the plurality of encoded input data objects, a corresponding predictive weight data object As described above in connection with at least step/operation 408 of FIG. 4, the computing entity may generate a plurality of predictive weight data objects that includes a corresponding predictive weight data object for each of the plurality of encoded input data objects. For example, the computing entity may utilize one or more attention layers of a machine learning model (such as, but not limited to a RNN machine learning model, a bidirectional RNN machine learning model, and/or a bidirectional LSTM machine learning model) to calculate an attention weight of each of the encoded input data objects, and designate the attention weight as the corresponding predictive weight data object of the encoded input data object.

While the description above provides an example of generating predictive weight data objects based at least in part on attention weights, it is noted that the scope of the present disclosure is not limited to the description above.

As described above, an example predictive weight data object quantitatively indicates how much an input data object (such as, but not limited to, an encoded input data object, an encoded conformance score data object, and/or the like) contributes to or affects the predicted outcome or likelihood as indicated by the predictive performance data object generated at step/operation 604. Continuing from the example above, TABLE 2 below provides some example predictive weight data objects associated with the encoded input data objects listed in TABLE 1 and related to a predictive performance data object predicting an unplanned device failure at 10:13 on 2020-12-12:

TABLE 2

| Example Encoded Input Data Objects and Corresponding Predictive Weight Data Objects | | |
|---|---|---|
| Event Code | Timecode Indicator | Predictive Performance Data Object |
| TMP_R_L | 10:13 2020-12-12 | 90% |
| TMP_R_H | 10:13 2020-12-12 | 10% |
| PR_R_L | 10:13 2020-12-12 | 20% |
| DESC_M_Xaxis | 10:13 2020-12-12 | 35% |
| LMP_1 | 10:13 2020-12-12 | 5% |
| LMP_2 | 10:13 2020-12-12 | 15% |
| LMP_3 | 10:13 2020-12-12 | 0% |
| . . . | . . . | . . . |

In the above example, the event code TMP_R_L has the highest value of predictive weight data object, which indicates that the event corresponding to the event code contributes the most to the unplanned device failure (e.g. likely the cause of the unplanned device failure) at 10:13 on 2020-12-12.

Referring back to FIG. 6, subsequent to and/or in response to step/operation 606, the example method 600 proceeds to step/operation 608 and ends.

Figure 7:
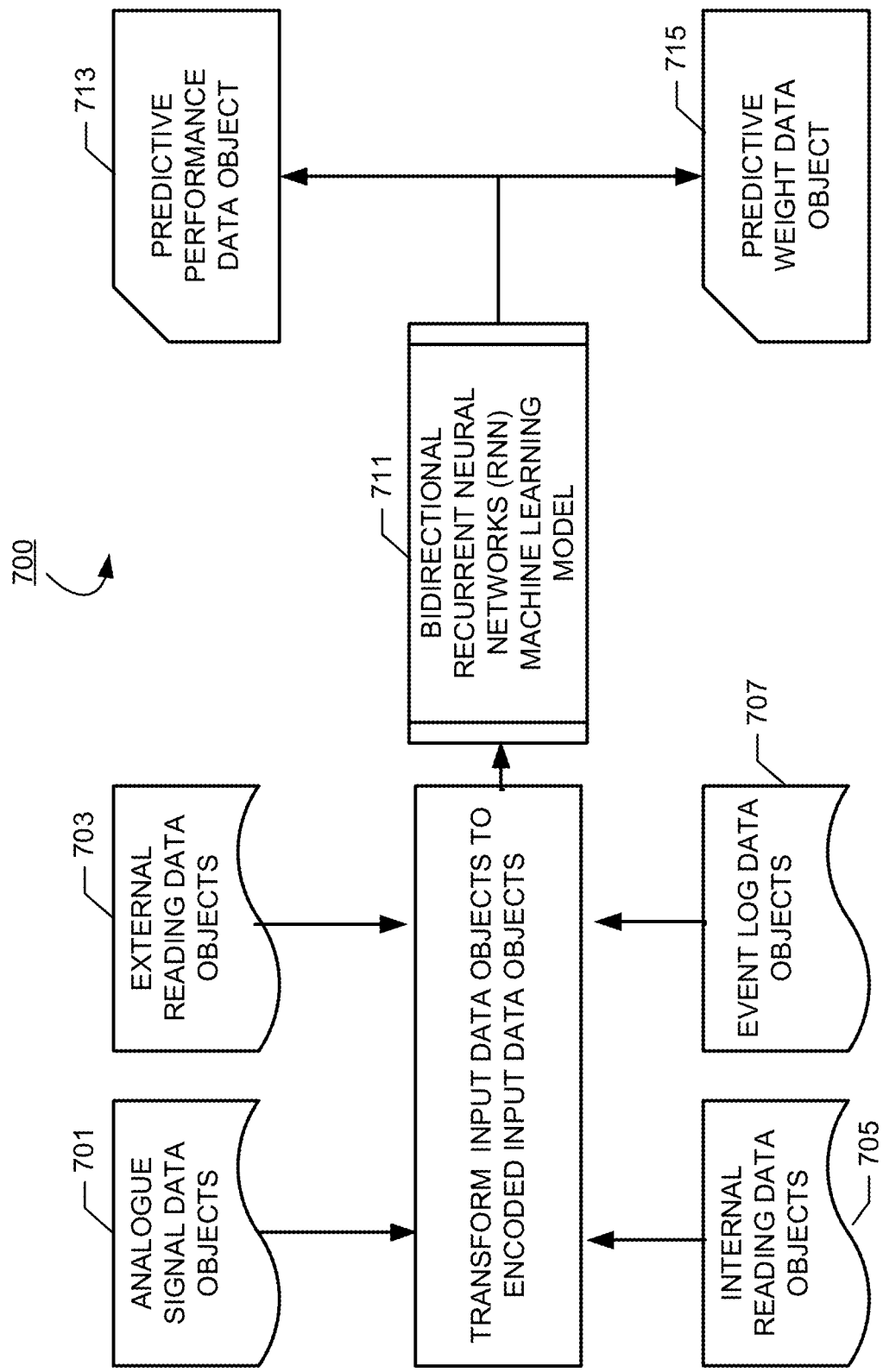

Referring now to FIG. 7, an example diagram 700 is illustrated. In particular, the example diagram 700 illustrates an example method of generating predictive performance data object(s) and predictive weight data object(s) in accordance with various examples of the present disclosure.

For example, the example method illustrated by the example diagram 700 includes transforming input data objects (such as, but not limited to, analogue signal data objects 701, external reading data objects 703, internal reading data objects 705, and/or event log data objects 707) to encoded input data objects. As described above, the encoded input data objects capture temporal information associated with the input data objects. For example, the encoded input data objects may be input data objects that have been transformed to a time matrix for point of time interface.

As shown in the FIG. 7, the encoded input data objects may be provided to a bidirectional RNN machine learning model such as a bidirectional LSTM machine learning model 711. As described above, the bidirectional LSTM machine learning model 711 comprises one or more attention layers. In some embodiments, the bidirectional LSTM machine learning model 711 may be a single or multiple output model.

In some embodiments, the bidirectional LSTM machine learning model 711 applies time series predictive modeling techniques to integrate the encoded input data objects in relation to the specific failure mode to generate the predictive performance data object 713. In some embodiments, the predictive performance data object 713 may identify unplanned failure events associated with measurement device for early detection and intervention.

In some embodiments, the predictive modeling techniques use a bi-directional LSTM machine learning model with attention layers to allow time series predictive modeling of all the encoded input data objects, while also enabling model attention weight extraction to generate predicative weight data objects. For example, using the attention layers, a predictive weight data object 715 that corresponds to one of the encoded input data objects and associated with the predictive performance data object can be determined, thereby enabling proactive device intervention before failure.

By using predictive performance data objects, various embodiments of the present invention address technical challenges associated with increasing operational efficiency and reducing operational load of measurement systems. For example, various embodiments of the present disclosure provide an analytical capability to predict when measurement devices in measurement systems are likely to fail or not perform optimally, and provide enhanced insights on how to mitigate these failure risks. In this way, various embodiments of the present invention reduce the need for performing repeated measurements when an initial measurement is done using a failed measurement device, thus reducing the overall operational load on measurement systems and increasing operational efficiency of those systems. Accordingly, various embodiments of the present invention make important technical contributions to the fields of measurement system maintenance and measurement system management.

d. Exemplary Techniques for Generating Encoded Input Data Object

As described above, there are technical challenges, deficiencies and problems associated with measurement devices, and various example embodiments of the present disclosure overcome such challenges. For example, referring now to FIG. 8, an example method 800 of training a machine learning model to generate a conformance score data object in connection with at least step/operation 505 of FIG. 5 and in accordance with embodiments of the present disclosure is illustrated.

For example, the example method 800 generates one or more synthetic device operation data objects using a generator component of a machine learning model. In some embodiments, the example method 800 generates one or more synthetic conformance score data objects based at least in part on the one or more synthetic device operation data objects using a discriminator component of the machine learning model. As such, the example method 800 may, for example but not limited to, programmatically predict the performance of measurement devices so as to reduce unplanned failure and non-optimal results by the measurement devices.

As shown in FIG. 8, the example method 800 starts at step/operation 802. Subsequent to and/or in response to step/operation 802, the example method 800 proceeds to step/operation 804. At step/operation 804, a computing entity (such as the performance prediction computing entity 105 described above in connection with FIG. 1 and FIG. 2) may include means (such as the processing element 205 of the performance prediction computing entity 105 described above in connection with FIG. 2) to generate one or more synthetic device operation data objects using the generator component of the machine learning model (such as, but not limited to, a GAN machine learning model).

As described above, the synthetic device operation data objects describe "fake" operation events associated with a measurement device that are generated by the generator component of the GAN machine learning model. Generating synthetic device operation data objects may provide various technical benefits and advantages.

For example, in order to identify and predict impending failures, it is necessary to understand the characteristics of a "good, optimal path" of operations conducted by a measurement device in comparison with a "bad, sub-optimal path" of operations conducted by the measurement device. For example, a good path of operations may include few repeated steps, while a bad path of operations may include many repeated steps.

In complex measurement devices, it can be technically challenging to determine whether operations conducted by a measurement device are in a good, optimal path or in a bad, sub-optimal path. This is analogous to the aims of the domain of business process mapping and conformance checking, whereby a domain expert or a subject matter expert defines a process map (such as a list of viable steps) which a process can take. This hand-crafted process map or list of potential "good paths" can then be used as a template to identify non-conformance and/or determine a conformance level. Process mining offers algorithmic methods of building process maps based at least in part on process logs; however, for complex systems, these methods are rarely effective at capturing "within spec" behaviors of the system under study. Hence, if no credible process map is available, then conformance checking cannot be conducted.

Various embodiments of the present disclosure utilize a GAN machine learning model to create a model which can be used for dynamically performing conformance checking and conformance level determination without needing to specifically create a known "good" process map (either manually or algorithmically). As described above, an example GAN consists of two main components, a generator component and a discriminator component. One of the roles of the generator component is to learn/be trained to create synthetic device operation data objects that mimic or imitate device operation data objects describing operation events associated with a good, optimal path.

Referring back to FIG. 8, subsequent to and/or in response to step/operation 804, the example method 800 proceeds to step/operation 806. At step/operation 806, a computing entity (such as the performance prediction computing entity 105 described above in connection with FIG. 1 and FIG. 2) may include means (such as the processing element 205 of the performance prediction computing entity 105 described above in connection with FIG. 2) to generate one or more synthetic conformance score data objects based at least in part on the one or more synthetic device operation data objects using the discriminator component of a machine learning model (such as, but not limited to, a GAN machine learning model).

Continuing from the example above, one of the goals of the discriminator component is to train a binary classification neural network model that can predict whether an encoded device operation data object or an ordered sequence of encoded device operation data objects describe a good, optimal path (e.g. a high conformance level) or a bad, sub-optimal path (e.g. a low conformance level), and to generate a conformance score data object.

In some embodiments, the synthetic device operation data objects generated by the generator component may be provided to the discriminator component, and the discriminator component may generate synthetic conformance score data objects based at least in part on the synthetic device operation data objects. In particular, the synthetic conformance score data objects may indicate a conformance level associated with the "fake" operation events indicated by the synthetic device operation data objects generated by the generator component.

Referring back to FIG. 8, subsequent to and/or in response to step/operation 806, the example method 800 proceeds to step/operation 808. At step/operation 808, a computing entity (such as the performance prediction computing entity 105 described above in connection with FIG. 1 and FIG. 2) may include means (such as the processing element 205 of the performance prediction computing entity 105 described above in connection with FIG. 2) to train the discriminator component based at least in part on the one or more synthetic conformance score data objects and the one or more synthetic device operation data objects.

As described in the example above, one of the roles of the generator component is to learn/be trained to create synthetic device operation data objects that mimic or imitate device operation data objects describing operation events associated with a good, optimal path (despite synthetic device operation data objects describe "fake" operation events). As such, to train the discriminator component, the computing entity may fine tune one or more parameters associated with the discriminator component (if necessary) such that the synthetic conformance score data objects generated by the discriminator component become more closely indicating the conformance level of synthetic device operation data objects as generated/determined by the generator component. This combination/tandem training results in a discriminator component that becomes increasingly sophisticated at determining characteristics of a "good, optimal path" of operations conducted by a measurement device that conform to intended behavior.

In accordance with examples of the present disclosure, the discriminator may be in the form of a RNN with attention layers. In such examples, the attention layers can be understand, through training, what features of the input (e.g. which operation events described by encoded device operation data objects) are contributing the most to the conformance level of device operation (e.g. contributes the most to improving the conformance level) so as to determine a conformance weight data object for each encoded device operation data object.

Referring back to FIG. 8, subsequent to and/or in response to step/operation 808, the example method 800 proceeds to step/operation 810 and ends.

Figure 9:
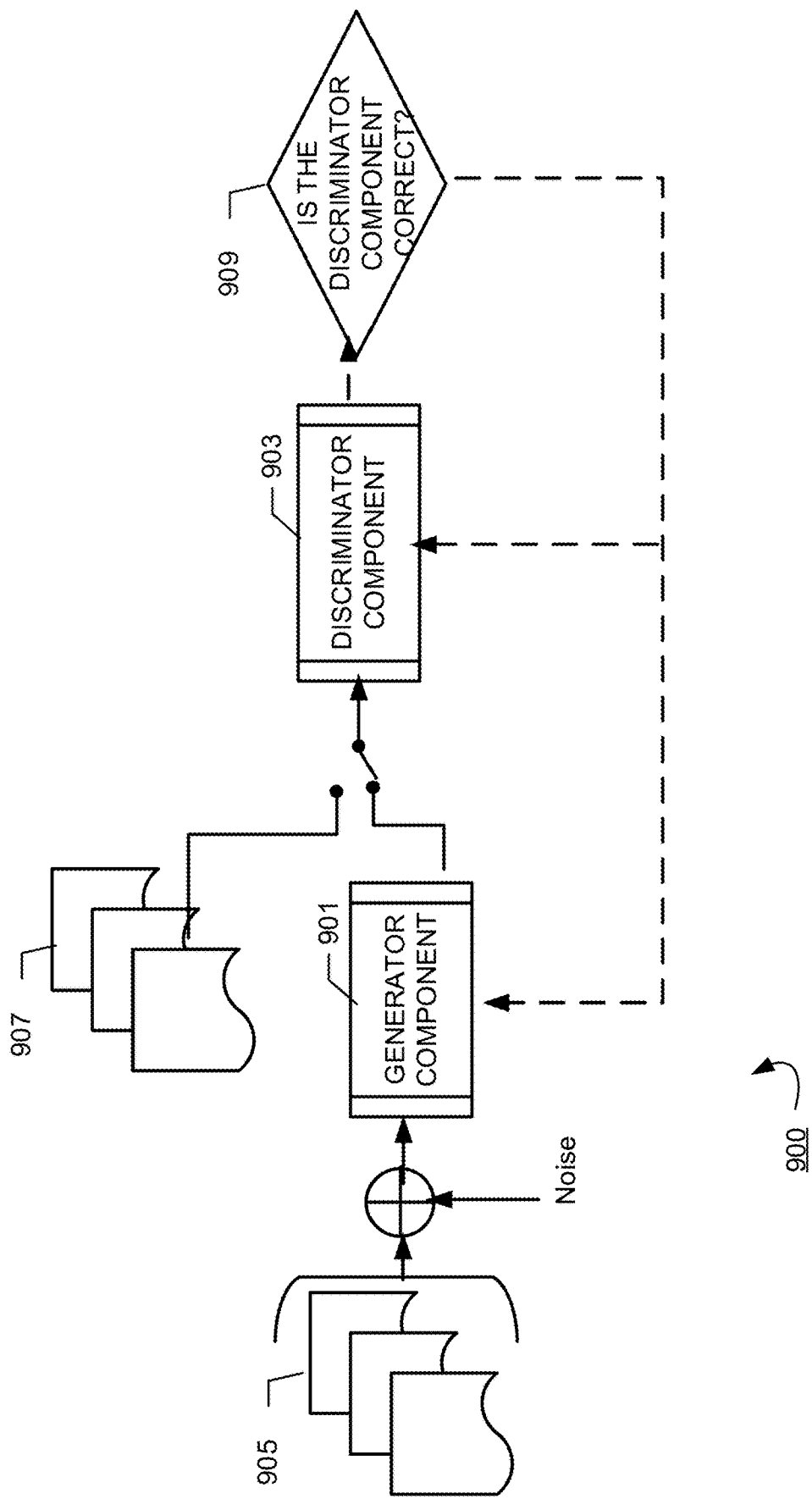

Referring now to FIG. 9, an example diagram 900 is illustrated. In particular, the example diagram 900 illustrates an example method of training a discriminator component of a GAN machine learning model.

As described above, the GAN machine learning model may include a generator component 901 and a discriminator component 903. As described above, the generator component 901 may generate synthetic device operation data objects describing fake operation events associated with a measurement device. In the example shown in FIG. 9, the generator component 901 may generate synthetic device operation data objects based at least in part on data/information 905 from a latent space and/or added data noise.

As shown in FIG. 9, the discriminator component 903 may receive either real device operation data objects 907 or synthetic device operation data objects generated by the generator component 901. In some embodiments, the discriminator component 903 may generate synthetic conformance score data objects based at least in part on the synthetic device operation data objects generated by the generator component 901. At operation 909, a computing entity may determine whether the synthetic conformance score data objects generated by the discriminator component 903 are correct so as to fine tune the performance of the discriminator component 903. For example, if the synthetic conformance score data objects are correct, the computing entity may adjust the generator component 901 to generate more challenging synthetic device operation data objects. If the synthetic conformance score data objects are not correct, the computing entity may adjust the discriminator component 903 to improve its accuracy. In some embodiments, subsequent to training, the discriminator component 903 may receive real device operation data objects 907 and generate conformance score data objects with high accuracy.

Additionally, or alternatively, the discriminator component 903 may be trained to distinguish synthetic device operation data objects generated by the generator component 901 from real device operation data objects 907, which in turn may train the generator component 901 to generate more "realistic" device operation data objects.

FIG. 9 illustrates examples of how embodiments of the present disclosure overcome technical challenges and difficulties, and provide technical advancement and improvements.

As described above, the analytical cycle carried out by an example measurement device can be a complex, highly re-entrant series of processing steps with multiple guide rails and gated tests that determine a path through a dynamic process path. For example, in complex devices, there are hundreds or even thousands of sequential or parallel steps to perform a diagnostic lab test by a measurement device. An example is a CBC diagnostic device. During the end to end cycle, for example, the CBC diagnostic device performs multiple sequential steps that include:

1) mechanical preparation and presentation of the blood sample;
2) pneumatic aspiration steps;
3) sample mix with reagents steps;
4) sample heating and parallel pneumatic presentation of the sample for optical characterization i.e. RBC, WBC and HGB;
5) cell characterization through direct flow cytometry; and
6) pneumatic sample waste removal and cleaning.

Maintaining patient sample integrity is critical through this process. As such, multiple integrity checks are conducted, and, if nonconformance is determined at any stage, parts of the process or the entire process itself needs to be completed again. As such, mapping the process to determine if a path is conforming/non-conforming path is complex.

To overcome such technical challenges and difficulties, various embodiments of the present disclosure utilize a discriminator component of a trained GAN machine learning model, which is conditioned on successful executions of the process. As described above, inputs to the GAN machine learning model includes device operation data objects such as, but not limited to. device event sequence log information. The output of the discriminator component includes an (encoded) conformance score data object that indicates an operation conformance level associated with the measurement device and estimates how the operation of the device is relative to ideal performance and/or describes the integrity of the devices internal analytical cycle process, which will serve as a component in the machine learning model for predicting device failure, details of which are described herein.

In some embodiments, the discriminator component 903 comprises at least one attention layer. In some embodiments, the at least one attention layer generates a corresponding conformance weight data object for each of the one or more encoded device operation data objects. As described above, the encoded conformance score data object may be provided as a part of the input data objects (in relation to conformance) to the bidirectional RNN machine learning model for the failure predictive task, and the bidirectional RNN machine learning model may generate a predictive weight data object corresponds to the encoded conformance score data object indicating whether the conformance weight data object is a significant contributor to the overall likelihood of device failure. Additionally, the conformance weight data objects indicate what is causing the nonconformance. As such, the predictive weight data objects and the conformance weight data objects provide two ways of viewing the likelihood of failure both individually at the conformance score data object level (e.g. based at least in part on the conformance weight data objects) and also with regards the overall predictive failure level (e.g. based at least in part on the predictive weight data objects).

As described above, there are technical challenges, deficiencies and problems associated with measurement devices, and various example embodiments of the present disclosure overcome such challenges. For example, referring now to FIG. 10, an example method 1000 of generating encoded measurement device data objects in connection with at least step/operation 503 of FIG. 5 and in accordance with embodiments of the present disclosure is illustrated.

For example, the example method 1000 retrieves a plurality of measurement device data objects associated with the measurement device. In some embodiments, the example method 1000 encodes the plurality of measurement device data objects based at least in part on an event encoding registry data object. As such, the example method 1000 may, for example but not limited to, programmatically predict the performance of measurement devices so as to reduce unplanned failure and non-optimal results by the measurement devices.

As shown in FIG. 10, the example method 1000 starts at step/operation 1002. Subsequent to and/or in response to step/operation 1002, the example method 1000 proceeds to step/operation 1004. At step/operation 1004, a computing entity (such as the performance prediction computing entity 105 described above in connection with FIG. 1 and FIG. 2) may include means (such as the processing element 205 of the performance prediction computing entity 105 described above in connection with FIG. 2) to retrieve a plurality of measurement device data objects associated with the measurement device.

As described above, various embodiments of the present disclosure encode continuous data and/or information collected from/by a measurement device and/or from/by other external devices. Various embodiments of the present disclosure may identify key data and/or information available that needs to be modeled to predict, for example, a target failure events. Example embodiments of the present disclosure may rely on systems level knowledge of the measurement device (for example, from a subject matter domain database) to best identify all the information that could be potentially used to drive the prediction. Such data and/or information may include, but are not limited to, sensor analogue signals, device numeric readings as well as semi-structured event text information captured by the device.

In some embodiments, the plurality of measurement device data objects comprises one or more analogue signal data objects 1012, one or more internal reading data objects 1014, one or more external reading data objects 1016, and one or more event log data objects 1018.

As described above, each of the one or more analogue signal data objects 1012 comprises, represents, indicates, describes, and/or is associated with data, information, and/or signals (such as non-transitory signals) that are generated and/or captured by one or more components and/or devices that are internal and/or external to an example measurement device and are in analogue form.

Additionally, or alternatively, each of the one or more internal reading data objects 1014 comprises, represents, indicates, describes, and/or is associated with data, information, and/or signals (such as non-transitory signals) that are generated and/or captured by one or more components and/or devices that are internal to an example measurement device and are in digital form.

Additionally, or alternatively, each of the one or more external reading data objects 1016 comprises, represents, indicates, describes, and/or is associated with data, information, and/or signals (such as non-transitory signals) that are generated and/or captured by one or more components and/or devices that are external to an example measurement device and are in digital form.

Additionally, or alternatively, each of the one or more event log data objects 1018 comprises, represents, indicates, describes, and/or is associated with data, information, and/or signals (such as non-transitory signals) that are generated and/or captured by one or more components and/or devices (such as processors) that are internal and/or external to an example measurement device and describe one or more operational/performance events associated with the example measurement device.

As described above, many systems do not collectively use all this information to predict, for example, the likelihood of when a measurement device is likely to require intervention to prevent a hard failure that causes disruptive downtime (for example, in a hospital or provider office). As such, various embodiments of the present disclosure may provide technical benefits and advantages by suggesting small proactive maintenance based at least in part on modeling such information to collectively predict failure as described herein to potentially prevent significant device issues arising and enhance device uptime.

Referring back to FIG. 10, subsequent to and/or in response to step/operation 1004, the example method 1000 proceeds to step/operation 1006. At step/operation 1006, a computing entity (such as the performance prediction computing entity 105 described above in connection with FIG. 1 and FIG. 2) may include means (such as the processing element 205 of the performance prediction computing entity 105 described above in connection with FIG. 2) to retrieve an event encoding registry data object associated with the measurement device.

In some embodiments, measurement device data objects retrieved at step/operation 1004 need to be encoded into an efficient and unified form that can be incorporated into a deep learning predictive model to predict, for example, likely failure. As described above, an example event encoding registry data object 1020 may indicate how to convert, transform, and/or encode data objects from different sources and/or associated with different formats (such as, but not limited to, analogue signal data objects, internal reading data objects, external reading data objects, event log data objects) into a unified form or format.

Referring back to FIG. 10, subsequent to and/or in response to step/operation 1006, the example method 1000 proceeds to step/operation 1008. At step/operation 1008, a computing entity (such as the performance prediction computing entity 105 described above in connection with FIG. 1 and FIG. 2) may include means (such as the processing element 205 of the performance prediction computing entity 105 described above in connection with FIG. 2) to encode the plurality of measurement device data objects based at least in part on the event encoding registry data object.

In some embodiments, the one or more analogue signal data objects 1012, the one or more internal reading data objects 1014, the one or more external reading data objects 1016, and/or the one or more event log data objects 1018 may comprise alphabetical strings. For example, the one or more event log data objects 1018 may collect multiple descriptive information as the measurement device operates, including device warnings, device failure notices and other descriptive text. Various embodiments of the present disclosure may encode this string format information based at least in part on the event encoding registry data object 1020 (such as a code dictionary) for subsequent analytic/predictive operations. TABLE 3 below illustrates example encoding of alphabetical strings.

TABLE 3

Example Encoding of Alphabetical Strings

| Timecode Indicator | Event Log Data Object | Encoded Event Log Data Object (Event Code) |
|---|---|---|
| 10:13 2020-12-12 | Low temperature reactor chamber warning | TMP_R_L |
| 10:13 2020-12-12 | High temperature reactor chamber warning | TMP_R_H |
| 10:13 2020-12-12 | Low pressure reactor chamber warning | PR_R_L |
| 10:13 2020-12-12 | Motor dropped encoding steps during X-axis movement | M_Xaxis_LS |

In some embodiments, the one or more analogue signal data objects 1012, the one or more internal reading data objects 1014, the one or more external reading data objects 1016, and/or the one or more event log data objects 1018 may comprise numeric strings. Similar to the examples described above in connection with alpha string encoding, various examples of the present disclosure encode numeric information that is available for predicting failure. For example, the one or more internal reading data objects 1014 and/or the one or more external reading data objects 1016 may comprise numeric reading valves from internal and/or external devices and/or components. Various embodiments of the present disclosure may convert numeric strings into codes that can also be used by machine learning models. For example, given the numeric ordinal context, some embodiments of the present disclosure may allocate event codes for different bands/bins of numerical values based at least in part on the potential impact of such values on the performance of measurement devices. For example, based at least in part on system knowledge, the event encoding registry data object 1020 may provide definitions of the quantiles of breaking the numeric distribution into bands/bins for coding. As an example, the event encoding registry data object 1020 may assign a first event code for numeric values described by a numerical string within a first value range, a second event code for numeric values described by a numerical string within a second value range, and/or the like. For example, TABLE 4 below illustrates example event codes and example numerical strings as described by an example event encoding registry data object 1020:

TABLE 4

Example Numeric String Encoding

| Event Code | Timecode Indicator | Numeric Description and Value |
|---|---|---|
| LMP_1 | 10:13 2020-12-12 | Optical Lamp Intensity - <50 Lumen |
| LMP_2 | 10:13 2020-12-12 | Optical Lamp Intensity - <100 & >50 Lumen |
| LMP_3 | 10:13 2020-12-12 | Optical Lamp Intensity - >100 Lumen |

Further, as illustrated in the TABLE 3 and TABLE 4 above, example event encoding registry data object 1020 can additionally, or alternatively, define encoding of measurement device data objects based at least in part on the timecode indicators associated with the measurement device data objects.

In the example shown in FIG. 10, the computing entity may encode the analogue signal data objects 1012 into encoded analogue signal data objects 1022, encode the internal reading data objects 1014 into the encoded internal reading data objects 1024, encode external reading data objects 1016 into encoded external reading data objects 1026, and/or encode event log data objects 1018 into encoded event log data objects 1028.

Referring back to FIG. 10, subsequent to and/or in response to step/operation 1008, the example method 1000 proceeds to step/operation 1010 and ends.

Referring now to FIG. 11, an example diagram 1100 is illustrated. In particular, the example diagram 1100 illustrates encoding continuous information collected from a measurement device (both structured and unstructured) as defined above in a time series for predictive modeling.

As described above, various input data objects (whether comprising numeric or alpha strings) can be converted to a set of event codes with a timecode indicator. For example, example embodiments of the present disclosure may combine all the structured texts, unstructured texts, numeric strings, and alpha strings available for performing time series based deep learning predictive tasks. The varying spectrum of data sources can provide technical advantages and benefits over other systems.

As described above, each of the plurality of measurement device data objects is associated with a corresponding timecode indicator. In the example shown in FIG. 11, the input data objects include an internal reading data objects 1101 that indicates a real-time signal from an internal device of a measurement device at a time point T1, an external reading data object that indicates a real-time signal from an external device of the measurement device at the time point T1, a conformance score data object 1105 that indicates a real-time conformance level of the measurement device at the time point T1, and an event log data object 1107 that includes unstructured event text log describing events at time point T1.

In some embodiments, generating the plurality of encoded measurement device data objects is based at least in part on the plurality of measurement device data objects and the corresponding timecode indicator. In the example shown in FIG. 11, the internal reading data object 1101, the external reading data object 1103, the conformance score data object 1105, and the event log data object 1107 may be encoded with their corresponding timecode indicator T1 that is associated with time interval 1. Similarly, input data objects associated with time interval 2, . . . , time interval N may also be encoded with their corresponding timecode indicators. As an example, TABLE 5 below illustrates example event codes to be encoded with their corresponding timecode indicators:

TABLE 5

Example Event Codes and Timecode Indicators

| Event Code | Event Time |
|---|---|
| TMP_R_L | 10:13 2020-12-12 |
| TMP_R_H | 10:13 2020-12-12 |
| PR_R_L | 10:13 2020-12-12 |
| DESC_M_Xaxis | 10:13 2020-12-12 |
| LMP_1 | 10:13 2020-12-12 |
| LMP_2 | 10:13 2020-12-12 |
| LMP_3 | 10:13 2020-12-12 |
| . . . | . . . |

In some embodiments, the computing entity may select encoded input data objects associated with a predetermined number of time intervals prior to a current time, and provide these encoded input data objects to the bidirectional RNN machine learning model to generate the predictive performance data object and/or the predictive weight data objects. For example, the computing entity may select encoded input data objects associated with the previous three time intervals from the current system time, and provide them as inputs to the bidirectional RNN machine learning model. Additionally, or alternatively, the computing entity may select a predetermined number of encoded input data objects to be provided to the bidirectional RNN machine learning model.

In some embodiments, the predetermined number of time intervals and/or the predetermined number of encoded input data objects may be determined based at least in part on domain knowledge associated with the measurement device. In some embodiments, the predetermined number of time intervals and/or the predetermined number of encoded input data objects may be determined based at least in part on the failure rate of the measurement device. For example, if the measurement device has a high failure rate, the predetermined number of time intervals and/or the predetermined number is higher compared to that of a measurement device having a low failure rate. Selecting the predetermined number of time intervals and/or the predetermined number of encoded input data objects this way provides a probabilistic value of specific failure or multiple failures that can potentially be acted upon before hard failure.

Further, as shown in FIG. 11, the bidirectional RNN machine learning model can be trained to generate a predictive performance data object predicting various targets, such as, but not limited to, an unacceptable variance likelihood, an unacceptable accuracy likelihood, likely failure in modules of the measurement device, and/or the like.

By using encoded input data objects to generate predictive performance data objects, various embodiments of the present invention address technical challenges associated with increasing operational efficiency and reducing operational load of measurement systems. For example, various embodiments of the present disclosure provide an analytical capability to predict when measurement devices in measurement systems are likely to fail or not perform optimally, and provide enhanced insights on how to mitigate these failure risks. In this way, various embodiments of the present invention reduce the need for performing repeated measurements when an initial measurement is done using a failed measurement device, thus reducing the overall operational load on measurement systems and increasing operational efficiency of those systems. Accordingly, various embodiments of the present invention make important technical contributions to the fields of measurement system maintenance and measurement system management.

e. Exemplary Techniques for Predicting Accuracy Level of Measurement Devices

As described above, there are technical challenges, deficiencies and problems associated with measurement devices, and various example embodiments of the present disclosure overcome such challenges. For example, referring now to FIG. 12, an example method 1200 of generating a predictive performance data object indicating a predicted accuracy in accordance with embodiments of the present disclosure is illustrated.

For example, the example method 1200 retrieves a plurality of training encoded input data objects associated with a training predictive performance data object indicating a known accuracy level. In some embodiments, the example method 1200 trains the bidirectional RNN machine learning model based at least in part on the plurality of training encoded input data objects and the training predictive performance data object. As such, the example method 1200 may, for example but not limited to, programmatically predict the performance of measurement devices so as to reduce unplanned failure and non-optimal results by the measurement devices.

Figure 12:
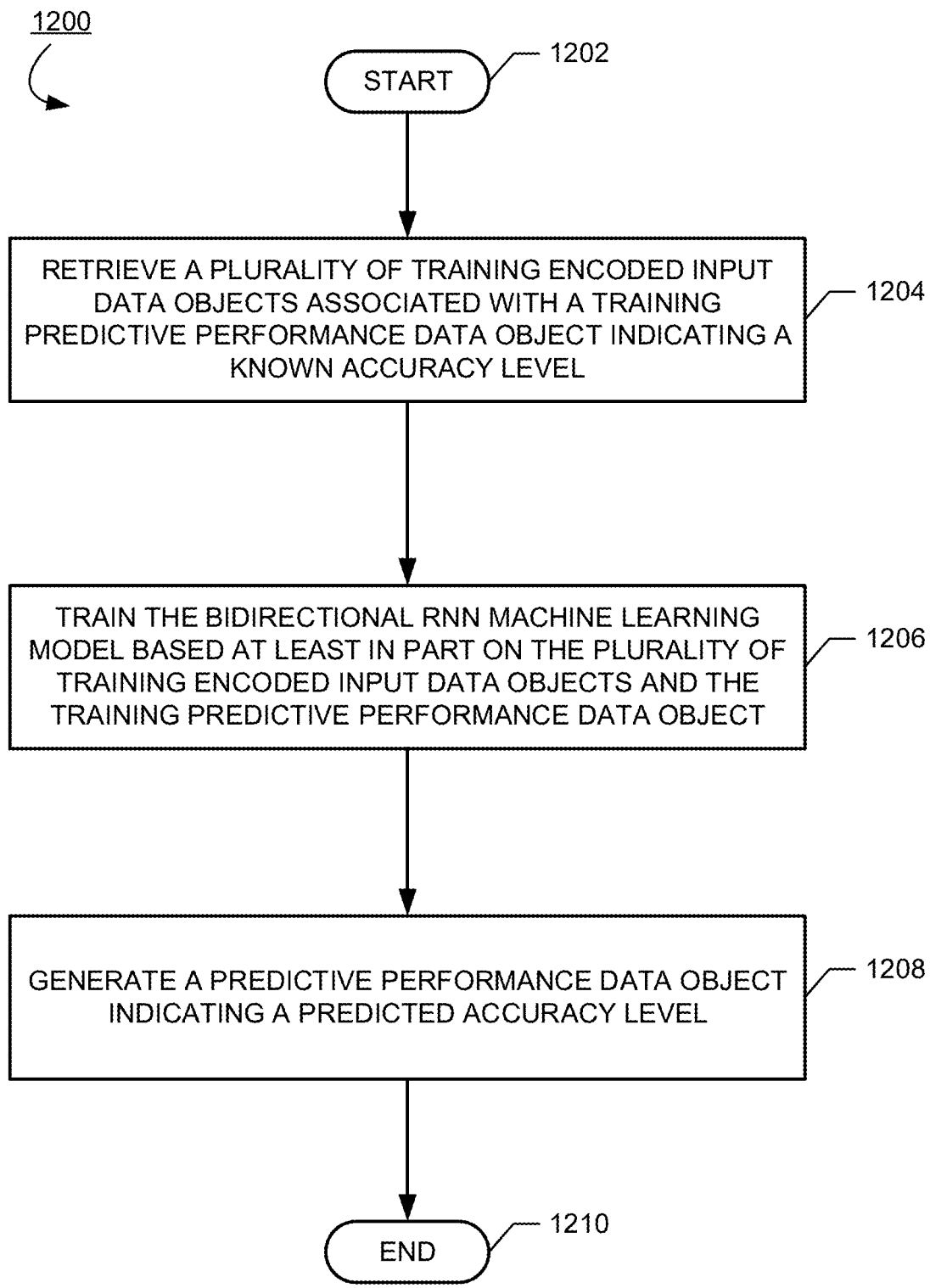

As shown in FIG. 12, the example method 1200 starts at step/operation 1202. Subsequent to and/or in response to step/operation 1202, the example method 1200 proceeds to step/operation 1204. At step/operation 1204, a computing entity (such as the performance prediction computing entity 105 described above in connection with FIG. 1 and FIG. 2) may include means (such as the processing element 205 of the performance prediction computing entity 105 described above in connection with FIG. 2) to retrieve a plurality of training encoded input data objects associated with a training predictive performance data object indicating a known accuracy level.

In some embodiments, the plurality of training encoded input data objects comprises a plurality of training encoded measurement device data objects and at least one training encoded conformance score data object.

As described above, the training encoded input data object may refer to a type of encoded input data object that may be generated or retrieved for training a machine learning model in generating predictive performance data objects and/or predictive weight data objects. For example, the computing entity may collect historical encoded input data objects associated with a measurement device at historical time points. In this example, the historical accuracy levels of the measurement device at such historical time points may be known, and the computing entity may generate training encoded input data objects based at least in part on these historical encoded input data objects, may generate a training predictive performance data object based at least in part on the known historical accuracy levels, and may correlate training encoded input data objects with the training predictive performance data object.

Additionally, or alternatively, the computing entity may collect historical predictive weight data objects associated with the historical encoded input data objects. For example, the historical predictive weight data objects may indicate a known accuracy contributing factor (e.g. how each historical encoded input data object quantitatively contributed to the known historical accuracy levels).

As an example, the computing entity may collect historical encoded input data objects associated with a timecode indicator of 10:13 2020-12-12 (e.g. data/information/signals represented by the historical encoded input data objects are generated and/or captured at 10:13 on 2020-12-12). The computing entity may also determine that the historical accuracy level of the measurement device captured at 10:13 on 2020-12-12 is 80% (e.g. readings generated by the measurement device at 10:13 on 2020-12-12 have a 80% likelihood of being accurate). In such an example, the computing entity may generate training encoded input data objects based at least in part on the historical encoded input data objects, generate a training predictive performance data object indicating a known accuracy level of 80%, and correlate the training encoded input data objects with the training predictive performance data object.

Referring back to FIG. 12, subsequent to and/or in response to step/operation 1204, the example method 1200 proceeds to step/operation 1206. At step/operation 1206, a computing entity (such as the performance prediction computing entity 105 described above in connection with FIG. 1 and FIG. 2) may include means (such as the processing element 205 of the performance prediction computing entity 105 described above in connection with FIG. 2) to train the bidirectional RNN machine learning model based at least in part on the plurality of training encoded input data objects and the training predictive performance data object.

For example, the computing entity may provide the training encoded input data objects to the bidirectional RNN machine learning model (such as, but not limited to, a bidirectional LSTM machine learning model). The bidirectional RNN machine learning model may generate a test predictive performance data object, and the computing entity may adjust parameters associated with the bidirectional RNN machine learning model such that the test predictive performance data object reflects or is close to the known accuracy level as indicated by the training predictive performance data object.

Additionally, or alternatively, the computing entity may provide the training encoded input data objects to the attention layers of the bidirectional RNN machine learning model (such as, but not limited to, a bidirectional LSTM machine learning model). The attention layers of the bidirectional RNN machine learning model may generate a test predictive weight data object for each of the training encoded input data objects, and the computing entity may adjust parameters associated with the bidirectional RNN machine learning model such that the test predictive weight data object reflects or is close to the historical predictive weight data object.

Continuing from the example above, the computing entity may provide the training encoded input data objects based at least in part on the historical encoded input data objects associated with a timecode indicator of 10:13 2020-12-12 to a bidirectional RNN machine learning model (such as, but not limited to, a bidirectional LSTM machine learning model), and the bidirectional RNN machine learning model (such as, but not limited to, a bidirectional LSTM machine learning model) may generate a test predictive performance data object. In some embodiments, the computing entity may adjust parameters associated with the bidirectional RNN machine learning model such that the test predictive performance data object reflects or is close to the 80% known accuracy level.

Referring back to FIG. 12, subsequent to and/or in response to step/operation 1206, the example method 1200 proceeds to step/operation 1208. At step/operation 1208, a computing entity (such as the performance prediction computing entity 105 described above in connection with FIG. 1 and FIG. 2) may include means (such as the processing element 205 of the performance prediction computing entity 105 described above in connection with FIG. 2) to generate a predictive performance data object indicating a predicted accuracy level.

For example, the computing entity may receive or generate a plurality of encoded input data objects associated with a measurement device, similar to various examples described above. In some embodiments, the computing entity may provide the plurality of encoded input data objects to a bidirectional RNN machine learning model (such as a bidirectional LSTM machine learning model) that has been trained based at least in part on at least step/operation 1204 and step/operation 1206 described above, and the bidirectional RNN machine learning model (such as a bidirectional LSTM machine learning model) may generate a predictive performance data object indicating a predicted accuracy level based at least in part on the plurality of encoded input data objects.

Additionally, or alternatively, the computing entity generates a plurality of predictive weight data objects. In some embodiments, each of the plurality of predictive weight data objects indicates a predicted accuracy contributing factor of one of the plurality of encoded input data objects in relationship to the predicted accuracy level. For example, the computing entity may receive or generate a plurality of encoded input data objects associated with a measurement device, similar to various examples described above. In some embodiments, the computing entity may provide the plurality of encoded input data objects to a bidirectional RNN machine learning model (such as a bidirectional LSTM machine learning model) that has been trained based at least in part on at least step/operation 1204 and step/operation 1206 described above, and the attention layers of the bidirectional RNN machine learning model (such as a bidirectional LSTM machine learning model) may generate predictive weight data objects indicating predicted accuracy contributing factors of the plurality of encoded input data objects in relationship to the predicted accuracy level as indicated by the predictive performance data object.

Referring back to FIG. 12, subsequent to and/or in response to step/operation 1208, the example method 1200 proceeds to step/operation 1210 and ends.

Figure 13:
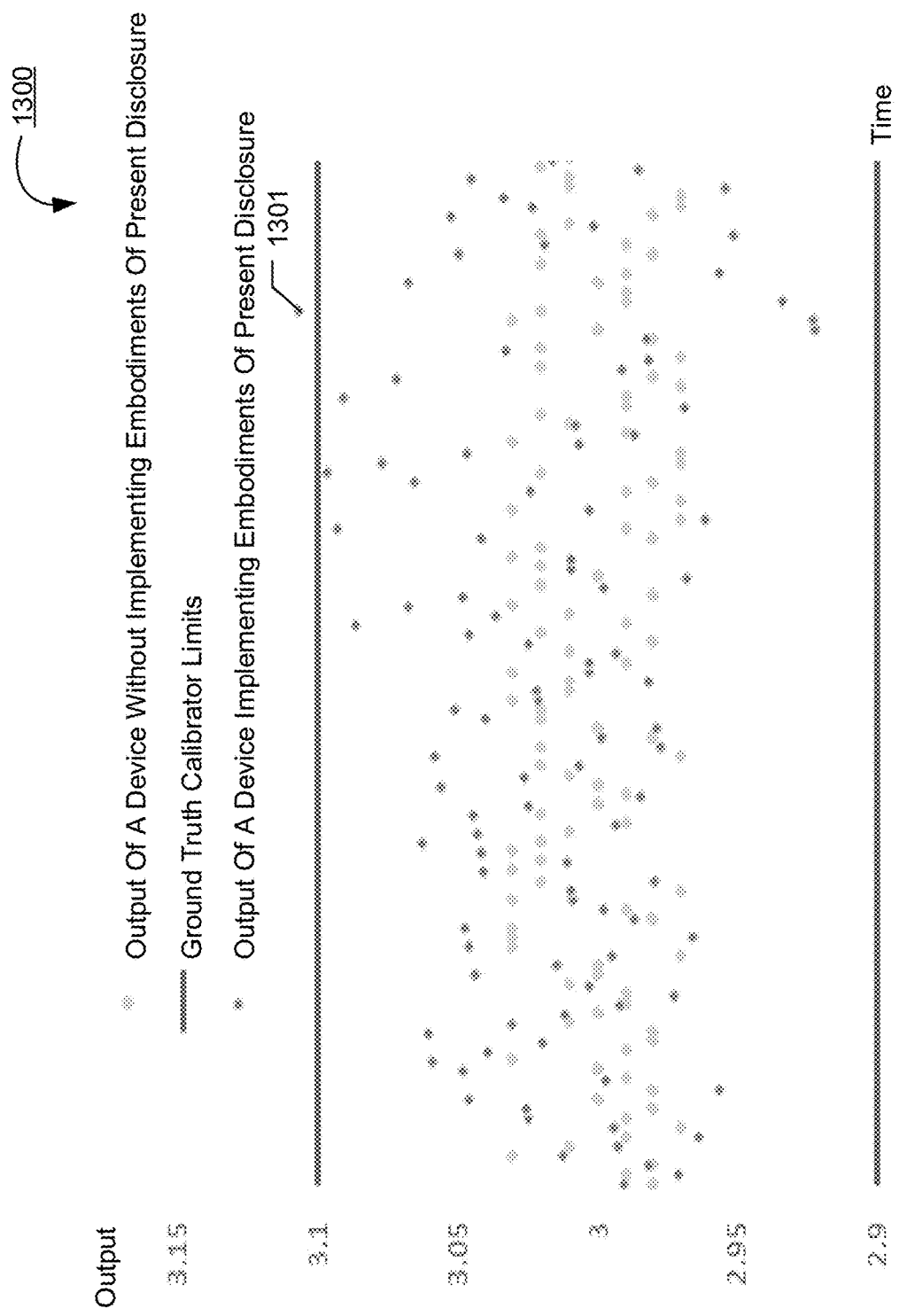

Referring now to FIG. 13, an example diagram 1300 is shown. In particular, the example diagram 1300 illustrates how examples embodiments of the present disclosure can identify sub-optimal results generated by an example measurement device.

As shown in FIG. 13, outputs from a measurement device that does not implement embodiments of the present disclosure are plotted with outputs from a measurement device that implements embodiments of the present disclosure. As described above, embodiments of the present disclosure may generate predictive performance data objects that indicate predicted accuracy levels of outputs from a measurement device. For example, the predictive performance data object may indicate that the device output 1301 may be associated with a sub-optimal accuracy level, and a user may calibrate the measurement device based at least in part on the ground truth calibrator limit. As such, various embodiments of the present disclosure may improve the accuracy of readings from a measurement device by proactively monitoring the accuracy levels and calibrating the measurement device.

f. Exemplary Techniques for Predicting Failure Likelihood of Measurement Devices As described above, there are technical challenges, deficiencies and problems associated with measurement devices, and various example embodiments of the present disclosure overcome such challenges. For example, referring now to FIG. 14, an example method 1400 of generating a predictive performance data object indicating a predicted failure likelihood in accordance with embodiments of the present disclosure is illustrated.

For example, the example method 1400 retrieves a plurality of training encoded input data objects associated with a training predictive performance data object indicating a known failure likelihood. In some embodiments, the example method 1400 trains the bidirectional RNN machine learning model based at least in part on the plurality of training encoded input data objects and the training predictive performance data object. As such, the example method 1400 may, for example but not limited to, programmatically predict the performance of measurement devices so as to reduce unplanned failure and non-optimal results by the measurement devices.

Figure 14:
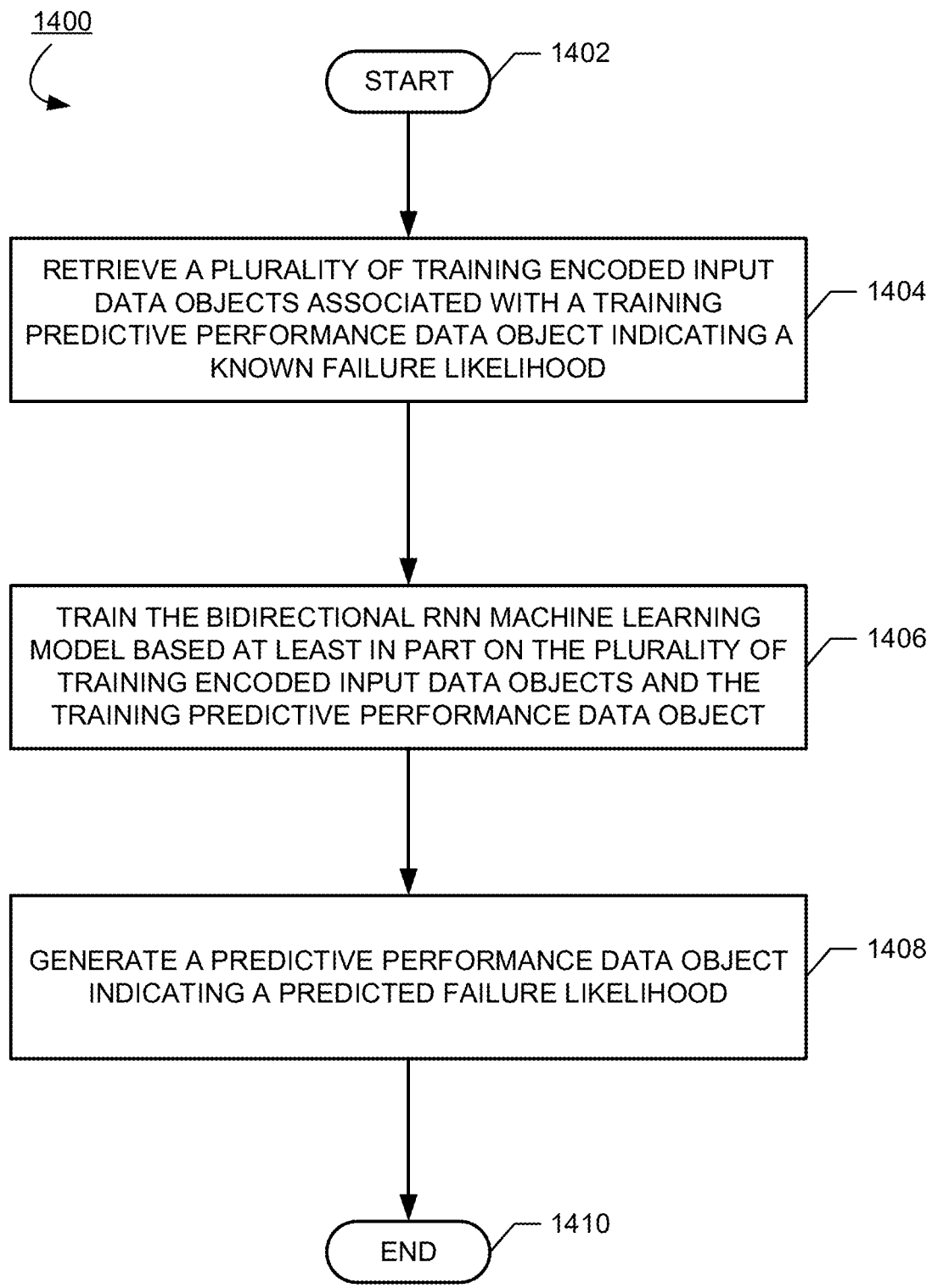

As shown in FIG. 14, the example method 1400 starts at step/operation 1402.

Subsequent to and/or in response to step/operation 1402, the example method 1400 proceeds to step/operation 1404. At step/operation 1404, a computing entity (such as the performance prediction computing entity 105 described above in connection with FIG. 1 and FIG. 2) may include means (such as the processing element 205 of the performance prediction computing entity 105 described above in connection with FIG. 2) to retrieve a plurality of training encoded input data objects associated with a training predictive performance data object indicating a known failure likelihood.

In some embodiments, the plurality of training encoded input data objects comprises a plurality of training encoded measurement device data objects and at least one training encoded conformance score data object.

As described above, the training encoded input data object may refer to a type of encoded input data object that may be generated or retrieved for training a machine learning model in generating predictive performance data objects and/or predictive weight data objects. For example, the computing entity may collect historical encoded input data objects associated with a measurement device at historical time points. In this example, the historical failure likelihoods of the measurement device at such historical time points may be known, and the computing entity may generate training encoded input data objects based at least in part on these historical encoded input data objects, may generate a training predictive performance data object based at least in part on the known historical failure likelihoods, and may correlate training encoded input data objects with the training predictive performance data object.

Additionally, or alternatively, the computing entity may collect historical predictive weight data objects associated with the historical encoded input data objects. For example, the historical predictive weight data objects may indicate a known failure contributing factor (e.g. how each historical encoded input data object quantitatively contributed to the known historical failure likelihoods).

As an example, the computing entity may collect historical encoded input data objects associated with a timecode indicator of 10:13 2020-12-12 (e.g. data/information/signals represented by the historical encoded input data objects are generated and/or captured at 10:13 on 2020-12-12). The computing entity may also determine that the historical failure likelihood of the measurement device captured at 10:13 on 2020-12-12 is 80% (e.g. the measurement device at 10:13 on 2020-12-12 have a 80% likelihood of failure). In such an example, the computing entity may generate training encoded input data objects based at least in part on the historical encoded input data objects, generate a training predictive performance data object indicating a known failure likelihood of 80%, and correlate the training encoded input data objects with the training predictive performance data object.

Referring back to FIG. 14, subsequent to and/or in response to step/operation 1404, the example method 1400 proceeds to step/operation 1406. At step/operation 1406, a computing entity (such as the performance prediction computing entity 105 described above in connection with FIG. 1 and FIG. 2) may include means (such as the processing element 205 of the performance prediction computing entity 105 described above in connection with FIG. 2) to train the bidirectional RNN machine learning model based at least in part on the plurality of training encoded input data objects and the training predictive performance data object.

For example, the computing entity may provide the training encoded input data objects to the bidirectional RNN machine learning model (such as, but not limited to, a bidirectional LSTM machine learning model). The bidirectional RNN machine learning model may generate a test predictive performance data object, and the computing entity may adjust parameters associated with the bidirectional RNN machine learning model such that the test predictive performance data object reflects or is close to the known failure likelihood as indicated by the training predictive performance data object.

Additionally, or alternatively, the computing entity may provide the training encoded input data objects to the attention layers of the bidirectional RNN machine learning model (such as, but not limited to, a bidirectional LSTM machine learning model). The attention layers of the bidirectional RNN machine learning model may generate a test predictive weight data object for each of the training encoded input data objects, and the computing entity may adjust parameters associated with the bidirectional RNN machine learning model such that the test predictive weight data object reflects or is close to the historical predictive weight data object.

Continuing from the example above, the computing entity may provide the training encoded input data objects based at least in part on the historical encoded input data objects associated with a timecode indicator of 10:13 2020-12-12 to a bidirectional RNN machine learning model (such as, but not limited to, a bidirectional LSTM machine learning model), and the bidirectional RNN machine learning model (such as, but not limited to, a bidirectional LSTM machine learning model) may generate a test predictive performance data object. In some embodiments, the computing entity may adjust parameters associated with the bidirectional RNN machine learning model such that the test predictive performance data object reflects or is close to the 80% known failure likelihood.

Referring back to FIG. 14, subsequent to and/or in response to step/operation 1406, the example method 1400 proceeds to step/operation 1408. At step/operation 1408, a computing entity (such as the performance prediction computing entity 105 described above in connection with FIG. 1 and FIG. 2) may include means (such as the processing element 205 of the performance prediction computing entity 105 described above in connection with FIG. 2) to generate a predictive performance data object indicating a predicted failure likelihood associated with the measurement device.

For example, the computing entity may receive or generate a plurality of encoded input data objects associated with a measurement device, similar to various examples described above. In some embodiments, the computing entity may provide the plurality of encoded input data objects to a bidirectional RNN machine learning model (such as a bidirectional LSTM machine learning model) that has been trained based at least in part on at least step/operation 1404 and step/operation 1406 described above, and the bidirectional RNN machine learning model (such as a bidirectional LSTM machine learning model) may generate a predictive performance data object indicating a predicted failure likelihood based at least in part on the plurality of encoded input data objects.

Additionally, or alternatively, the computing entity generates a plurality of predictive weight data objects. In some embodiments, each of the plurality of predictive weight data objects indicates a predicted failure contributing factor of one of the plurality of encoded input data objects in relationship to the predicted failure likelihood. For example, the computing entity may receive or generate a plurality of encoded input data objects associated with a measurement device, similar to various examples described above. In some embodiments, the computing entity may provide the plurality of encoded input data objects to a bidirectional RNN machine learning model (such as a bidirectional LSTM machine learning model) that has been trained based at least in part on at least step/operation 1404 and step/operation 1406 described above, and the attention layers of the bidirectional RNN machine learning model (such as a bidirectional LSTM machine learning model) may generate predictive weight data objects indicating predicted failure contributing factors of the plurality of encoded input data objects in relationship to the predicted failure likelihood as indicated by the predictive performance data object.

Referring back to FIG. 14, subsequent to and/or in response to step/operation 1408, the example method 1400 proceeds to step/operation 1410 and ends.

Figure 15:
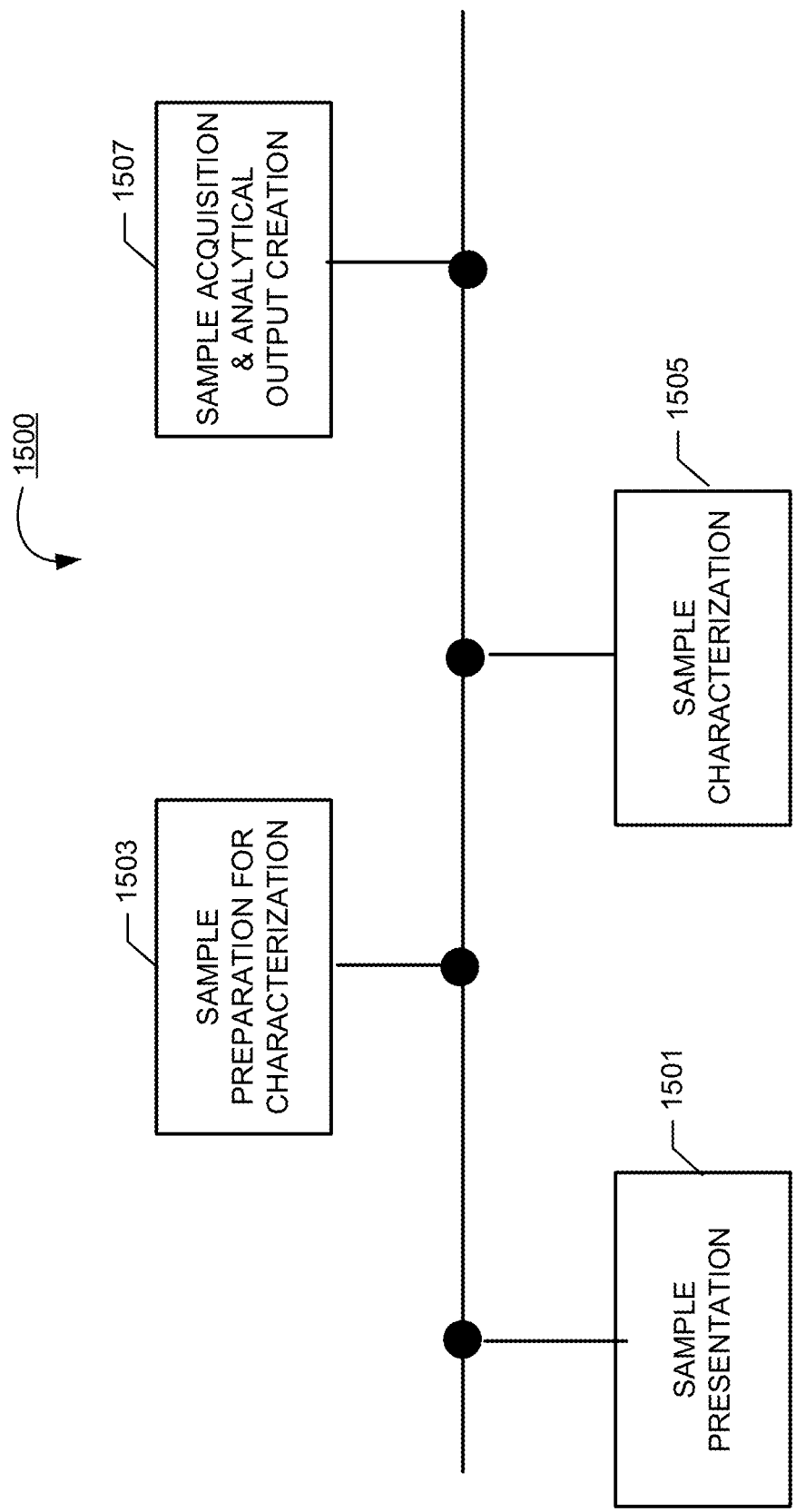

Referring now to FIG. 15, an example diagram 1500 is illustrated. In particular, the example diagram 1500 illustrates example causes of device failures.

In the example shown in FIG. 15, an example measurement device may perform steps such as, but not limited to, sample presentation 1501, sample preparation for characterization 1503, sample characterization 1505, and sample acquisition and analytical output creation 1507. During sample presentation 1501, factors such as pneumatic performance drifts can impact the quality of sample presented and cause unplanned failure. During sample preparation for characterization 1503, factors such as stray light, temperature, and humidity can impact reagents, calibrators, sample mixing/heating and cause unplanned failure. During sample characterization 1505, factors such as fading light sources and particulate levels can impact the quality of characterized sample output and cause unplanned failure. During signal acquisition & analytical output creation 1507, factors such as electrical noise and component drift can impact electrical signals converted to outputs and cause unplanned failure. As such, by generating predictive performance data objects that indicate predicted failure likelihoods, various embodiments of the present disclosure may proactively notify users to take action so as to prevent device failure from happening, thereby improving functionalities of measurement devices.

g. Exemplary Interactive User Interface

As described above, there are technical challenges, deficiencies and problems associated with measurement devices, and various example embodiments of the present disclosure overcome such challenges. For example, referring now to FIG. 16, an example method 1600 of generating a graph-based data object and performing one or more prediction-based actions based at least in part on the graph-based data object in accordance with embodiments of the present disclosure is illustrated. FIG. 17 and FIG. 18 illustrate example interactive user interfaces in accordance with various examples of the present disclosure.

The example method 1600 of FIG. 16 and the example interactive user interface shown in FIG. 17 may allow users to visualize the probabilistic likelihoods of a conformance signal based at least in part on the conformance score data object and/or a fully integrated predictive failure/accuracy signal based at least in part on the predictive performance data object, as well how the probabilistic likelihoods change through time. Additionally, or alternatively, based at least in part on predictive weight data objects, the example method 1600 of FIG. 16 and the example interactive user interface shown in FIG. 18 will show contributions towards likely failure or likely accuracy level by each encoded input data object, hence guiding intervention opportunity and reducing the likelihood of unplanned failure and non-optimal results by the measurement devices.

As shown in FIG. 16, the example method 1600 starts at step/operation 1602. Subsequent to and/or in response to step/operation 1602, the example method 1600 proceeds to step/operation 1604. At step/operation 1604, a computing entity (such as the performance prediction computing entity 105 described above in connection with FIG. 1 and FIG. 2) may include means (such as the processing element 205 of the performance prediction computing entity 105 described above in connection with FIG. 2) to cause rendering, on a display of a client computing entity, an overall graph data object based at least in part on the predictive performance data object.

In some embodiments, the overall graph data object, when rendered, may display the predictive performance data object in a graphic format. For example, referring now to FIG. 17, an example user interface 1700 is shown. The example user interface 1700 includes an overall graph data object 1701 that has been rendered for display.

In the example shown in FIG. 17, the overall graph data object 1701 may comprise a predictive performance data object plot chart 1703 and a conformance score data object bar chart 1705.

In some embodiments, the computing entity may generate the predictive performance data object plot chart 1703 by generating predictive performance data objects in accordance with various embodiments of the present disclosure, and plot them based at least in part on their corresponding timecode indicators. For example, the predictive performance data objects may indicate predicted failure likelihood, and the predictive performance data object plot chart

1703 may illustrates how the indicate predicted failure likelihood changes over time.

In some embodiments, the computing entity may generate conformance score data object bar chart 1705 by generating conformance score data objects in accordance with various embodiments of the present disclosure, and plot them based at least in part on their corresponding timecode indicators. For example, each conformance score data object may describe or indicate the conformance level of one or more operation events/steps at a given time, and the conformance score data object bar chart 1705 may indicate which operation event/step contributed the most to the device failure.

Referring back to FIG. 16, subsequent to and/or in response to step/operation 1604, the example method 1600 proceeds to step/operation 1606. At step/operation 1606, a computing entity (such as the performance prediction computing entity 105 described above in connection with FIG. 1 and FIG. 2) may include means (such as the processing element 205 of the performance prediction computing entity 105 described above in connection with FIG. 2) to cause rendering, on the display of the client computing entity, a weight graph data object in response to receiving a user input associated with the overall graph data object.

For example, referring back to FIG. 17, a user may click, tap, and/or otherwise select one of the data points on the predictive performance data object plot chart 1703. In this example, the selected data point may be generated based at least in part on a predictive performance data object, and the computing entity may update the user interface to display a weight graph data object that is generated based at least in part on the plurality of predictive weight data objects associated with the predictive performance data object.

In some embodiments, the weight graph data object, when rendered, may display the predictive weight data objects in a graphic format. Referring now to FIG. 18, an example user interface 1800 is shown. The example user interface 1800 includes a weight graph data object 1801 that has been rendered for display.

The weight graph data object 1801 provides an example of live monitoring for failure likelihood of the measurement device. In this example, the weight graph data object 1801 comprises predictive weight data objects 1803, 1805, 1807, 1809, and 1811 that have been plotted in a bar chart. In this example, a positive value of a predictive weight data object indicates that the encoded input data object increases the likelihood of failure, and a negative value of a predictive weight data object indicates that the encoded input data object decreases the likelihood of failure.

As such, the weight graph data object 1801 extracts interpretability from predictive data models in real-time operations to suggest how a potential failure can be intervened before a hard fault occurs and healthcare operations are impacted. For example, using the predictive models (such as a bidirectional RNN for the integrated failure prediction and a GAN model for the conformance score data object) provides not only a probabilistic value of failure and nonconformance but also an understanding of why failure is likely to occur (e.g. as determined through the attention layers as described above) and hence a possible suggested intervention to prevent failure from happening.

For example, when a user sees either the GAN nonconformance signal or the signal of unplanned intermittent failure trending strongly towards one in an overall graph data object (for example, as shown in FIG. 17), the user may then interrogate the weights that are driving the high signal using a weight graph data object (for example, as shown in FIG. 18). The intervention that is required may require device specific domain knowledge that a service engineer would possess so that the service engineer can intervene.

As an example, the predictive weight data object 1803 corresponds to an encoded conformance sore data object, the predictive weight data object 1805 corresponds to an encoded input data object describing low lamp intensity, the predictive weight data object 1807 corresponds to an encoded input data object describing a lower pressure reactor warning, the predictive weight data object 1809 corresponds to an encoded input data object describing a device case lumen intensity between 10-15 L, and the predictive weight data object 1811 corresponds to an encoded input data object describing an analogue output signal between 5-10 mA.

In this example, the predictive weight data object for the conformance score data object from the GAN machine learning model (the predictive weight data object 1803) is the highest, and is driving the highest likelihood of failure. This indicates that the measurement device is repeating frequently parts of the diagnostic measurement cycle to get an acceptable output. In addition, the second highest contributor (the predictive weight data object 1805) is in relation to spectral light intensity, which is the most probable cause of processing cycle steps to be re-completed. In this example, a simple intervention to check and adjust spectral light intensity could improve the conformance score data object generated by the GAN machine learning model and reduce cycle time and likelihood of a hard failure.

Referring back to FIG. 16, subsequent to and/or in response to step/operation 1606, the example method 1600 proceeds to step/operation 1608 and ends.

g. Exemplary Techniques for Generating an Encoded Conformance Score Data Object

In some embodiments, an encoded conformance score data object describes a conformance score for a current event encoding data object of an ordered sequence of event encoding data objects that are generated by the monitoring device. In some embodiments, generating the conformance score comprises: (i) for each encoding event data object, generating, using one or more processors and a machine learning framework, a state-level attention weight value and an attribute-level attention weight vector, wherein: the machine learning framework comprises a state processing recurrent neural network machine learning model and an attribute processing machine learning model, the state processing recurrent neural network machine learning model is configured to generate the state-level attention weight value for the event encoding data object based at least in part on each event encoding data object, and the attribute processing machine learning model is configured to generate the attribute-level attention weight vector for the event encoding data object based at least in part on each event encoding data object; and (ii) generating, using the one or more processors, the conformance score based at least in part on: (a) each state-level attention weight value for a current subset of the ordered sequence that comprises the current event encoding data object and each event encoding data object that has a lower position value relative to the current event encoding data object in accordance with the ordered sequence, and b) each attribute-level attention weight vector for the current subset. In some embodiments, each event encoding data object comprises an event state encoding and an event attribute feature encoding characterized by one or more event attribute features. In some embodiments, each attribute-level attention weight vector comprises an attribute-level attention weight value for each event attribute feature of the one or more event attribute features. In some embodiments, the state processing recurrent neural network machine learning model is a long short term memory machine learning model. In some embodiments, the attribute processing recurrent neural network machine learning model is a long short term memory machine learning model. In some embodiments, the machine learning framework is a discriminator machine learning model, and the discriminator machine learning model is trained as part of a generative adversarial machine learning framework. In some embodiments, training the generative adversarial machine learning framework comprises: generating, using the one or more processors, the discriminator machine learning model, and generating, using the one or more processors, a generator machine learning model of the generative adversarial machine learning framework.

In some embodiments, generating the discriminator machine learning model comprises: identifying a defined number of event noise data objects; identifying a defined number of observed event encoding data objects based at least in part on an observed event distribution; generating, using the discriminator machine learning model, a set of event noise inferences based at least in part on each event noise data object; generating, using the discriminator machine learning model, a set of observed event inferences based at least in part on each observed event encoding data object; generating a discriminator gradient value for the discriminator machine learning model based at least in part on the set of event noise inferences and the set of observed event inferences; and updating one or more parameters of the discriminator machine learning model to maximize the discriminator gradient value.

In some embodiments, generating the discriminator machine learning model comprises: identifying a defined number of event noise data objects; processing each event noise data object using the discriminator machine learning model to generate a set of event noise inferences; generating a generator gradient value for the generator machine learning model based at least in part on the set of observed event inferences; and updating one or more parameters of the generator machine learning model to minimize the generator gradient value. In some embodiments, using the one or more processors and for a kth event attribute feature of the one or more event attribute features of a jth event encoding data object in the ordered sequence and with respect to the conformance score for the jth event encoding data object, an attribute-level in-state contribution score is determined based at least in part on the state-level attention weight value for the jth event encoding data object, the attribute-level attention weight vector for the jth event encoding data object, one or more trained parameters, and the and a target value of the jth event encoding data object that corresponds to the kth event attribute feature. In some embodiments, user interface data for a prediction output user interface that depicts each attribute-level in-state contribution score for the jth event encoding data object is generated. In some embodiments, user interface data for a prediction output user interface that depicts the conformance score for each event encoding data object in the ordered sequence is generated. In some embodiments, user interface data for a prediction output user interface that depicts the state-level attention weight value for each event encoding data object in the ordered sequence is generated.

In some embodiments, an event data object describes one or more recorded features of an observed/recorded event. An example of an event data object is a data object that describes recorded features of a customer service delivery event, such a case identifier associated with the customer service delivery event, a timestamp associated with the customer service delivery event, a service medium associated with the customer service delivery event, an activity status associated with the customer service delivery event, a service line identifier associated with the customer service delivery event, an urgency level associated with the customer service delivery event, an urgency level identifier associated with the customer service delivery event, and/or the like. Another example of an event data object is a data object that describes recorded features of a medical service delivery event, such as a provider identifier associated with the medical service delivery event, patient demographic features associated with the medical service delivery event, a case identifier associated with the medical service delivery event, a timestamp associated with the medical service delivery event, a service medium associated with the medical service delivery event, an activity status associated with the medical service delivery event, a service line identifier associated with the medical service delivery event, an urgency level associated with the medical service delivery event, an urgency level identifier associated with the medical service delivery event, and/or the like. In some embodiments, an event data object is an attribute of n event features, where the n event features may include a set of event state features and a set of event attribute features.

In some embodiments, an event data object may include one or more event attribute feature values. An event attribute feature value of an event data object may describe an event feature value described by an event data object that is part of at least a subset of the feature values described by the event data object which are not deemed to be event state feature values of the event data objects. In some embodiments, an event attribute feature of an event data object may describe a feature value described by an event data object that is not deemed to be a core feature of the event data object, such that in some embodiments the collection of the event attribute features of an event data objects may be used to perform secondary non-state-based inferences based at least in part on non-core features of the event data objects. Examples of event attribute features for a customer service delivery event data object include a service medium associated with the customer service delivery event, a service line identifier associated with the customer service delivery event, an urgency level associated with the customer service delivery event, an urgency level identifier associated with the customer service delivery event, and/or the like. Examples of event attribute features for a medical service delivery event data object include a provider identifier associated with the medical service delivery event, patient demographic features associated with the medical service delivery event, a service medium associated with the medical service delivery event, an activity status associated with the medical service delivery event, a service line identifier associated with the medical service delivery event, an urgency level associated with the medical service delivery event, an urgency level identifier associated with the medical service delivery event, and/or the like. In some embodiments, event attribute features of an event data object are described by configuration data associated with a predictive data analysis system that is configured to perform predictive inferences based at least in part on the event data objects.

In some embodiments, the event encoding data object may be part of an ordered sequence of event encoding data objects, where an ordered sequence of event encoding data objects may describe a sequence of event encoding data objects, and where each event encoding data object in the ordered sequence is associated with a position value that is distinct from the position values of other event encoding data objects in the ordered sequence. For example, an ordered sequence of event data objects may order the event encoding data objects in the ordered sequence based at least in part on timestamps of corresponding event data objects associated with the event encoding data objects in the ordered sequence, such that an earliest event encoding data object in the ordered sequence has a lowest position value, a second-earliest event encoding data object in the ordered sequence has a second-lowest position value, and/or the like.

In some embodiments, an event encoding data object includes an event state encoding. An event state encoding may describe a defined-size representation of event state attribute features of a corresponding event data object. For example, in some embodiments, generating an event state encoding for an event data object includes generating a one-hot-coded representation of each event state feature of the event data object, aggregating the one-hot-coded representations of the event state features to generate an initial event state encoding, and performing dimensionality reduction on the initial event state encoding to generate the event state encoding. As another example, in some embodiments, generating an event state encoding for an event data object includes generating a one-hot-coded representation of each event state feature of the event data object, aggregating the one-hot-coded representations of the event state features to generate an initial event state encoding, and generating the event state encoding based at least in part on the initial event state encoding. As yet another example, in some embodiments, generating an event state encoding for an event data object includes generating a one-hot-coded representation of each event state feature of the event data object, and performing dimensionality reduction on the one-hot-coded representations of the event state features to generate the event state encoding.

In some embodiments, an event encoding data object includes an event attribute encoding. An event attribute encoding may describe a defined-size representation of event attribute features of a corresponding event data object, where each event attribute encoding value of the event attribute encoding is associated with an event attribute feature of the event attribute features described by the event encoding data object. For example, in some embodiments, generating an event attribute encoding for an event data object includes generating a one-hot-coded representation of each event attribute feature of the event data object and aggregating the one-hot-coded representations of the event attribute features to generate the event attribute encoding.

In some embodiments, a machine learning framework may be a trained machine learning framework that includes two or more recurrent neural network machine learning models. In some embodiments, the machine learning framework includes two or more machine learning models have a similar recurrent neural network type. For example, the recurrent neural network may include two or more conventional recurrent neural network machine learning models, two or more long short term memory neural networks, two or more gated recurrent units, and/or the like. In some embodiments, the machine learning framework includes two or more machine learning models that have different recurrent neural network types. For example, a machine learning framework may include one or more conventional recurrent neural network machine learning models, one or more long short term memory neural networks, one or more gated recurrent units, and/or the like.

In some embodiments, the two or more recurrent neural network machine learning models of the machine learning framework may include a state processing recurrent neural network machine learning model and an attribute processing machine learning model. In some embodiments, a state processing recurrent neural network machine learning model may be a recurrent neural network machine learning model that is configured to process an event encoding data object to generate a state-level attention weight value for the event data object. In some embodiments, the state processing event recurrent neural network machine learning model is configured to process an event encoding data object to generate a hidden state vector for the encoded event data object, then process the hidden state vector in accordance with the parameters (e.g., weights and/or biases) of the state processing recurrent neural network machine learning model to generate a state processing model output for the encoded event data object, and then generates the state-level attention weight value for the encoded event data object based at least in part on the state processing model output for the encoded event data object (e.g., based at least in part on an output of normalizing the state processing model output across the state processing model outputs of a preceding subset of the ordered sequence of event encoding data objects that occur prior to the current event encoding data object). In some embodiments, an attribute processing machine learning model may be a recurrent neural network machine learning model that is configured to process an event encoding data object to generate an attribute-level attention weight vector for the event data object. In some embodiments, the attribute processing event recurrent neural network machine learning model is configured to process an event encoding data object to generate a hidden state vector for the encoded event data object, then process the hidden state vector in accordance with the parameters (e.g., weights and/or biases) of the attribute processing recurrent neural network machine learning model and using an activation function (e.g., a hyperbolic tangent activation function) to generate the attribute-level attention weight vector for the event data object.

In some embodiments, the inputs to the state processing machine learning framework include, at each timestamp, an event encoding data object which is a vector. In some embodiments, the output of the state processing machine learning model is, for each timestamp, a state-level attention weight value which is an atomic value. In some embodiments, the inputs to the attribute processing machine learning framework include, at each timestamp, an event encoding data object which is a vector. In some embodiments, the output of the attribute processing machine learning model is, for each timestamp, an attribute-level attention weight vector which is a vector. In some embodiments, the inputs to the machine learning framework include, at each timestamp, an event encoding data object which is a vector. In some embodiments, the outputs of the machine learning framework include, for each timestamp, a conformance score which may be a vector and/or an atomic value.

V. CONCLUSION

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A system comprising one or more processors and one non-transitory memory comprising a computer program code, the non-transitory memory and the computer program code configured to, with the one or more processors, cause the system to:
generate a plurality of encoded input data objects associated with a measurement device, wherein to generate the plurality of encoded input data objects, the non-transitory memory and the computer program code are further configured to, with the one or more processors, cause the system to:
generate a plurality of encoded measurement device data objects associated with the measurement device, wherein the plurality of encoded measurement device data objects comprises one or more encoded analogue signal data objects, one or more encoded internal reading data objects, one or more encoded external reading data objects, or one or more encoded event log data objects,
generate, using at least a Generative Adversarial Network (GAN) machine learning model, at least one encoded conformance score data object based at least in part on one or more encoded device operation data objects from an ordered sequence of encoded device operation data objects that are associated with the measurement device, wherein the plurality of encoded input data objects comprises the plurality of encoded measurement device data objects and the at least one encoded conformance score data object, and
generate the plurality of encoded input data objects based at least in part on the plurality of encoded measurement device data objects and the at least one encoded conformance score data object,
generate, using at least a bidirectional Recurrent Neural Networks (RNN) machine learning model, a predictive performance data object associated with the measurement device and a plurality of predictive weight data objects associated with the predictive performance data object, wherein the bidirectional RNN machine learning model is configured to:
generate the predictive performance data object based at least in part on the plurality of encoded input data objects, and
generate, for each of the plurality of encoded input data objects, a corresponding predictive weight data object of the plurality of predictive weight data objects; and
perform one or more prediction-based actions based at least in part on the predictive performance data object or the plurality of predictive weight data objects.

2. The system of claim 1, wherein the bidirectional RNN machine learning model is a bidirectional Long Short Term Memory (LSTM) machine learning model.

3. The system of claim 2, wherein the bidirectional LSTM machine learning model comprises one or more attention layers, wherein the non-transitory memory and the computer program code are further configured to, with the one or more processors, cause the system to:
generate, using the one or more attention layers, the plurality of predictive weight data objects associated with the predictive performance data object.

4. The system of claim 1, wherein the at least one encoded conformance score data object indicates an operation conformance level associated with the measurement device.

5. The system of claim 4, wherein the GAN machine learning model comprises a generator component and a discriminator component, wherein the non-transitory memory and the computer program code are further configured to, with the one or more processors, cause the system to:
generate, using the generator component, one or more synthetic device operation data objects;
generate, using the discriminator component, one or more synthetic conformance score data objects based at least in part on the one or more synthetic device operation data objects; and
train the discriminator component based at least in part on one or more synthetic conformance score data objects and the one or more synthetic device operation data objects.

6. The system of claim 5, wherein the discriminator component comprises at least one attention layer, wherein the non-transitory memory and the computer program code are further configured to, with the one or more processors, cause the system to:
generate, for each of the one or more encoded device operation data objects and using the at least one attention layer, a corresponding conformance weight data object.

7. The system of claim 1, wherein the non-transitory memory and the computer program code are further configured to, with the one or more processors, cause the system to:
retrieve a plurality of measurement device data objects associated with the measurement device, wherein the plurality of measurement device data objects comprises one or more analogue signal data objects, one or more internal reading data objects, one or more external reading data objects, and one or more event log data objects.

8. The system of claim 7, wherein to generate the plurality of encoded measurement device data objects, the non-transitory memory and the computer program code are further configured to, with the one or more processors, cause the system to:
retrieve an event encoding registry data object associated with the measurement device; and
encode the plurality of measurement device data objects based at least in part on the event encoding registry data object.

9. The system of claim 7, wherein each of the plurality of measurement device data objects is associated with a corresponding timecode indicator, wherein the non-transitory memory and the computer program code are further configured to, with the one or more processors, cause the system to generate the plurality of encoded measurement device data objects is based at least in part on the plurality of measurement device data objects and the corresponding timecode indicator.

10. The system of claim 1, wherein the predictive performance data object indicates a predicted accuracy level associated with the measurement device, wherein each of the plurality of predictive weight data objects indicates a predicted accuracy contributing factor of one of the plurality of encoded input data objects in relationship to the predicted accuracy level.

11. The system of claim 10, wherein the non-transitory memory and the computer program code are further configured to, with the one or more processors, cause the system to:
retrieve a plurality of training encoded input data objects comprising a plurality of training encoded measurement device data objects and at least one training encoded conformance score data object, wherein the plurality of training encoded input data objects are associated with a training predictive performance data object indicating a known accuracy level; and
train the bidirectional RNN machine learning model based at least in part on the plurality of training encoded input data objects and the training predictive performance data object.

12. The system of claim 1, wherein the predictive performance data object indicates a predicted failure likelihood associated with the measurement device, wherein each of the plurality of predictive weight data objects indicates a predicted failure contributing factor of one of the plurality of encoded input data objects in relationship to the predicted failure likelihood.

13. The system of claim 12, wherein the non-transitory memory and the computer program code are further configured to, with the one or more processors, cause the system to:
retrieve a plurality of training encoded input data objects comprising a plurality of training encoded measurement device data objects and at least one training encoded conformance score data object, wherein the plurality of training encoded input data objects are associated with a training predictive performance data object indicating a known failure likelihood; and
train the bidirectional RNN machine learning model based at least in part on the plurality of training encoded input data objects and the training predictive performance data object.

14. The system of claim 1, wherein the non-transitory memory and the computer program code are further configured to, with the one or more processors, cause the system to:
cause rendering, on a display of a client computing entity, an overall graph data object based at least in part on the predictive performance data object.

15. The system of claim 14, wherein the non-transitory memory and the computer program code are further configured to, with the one or more processors, cause the system to:
in response to receiving a user input associated with the overall graph data object, cause rendering, on the display of the client computing entity, a weight graph data object based at least in part on the plurality of predictive weight data objects.

16. A computer-implemented method comprising:
generating a plurality of encoded input data objects associated with a measurement device, wherein generating the plurality of encoded input data objects comprises:
generating a plurality of encoded measurement device data objects associated with the measurement device, wherein the plurality of encoded measurement device data objects comprises one or more encoded analogue signal data objects, one or more encoded internal reading data objects, one or more encoded external reading data objects, or one or more encoded event log data objects,
generating, using at least a Generative Adversarial Network (GAN) machine learning model, at least one encoded conformance score data object based at least in part on one or more encoded device operation data objects from an ordered sequence of encoded device operation data objects that are associated with the measurement device, wherein the plurality of encoded input data objects comprises the plurality of encoded measurement device data objects and the at least one encoded conformance score data object, and
generating the plurality of encoded input data objects based at least in part on the plurality of encoded measurement device data objects and the at least one encoded conformance score data object;
generating, using at least a bidirectional Recurrent Neural Networks (RNN) machine learning model, a predictive performance data object associated with the measurement device and a plurality of predictive weight data objects associated with the predictive performance data object, wherein the bidirectional RNN machine learning model is configured to:
generate the predictive performance data object based at least in part on the plurality of encoded input data objects, and
generate, for each of the plurality of encoded input data objects, a corresponding predictive weight data object of the plurality of predictive weight data objects; and
performing one or more prediction-based actions based at least in part on the predictive performance data object or the plurality of predictive weight data objects.

17. The computer-implemented method of claim 16, further comprising:
retrieving a plurality of measurement device data objects associated with the measurement device, wherein each of the plurality of measurement device data objects is associated with a corresponding timecode indicator, wherein generating the plurality of encoded measurement device data objects is based at least in part on the plurality of measurement device data objects and the corresponding timecode indicator.

18. The computer-implemented method of claim 17, wherein the plurality of measurement device data objects comprises one or more analogue signal data objects, one or more internal reading data objects, one or more external reading data objects, and one or more event log data objects.

19. The computer-implemented method of claim 17, wherein generating the plurality of encoded measurement device data objects further comprises:
retrieving an event encoding registry data object associated with the measurement device; and
encoding the plurality of measurement device data objects based at least in part on the event encoding registry data object.

20. A computer program product comprising at least one non-transitory computer-readable storage medium having computer-readable program code portions stored therein, the computer-readable program code portions comprising an executable portion configured to:
generate a plurality of encoded input data objects associated with a measurement device, wherein to generate the plurality of encoded input data objects, the executable portion is further configured to:
generate a plurality of encoded measurement device data objects associated with the measurement device, wherein the plurality of encoded measurement device data objects comprises one or more encoded analogue signal data objects, one or more encoded internal reading data objects, one or more encoded external reading data objects, or one or more encoded event log data objects, generate, using at least a Generative Adversarial Network (GAN) machine learning model, at least one encoded conformance score data object based at least in part on one or more encoded device operation data objects from an ordered sequence of encoded device operation data objects that are associated with the measurement device wherein the plurality of encoded input data objects comprises the plurality of encoded measurement device data objects and the at least one encoded conformance score data object, and generate the plurality of encoded input data objects based at least in part on the plurality of encoded measurement device data objects and the at least one encoded conformance score data object;

generate, using at least a bidirectional Recurrent Neural Networks (RNN) machine learning model, a predictive performance data object associated with the measurement device and a plurality of predictive weight data objects associated with the predictive performance data object, wherein the bidirectional RNN machine learning model is configured to:

generate the predictive performance data object based at least in part on the plurality of encoded input data objects, and generate, for each of the plurality of encoded input data objects, a corresponding predictive weight data object of the plurality of predictive weight data objects; and perform one or more prediction-based actions based at least in part on the predictive performance data object or the plurality of predictive weight data objects.

* * * * *

UNITED STATES PATENT AND TRADEMARK OFFICE
CERTIFICATE OF CORRECTION

PATENT NO. : 12,327,193 B2
APPLICATION NO. : 17/504657
DATED : June 10, 2025
INVENTOR(S) : Kieran O'Donoghue et al.

Page 1 of 1

It is certified that error appears in the above-identified patent and that said Letters Patent is hereby corrected as shown below:

In the Claims

In Column 57, Claim 1, Line 5, delete "and one" and insert -- and --, therefor.

In Column 58, Claim 9, Line 58, delete "objects is" and insert -- objects --, therefor.

Signed and Sealed this
Second Day of September, 2025

Coke Morgan Stewart
*Acting Director of the United States Patent and Trademark Office*